US010569771B2

(12) United States Patent
Song et al.

(10) Patent No.: US 10,569,771 B2
(45) Date of Patent: Feb. 25, 2020

(54) CAMERA SYSTEM FOR INTELLIGENT DRIVER ASSISTANCE SYSTEM, AND DRIVER ASSISTANCE SYSTEM AND METHOD

(71) Applicant: MANDO CORPORATION, Pyeongtaek-Si, Gyeonggi-Do (KR)

(72) Inventors: In Hyuk Song, Anyang-Si (KR); Dai Chang Ro, Seongnam-Si (KR); Sang Yeob Lee, Seongnam-Si (KR); Won Sik Jung, Yongin-Si (KR); Ji Yong Lee, Seongnam-Si (KR); Jae Kyeong Kim, Seoul (KR); Sang Kyun Sim, Anyang-Si (KR); Kyung Geun Jeon, Yongin-Si (KR); Kwan Sun You, Yongin-Si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/218,170

(22) Filed: Dec. 12, 2018

(65) Prior Publication Data
US 2019/0143968 A1    May 16, 2019

Related U.S. Application Data

(63) Continuation of application No. PCT/KR2018/000826, filed on Jan. 18, 2018.

(51) Int. Cl.
*B60W 30/09* (2012.01)
*B60W 30/095* (2012.01)
(Continued)

(52) U.S. Cl.
CPC ............ *B60W 30/09* (2013.01); *B60R 11/04* (2013.01); *B60W 10/18* (2013.01); *B60W 10/20* (2013.01);
(Continued)

(58) Field of Classification Search
CPC .. B60W 30/09; B60W 10/20; B60W 30/0956; B60W 30/18163; B60W 10/18;
(Continued)

(56) References Cited

U.S. PATENT DOCUMENTS 8,676,443 B2    3/2014 Han et al.
2013/0151058 A1*  6/2013 Zagorski ............... B60W 30/09
                                                  701/23
(Continued)

FOREIGN PATENT DOCUMENTS

JP    2009-280015 A    12/2009
JP        4720355 B2     7/2011
(Continued)

OTHER PUBLICATIONS

International Search Report dated May 11, 2018 issued in corresponding International Application No. PCT/KR2018/000826, including English translation.

*Primary Examiner* — Brian P Sweeney
(74) *Attorney, Agent, or Firm* — Morgan, Lewis & Bockius LLP

(57) ABSTRACT

An advanced driving assistance system (ADAS) provides collision avoidance control for a host vehicle. The system can include one or more sensors mounted to the host vehicle and configured to sense a driving lane in which the host vehicle is traveling and to sense an external vehicle partially engaged in the driving lane. A controller controls steering, braking, or acceleration of the host vehicle on the basis of sensing information received from the sensor. The controller determines the external vehicle partially engaged in the driving lane as a target vehicle having at least a part thereof overlapping with a lane mark of the driving lane, and performs longitudinal braking or acceleration control or lateral steering control on the host vehicle based on lateral
(Continued)

and longitudinal positional relationships between the host vehicle and the target vehicle.

26 Claims, 57 Drawing Sheets

(51) Int. Cl.
*B60W 30/18* (2012.01)
*G08G 1/16* (2006.01)
*G06K 9/00* (2006.01)
*B60W 10/20* (2006.01)
*B60W 10/18* (2012.01)
*B60R 11/04* (2006.01)
*B60W 40/02* (2006.01)
*B60W 40/105* (2012.01)
*G02B 7/02* (2006.01)
*H04N 5/225* (2006.01)

(52) U.S. Cl.
CPC .. *B60W 30/0956* (2013.01); *B60W 30/18163* (2013.01); *B60W 40/02* (2013.01); *B60W 40/105* (2013.01); *G02B 7/02* (2013.01); *G06K 9/00798* (2013.01); *G08G 1/166* (2013.01); *G08G 1/167* (2013.01); *H04N 5/2251* (2013.01); *B60W 2420/42* (2013.01); *B60W 2420/52* (2013.01); *B60W 2550/306* (2013.01); *B60W 2550/308* (2013.01)

(58) Field of Classification Search
CPC ....... B60W 2550/308; B60W 2420/42; B60W 2550/306; B60W 2420/52; B60W 40/02; B60W 40/105; B60R 11/04; G08G 1/167; G08G 1/166; G06K 9/00798; H04N 5/2251; G02B 7/02
USPC ........................................................ 701/301
See application file for complete search history.

(56) References Cited

U.S. PATENT DOCUMENTS

2015/0353025 A1  12/2015  Yeo
2018/0015918 A1   1/2018  Bae et al.

FOREIGN PATENT DOCUMENTS

| | | |
|---|---|---|
| JP | 4774849 B2 | 9/2011 |
| JP | 4814928 B2 | 11/2011 |
| JP | 5915152 B2 | 5/2016 |
| KR | 10-2012-0016430 A | 2/2012 |
| KR | 10-2013-0037971 A | 4/2013 |
| KR | 20-2013-0002349 U | 4/2013 |
| KR | 10-1361360 | 2/2014 |
| KR | 10-2014-0136726 A | 12/2014 |
| KR | 10-2015-0140927 A | 12/2015 |
| KR | 10-2017-0040955 A | 4/2017 |
| KR | 101834351 B1 | 3/2018 |

* cited by examiner

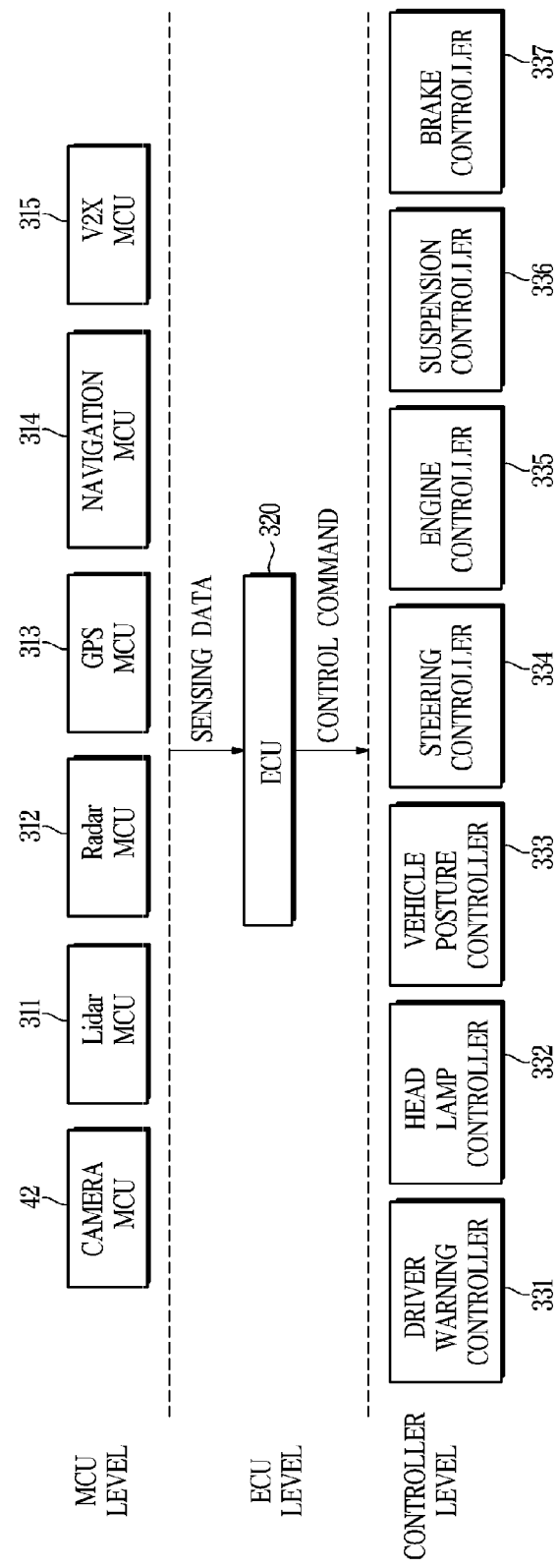

FIG. 16
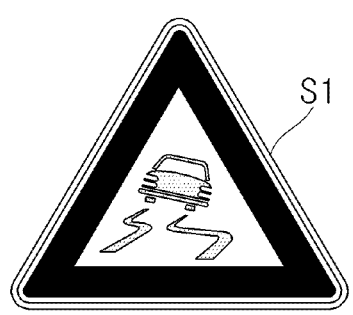
SLIPPERY ROAD
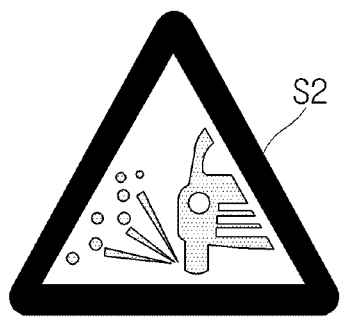
WET ROAD

CAMERA SYSTEM FOR INTELLIGENT DRIVER ASSISTANCE SYSTEM, AND DRIVER ASSISTANCE SYSTEM AND METHOD

CROSS-REFERENCE TO RELATED APPLICATION

This application claims the benefit of International Application No. PCT/KR2018/000826, filed on Jan. 18, 2018, which claims the benefit of Korean Application No. KR 10-2017-0009172, filed Jan. 19, 2017, Korean Application No. KR 10-2017-0009173, filed Jan. 19, 2017, Korean Application No. KR 10-2017-0009174, filed Jan. 19, 2017, Korean Application No. KR 10-2017-0009175, filed Jan. 19, 2017, Korean Application No. KR 10-2017-0009176, filed Jan. 19, 2017, Korean Application No. KR 10-2017-0009209, filed Jan. 19, 2017, Korean Application No. KR 10-2017-0009210, filed Jan. 19, 2017, Korean Application No. KR 10-2017-0009211, filed Jan. 19, 2017, Korean Application No. KR 10-2017-0009212, filed Jan. 19, 2017, Korean Application No. KR 10-2017-0009213, filed Jan. 19, 2017, Korean Application No. KR 10-2017-0009214, filed Jan. 19, 2017, Korean Application No. KR 10-2017-0009215, filed Jan. 19, 2017, the disclosures of which are incorporated by reference in their entireties.

TECHNICAL FIELD

The present disclosure relates to an advanced driving assistance system (ADAS), and more particularly, to a camera system for an ADAS, and a driver assistance system and method.

BACKGROUND ART

An ADAS, which is an enhanced driver assistance system for assisting a driver in driving a vehicle, is configured to sense a situation ahead, determine a situation on the basis of the sensed result, and control the vehicle's behavior on the basis of the situation determination. For example, an ADAS sensor apparatus senses vehicles ahead and recognizes lanes. Subsequently, when a target lane or a target speed and a target ahead are determined, an electrical stability control (ESC), an engine management system (EMS), a motor driven power steering (MDPS), and the like of a vehicle are controlled. Typically, an ADAS may be implemented with an automatic parking system, a low-speed city driving assistance system, a blind zone warning system, and the like.

In the ADAS, a sensor apparatus for sensing a situation ahead includes a Global Positioning System (GPS) sensor, a laser scanner, a front radar, a Lidar, etc. Typically, the sensor apparatus is a front-view camera for capturing a region ahead of the vehicle.

DETAILED DESCRIPTION

Technical Problem

A first embodiment of the present disclosure is directed to providing a voltage logic and a memory logic that may be used in a front-view camera system for an ADAS.

Also, the first embodiment of the present disclosure is directed to providing a method of coupling a lens barrel and a lens holder in a front-view camera system for an ADAS.

A second embodiment of the present disclosure is directed to providing a collision prevention system and method capable of avoiding colliding with a target vehicle by controlling the steering of a host vehicle.

Also, the second embodiment of the present disclosure is directed to providing a collision prevention system and method capable of avoiding colliding with a target vehicle by controlling the speed of a host vehicle.

Also, the second embodiment of the present disclosure is directed to providing a collision prevention system and method capable of avoiding colliding between a host vehicle and a vehicle cutting ahead of the host vehicle from the next lane by controlling one or more of the speed, the braking, and the steering of the host vehicle when the cutting vehicle changes lanes.

A technical object of a third embodiment of the present disclosure is to provide a driving assistance system for making a lane change to a left turn lane in order to turn left.

A technical object of the third embodiment of the present disclosure is to provide a driving assistance system for a vehicle turning left by controlling the steering of the vehicle after the vehicle enters a left turn lane.

Also, a fourth embodiment of the present disclosure is directed to providing an emergency braking system and method capable of controlling an emergency braking start time according to a degree to which a road is slippery.

Also, the fourth embodiment of the present disclosure is directed to providing an emergency braking system and method capable of advancing an emergency braking start time when it is determined that a vehicle is running on a slippery road.

A technical object of a fifth embodiment of the present disclosure is to provide a driving assistance system for preventing a collision with a vehicle cutting ahead of a host vehicle.

A sixth embodiment of the present disclosure is directed to providing a cross traffic alert (CTA) system and method capable of sensing a risk of collision between a host vehicle and a nearby vehicle at an intersection and warning a driver of the collision risk according to the level of the collision risk.

The sixth embodiment of the present disclosure is directed to providing a CTA system and method capable of sensing a risk of collision between a host vehicle and a nearby vehicle at an intersection and capable of performing steering control on the host vehicle as well as warning a driver of the collision risk according to the level of the collision risk.

A seventh embodiment of the present disclosure is directed to implementing automatic emergency braking on the basis of a longitudinal time-to-collision (TTC) and a lateral TTC between a host vehicle and a third-party vehicle in a front-view camera system for an ADAS.

333 a driving assistance system for determining a possibility of a collision between a host vehicle and a nearby vehicle and warning a driver of the collision possibility.

A technical object of a ninth embodiment of the prevent disclosure is to provide a driving assistance system for determining a TTC between vehicles at an intersection and prevent a collision between the vehicles.

Also, a tenth embodiment of the present disclosure is directed to providing an intersection prevention system and method capable of determining priorities for Cross traffic alert (CTA) control through communication between a host vehicle and nearby vehicles when the host vehicle enters an intersection and of enabling a plurality of vehicles to systematically perform CTA control at the intersection according to the determined CTA priorities.

Also, the tenth embodiment of the present disclosure is directed to providing a CTA system and method capable of detecting a laterally appearing vehicle or pedestrian and then performing CTA control to prevent a collision therebetween when a host vehicle enters an intersection.

An eleventh embodiment of the present disclosure is directed to providing a vehicle control apparatus and method capable of sensing an intersection by means of a radar and a camera disposed in a host vehicle, sensing a side of the host vehicle at the sensed intersection, and determining whether the host vehicle will collide with a target vehicle.

Also, the eleventh embodiment of the present disclosure is directed to providing a vehicle control apparatus and method capable of issuing a warning to a driver and performing emergency braking on a host vehicle when it is determined that there is a possibility of a collision between the host vehicle and a target vehicle on the basis of whether the host vehicle will collide with the target vehicle.

A technical object of a twelfth embodiment of the present disclosure is to provide a diving assistance system capable of using a camera system to watch a direction, other than a direction that a driver is watching, and thus controlling a vehicle.

Technical Solution

According to the first embodiment of the present disclosure, there is disclosed a vehicle camera system including a lens (10) configured to capture a region ahead of a vehicle; a lens barrel (15) configured to accommodate the lens in an internal space thereof; a lens holder (20) coupled to the lens barrel; an image sensor (31) configured to sense an image captured by the lens; an image processor (41) configured to receive image data from the image sensor and process the received image data; and a camera micro-control unit (MCU) (42) configured to communicate with the image processor and receive the data processed by the image processor.

The vehicle camera system further includes a first converter unit (521) configured to receive an ignition voltage (510) and output at least one voltage; and a regulator unit (523) configured to receive the voltage output by the first converter unit (521) and output at least one voltage.

The camera MCU (42) receives a first voltage (511) from the first converter unit 521 as operating power, and the image processor (41) receives the first voltage (511) from the first converter unit (521) as operating power.

The first voltage (511) output from the first converter unit (521) is 3.3 V.

The image processor (41) receives a second voltage (512) from the first converter unit (521), the image sensor (31) receives a fifth voltage (515) from the regulator unit (523), and the second voltage (512) is the same as the fifth voltage (515).

The second voltage and the fifth voltage (515) are 1.8 V.

The image sensor (31) receives a sixth voltage (516) from the regulator unit (523) as core power, and the sixth voltage (516) is 2.8 V.

The first converter unit (521) is configured to include at least one DC-to-DC converter, and the regulator unit (523) is configured to include at least one low-dropout (LDO).

The camera MCU (42) communicates with a first memory (531).

The image processor (41) communicates with a second memory (532) and a third memory (533).

The second memory (532) has capacity determined depending on the number of advanced driving assistance system (ADAS) functions supported by the vehicle camera system.

The vehicle camera system is used to implement at least one of the following functions: Road Boundary Departure Prevention Systems (RBDPS), Cooperative Adaptive Cruise Control Systems (CACC), Vehicle/roadway warning systems, Partially Automated Parking Systems (PAPS), Partially Automated Lane Change Systems (PALS), Cooperative Forward Vehicle Emergency Brake Warning Systems (C-FVBWS), Lane Departure Warning Systems (LDWS), Pedestrian Detection and Collision Mitigation Systems (PDCMS), Curve Speed Warning Systems (CSWS), Lane Keeping Assistance Systems (LKAS), Adaptive Cruise Control systems (ACC), Forward Vehicle Collision Warning Systems (FVCWS), Maneuvering Aids for Low Speed Operation systems (MALSO), Lane Change Decision Aid Systems (LCDAS), Low Speed Following systems (LSF), Full Speed Range Adaptive cruise control systems (FSRA), Forward Vehicle Collision Mitigation Systems (FVCMS), Extended Range Backing Aids systems (ERBA), Cooperative Intersection Signal Information and Violation Warning Systems (CIWS), and Traffic Impediment Warning Systems (TIWS).

The lens barrel additionally has a flange, and a groove is formed on a lower surface of the flange of the lens barrel.

The groove is formed to have at least one of a single circular shape, a dual circular shape, a cross lattice shape, and a zigzag shape.

A groove is formed on an upper surface of the lens holder.

The groove is formed to have at least one of a single circular shape, a dual circular shape, a cross lattice shape, and a zigzag shape.

A collision prevention system according to a second embodiment of the present disclosure includes a camera system configured to generate image data regarding regions ahead of, behind, to the left of, and to the right of a host vehicle, a radar system configured to generate radar data regarding objects ahead of, behind, to the left of, and to the right of the host vehicle, and an electronic control unit (ECU) configured to analyze the image data and the radar data, detect a target vehicle from among nearby vehicles, and control at least one of the speed, braking, and steering of the host vehicle when it is determined that a collision will occur between the host vehicle and the target vehicle is determined.

When it is determined that a collision will occur between the host vehicle and the target vehicle is determined, the ECU transmits a control signal to at least one of a vehicle posture controller, a steering controller, an engine controller, a suspension controller, and a brake controller, which are disposed in the host vehicle.

It is assumed that a collision with a target vehicle ahead is expected to occur. When there is no risk of collision with a vehicle traveling in the next lane, the ECU controls the steering controller to change a traveling direction of the host vehicle. On the other hand, when there is a risk of collision with a vehicle traveling in the next lane, the ECU controls the engine controller and the brake controller.

When a collision with a target vehicle cutting from the next lane is expected to occur, the ECU controls the steering controller to change the traveling direction of the host vehicle, or controls the engine controller and the brake controller to control the speed of the host vehicle.

A collision prevention method according to the second embodiment of the present disclosure includes generating image data regarding regions ahead of, behind, to the left of, and to the right of a host vehicle and generating radar data regarding objects ahead of, behind, to the left of, and to the right of the host vehicle; analyzing the image data and the radar data to detect a target vehicle from among nearby vehicles; determining whether a collision will occur between the host vehicle and the target vehicle; and controlling at least one of the speed, braking, and steering of the host vehicle when it is determined that a collision will occur.

Also, when there is no risk of collision with a vehicle traveling in the next lane, the steering is controlled to change the traveling direction of the host vehicle. On the other hand, when there is a risk of collision with a vehicle traveling in the next lane, the speed of the host vehicle is controlled.

Also, when a collision with a target vehicle cutting from the next lane is expected to occur, the steering is controlled to change the traveling direction of the host vehicle, or the speed of the host vehicle is controlled.

A driving assistance system according to a third embodiment of the present disclosure is provided. The driving assistance system includes a camera system. The vehicle camera system includes an ECU for controlling the vehicle through state information of the surroundings of the vehicle. The ECU receives the state information and controls the steering of the vehicle such that the lane of the steering is changed to a left-turn lane.

According to the third embodiment, the state information includes at least one of a road mark and an expanded branch lane.

According to the third embodiment, the camera system discovers first information regarding a region ahead of the vehicle, and the ECU receives the first information and controls the speed and brake of the vehicle.

According to the third embodiment, the first information includes at least one of data regarding vehicles ahead, data regarding lanes ahead, distances from font vehicles, data regarding traffic signs of an intersection, and signal data of an intersection.

According to the third embodiment, after the vehicle is steered to the left-turn lane, the ECU determines and controls whether to stop the vehicle through the second information regarding a region surrounding the vehicle, which is received from the vehicle camera system. Also, the second information includes an intersection stop line, the presence of vehicles ahead, and intersection signal data.

According to the third embodiment, the ECU controls the driver warning controller to inform the driver of whether the vehicle is allowed to turn left, which is determined through the state information.

According to the third embodiment, the driving assistance system further includes a GPS apparatus for informing of whether a left turn is allowed at the intersection and whether there is a left-turn branch lane ahead. The ECU receives and processes data transmitted by the GPS apparatus.

An emergency braking system according to a fourth embodiment of the present disclosure includes a camera system configured to recognize a road condition or a traffic sign ahead, a navigation processor configured to calculate the speed of a host vehicle and calculate a relative speed between the host vehicle and a target vehicle, and an ECU configured to calculate a time-to-collision on the basis of the relative speed, calculate a start time of emergency braking control, and advance the start time of emergency braking control when it is determined that the host vehicle is traveling on a slippery road.

The emergency braking system according to the fourth embodiment of the present disclosure further includes a navigation system configured to recognize weather information corresponding to the road on which the vehicle is traveling, and the ECU advances the start time of emergency braking control when it is determined that the road is slippery on the basis of the weather information corresponding to the road.

When a windshield wiper operates for a certain period of time, the ECU of the emergency braking system according to the fourth embodiment of the present disclosure determines that the host vehicle is traveling on a slippery road and advances the start time of emergency braking control.

The ECU of the emergency braking system according to the fourth embodiment of the present disclosure applies a weight of 30% to 70% when the start point of emergency braking control is calculated, and advances the start time of emergency braking control.

A driving assistance system according to a fifth embodiment of the present disclosure is provided. The driving assistance system further includes an ECU configured to determine a risk of collision with a third-party vehicle on the basis of the location of the host vehicle in a first lane in which the host vehicle is traveling and configured to control the host vehicle. The camera system discovers the presence and location of a third-party vehicle cutting ahead of the host vehicle, and the ECU controls the host vehicle on the basis of the lateral locations of the host vehicle and the third-party vehicle.

According to the fifth embodiment, when the camera system determines that no vehicle is present in a second lane, which is opposite to a lane from which the third-party vehicle is cutting into the first lane, the ECU controls the steering of the host vehicle to make a lane change to the second lane.

According to the fifth embodiment, when the camera system determines that another vehicle is present in the lane opposite to the lane from which the third-party vehicle is cutting ahead of the host vehicle, the ECU changes the speed of the host vehicle while controlling the host vehicle to maintain the first lane.

According to the fifth embodiment, the driving assistance system further includes a radar apparatus configured to discover a distance between the host vehicle and the third-party vehicle, and the camera system finds the lateral positions of the host vehicle and the third-party vehicle.

According to the fifth embodiment, the ECU controls the host vehicle to accelerate in order to pass the third-party vehicle before the third-party enters the first lane.

According to the fifth embodiment, the ECU controls the host vehicle to decelerate in order to prevent a collision with the third-part vehicle.

According to the fifth embodiment, the driving assistance system further includes a radar apparatus configured to discover a longitudinal distance between the host vehicle and the third-party vehicle. The camera system discovers a lateral distance between the host vehicle and the third-party vehicle, and the ECU performs longitudinal and lateral control on the host vehicle in order to prevent a collision between the host vehicle and the third-party vehicle.

According to the fifth embodiment, the camera system discovers the first lane ahead of the host vehicle, and the ECU calculates the location of the host vehicle in the first lane through first lane information acquired by the camera system and controls the steering and speed of the host vehicle.

A cross traffic alert (CTA) system according to a sixth embodiment of the present disclosure includes an ECU configured to determine, on a level basis, a risk of collision with a nearby vehicle on the basis of whether the steering wheel is operated at an intersection and whether the host vehicle is stopped or is traveling at the intersection and a driver warning controller configured to warn about the risk of collision between the host vehicle and the nearby vehicle in a video and/or audio manner on the basis of a result of the ECU determining the risk of collision.

When the steering wheel is operated to turn left, right, or around while the host vehicle is stopped, the ECU determines a first-level risk of collision between the host vehicle and the nearby vehicle. For the first-level collision risk, the driver warning controller issues a warning about the first-level collision risk in the video manner.

When the steering wheel is operated to turn left, right, or around while the host vehicle starts traveling, the ECU determines a second-level risk of collision between the host vehicle and the nearby vehicle. For the second-level collision risk, the driver warning controller issues a warning about the second-level collision risk in both of the video manner and the audio manner.

The CTA system includes a steering controller configured to perform control on an electronic power steering system (MPDS) for driving the steering wheel. Also, when there is a risk of collision with the nearby vehicle but the steering wheel is not operated to avoid the collision while the host vehicle is turning left, right, or around, the ECU determines a third-level collision risk. For the third-level collision risk, the driver warning controller issues a warning about the third-level collision risk in both of the video manner and the audio manner. For the third-level collision risk, the steering controller controls the steering to avoid the collision between the host vehicle and the nearby vehicle.

An image processor according to a seventh embodiment of the present disclosure is configured to calculate a longitudinal TTC (TTCx) and a lateral TTC (TTCy) between a host vehicle and a third-party vehicle ahead and determine whether to execute autonomous emergency braking (AEB) on the basis of a relationship between the longitudinal TTC and the lateral TTC.

In order to determine whether to execute the AEB, the image processor determines to execute the AEB when the absolute value of the difference between the longitudinal TTC and the lateral TTC is smaller than a predetermined threshold TTCth.

The pre-determined threshold is determined on the basis of at least one of the longitudinal TTC, the lateral TTC, a road condition, a road inclination, and a temperature.

A driving assistance system according to an eighth embodiment of the present disclosure is provided. The driving assistance system includes a camera system and also includes an ECU configured to determine a risk of collision with a nearby vehicle on the basis of the state of a host vehicle at an intersection, a rear radar installed in the host vehicle and configured to recognize the nearby vehicle, and a driver warning controller configured to issue a warning about the risk of collision between the host vehicle and the nearby vehicle on the basis of a result of the ECU determining the risk of collision. The camera system recognizes the signal of a traffic light ahead of the host vehicle and transmits the signal to the ECU.

According to the eighth embodiment, the camera system recognizes that the traffic light is changed from a "go" signal to a yellow signal or a red signal.

According to the eighth embodiment, the ECU calculates the presence of the nearby vehicle, a distance from the nearby vehicle, the speed of the nearby vehicle, and the traveling angle of the nearby vehicle by using the data measured by the rear radar, and determines the risk of collision with the nearby vehicle.

According to the eighth embodiment, when the "go" signal of the traffic light is changed to the yellow signal or red signal and the rear radar recognizes that the nearby vehicle accelerates or travels at constant speed, the ECU warns a driver of the collision risk through the driver warning controller.

According to the eighth embodiment, the driver warning controller warns the driver in at least one of a video manner, an audio manner, and steering wheel vibration.

According to the ninth embodiment, a driving assistance system including a camera system includes an ECU configured to determine a risk of collision with a nearby vehicle on the basis of a traveling path of a host vehicle at an intersection and configured to control a vehicle and a sensor configured to discover the nearby vehicle at the intersection. The nearby vehicle travels in a direction crossing the traveling direction of the host vehicle, and the ECU calculates a time-to-collision through the speed of the host vehicle and the speed of the nearby vehicle.

According to the ninth embodiment, the camera system measures the location of the nearby vehicle. The sensor measures a distance between the host vehicle and the nearby vehicle, and the ECU calculates a time-to-collision through the data measured by the camera system and the sensor.

According to the ninth embodiment, the ECU calculates a first time-to-collision of the host vehicle and the nearby vehicle in combination of a traveling route and the data measured by the camera system and the sensor, re-calculates a possibility of collision between the host vehicle and the nearby vehicle after the first time-to-collision, and calculates a vehicle control start time for calculating a second time-to-collision. When the second time-to-collision is smaller than the first time-to-collision at the vehicle control start time, the ECU controls the host vehicle.

According to the ninth embodiment, the vehicle control start time includes a first vehicle control start time and a second vehicle control start time later than the first vehicle control start time. The ECU generates an alert at the first vehicle control start time and then warns the driver, and controls the steering and braking of the vehicle at the second vehicle control start time to avoid a collision.

A CTA system according to a tenth embodiment of the present disclosure a camera system configured to generate image data regarding regions ahead of, behind, to the left of, and to the right of a host vehicle, a radar system configured to generate radar data regarding regions ahead of, behind, to the left of, and to the right of the host vehicle, and an ECU configured to analyze the image data and the radar data when the host vehicle enters an intersection, determine whether a collision will occur between the host vehicle and nearby vehicles or pedestrians, and set a priority of CTA control for the host vehicle and the nearby vehicles when it is determined that a collision will occur.

When it is determined that a collision will occur at the intersection, the ECU transmits a control signal to at least one of a vehicle posture controller, a steering controller, an engine controller, a suspension controller, and a brake controller, which are disposed in the host vehicle.

Also, when it is determined that a collision will occur at the intersection, the ECU generates a CTA control signal of the host vehicle and transmits the CTA signal to the nearby vehicles. Also, the ECU receives CTA control signals of the nearby vehicles from the nearby vehicles and compares the CTA control signal of the host vehicle and the CTA control signals of the nearby vehicles to set a priority for the CTA control.

A vehicle control apparatus according to an eleventh embodiment of the present disclosure includes an image generation unit configured to capture a region ahead of a host vehicle to generate an image regarding the region ahead, a first information generation unit configured to sense the region ahead of the host vehicle and generate first sensing information, a second information generation unit configured to sense the side of the host vehicle and increase the sensing of the side of the host vehicle to generate second sensing information when an intersection is sensed on the basis of the first sensing information and the image regarding the region ahead, and a control unit configure to select a target vehicle on the basis of the second information, determine whether the target vehicle will collide with the host vehicle, and control the braking of the host vehicle.

Here, the second information generation unit generates the second sensing information by increasing the width of the sensing region to the side of the host vehicle after the intersection is sensed over the area of the sensing region to the side of the host vehicle before the intersection is sensed.

Also, the second information generation unit generates the second sensing information by increasing the length of the sensing region to the side of the host vehicle after the intersection is sensed over the length of the sensing region to the side of the host vehicle before the intersection is sensed.

Also, the second information generation unit generates the second sensing information for increasing the number of times a vehicle is sensed for a certain period of time by decreasing a sensing cycle in which sensing is performed in the sensing region to the side of the host vehicle after the intersection is sensed below a sensing cycle in which sensing is performed in the sensing region to the side of the host vehicle before the intersection is sensed.

Also, based on the second sensing information, the control unit selects a vehicle close to the host vehicle and a vehicle approaching the host vehicle as target vehicles.

Also, the control unit determines whether a collision will occur between the host vehicle and a target vehicle, and performs control to warn a driver of the collision or to brake the host vehicle when it is determined that the collision will occur between the host vehicle and the target vehicle.

A vehicle control method according to the eleventh embodiment of the present disclosure includes capturing and sensing a region ahead of a host vehicle to sense lanes; increasing the sensing of a side of the host vehicle, choosing the side of the host vehicle as a critical sensing target, and intensively sensing the side of the vehicle when the intersection is sensed; and selecting a target vehicle on the basis of the sensing result, determining whether a collision will occur between the target vehicle and the host vehicle, and controlling the host vehicle.

Here, the sensing of the side of the host vehicle includes increasing the width of the sensing region to the side of the host vehicle after the intersection is sensed over the width of the sensing region to the side of the host vehicle before the intersection is sensed.

Also, the sensing of the side of the host vehicle includes increasing the length of the sensing region to the side of the host vehicle after the intersection is sensed over the length of the sensing region to the side of the host vehicle before the intersection is sensed.

Also, the sensing of the side of the host vehicle includes increasing the number of times sensing is performed for a certain period of time by decreasing a sensing cycle in which sensing is performed in the sensing region to the side of the host vehicle after the intersection is sensed below a sensing cycle in which sensing is performed in the sensing region to the side of the host vehicle before the intersection is sensed.

Also, the controlling of the host vehicle includes selecting a vehicle close to the host vehicle and a vehicle approaching the host vehicle as target vehicles on the basis of the sensing result.

Also, the controlling of the host vehicle includes determining whether a collision will occur between the host vehicle and a target vehicle, and performing control to warn a driver of the collision or to brake the host vehicle when it is determined that the collision will occur between the host vehicle and the target vehicle.

A driving assistance system according to a twelfth embodiment of the present disclosure is provided. The driving assistance system includes a camera system and further includes an ECU configured to determine a risk of collision with a nearby vehicle at an intersection on the basis of a traveling route of a host vehicle and a driver monitoring camera configured to sensing a first direction that a driver is watching at the intersection. The ECU controls the vehicle camera system to sense a second direction, which is different from the first direction.

According to a twelfth embodiment, when the vehicle camera system senses an object approaching the host vehicle from the second direction, the ECU generates a warning.

According to the twelfth embodiment, when there is a possibility of collision between the host vehicle and an object located in the second direction, the ECU controls both or either of the steering and braking of the host vehicle.

According to the twelfth embodiment, the driver monitoring camera senses a heading direction of the driver's face or a viewing direction of the driver's eyes to sense a direction that the driver is watching.

According to the twelfth embodiment, the first direction is a driver control range, and the second direction is a system control range. The ECU generates an alert when there is a collision possibility in the driver control range, and generates an alert and controls both or either of the steering and braking of the host vehicle when there is a collision possibility in the system control range.

According to the twelfth embodiment, the ECU determines, on a level basis, a collision risk possibility on the basis of a distance from a third-party vehicle that is collidable with the host vehicle. When a collision risk level in the system control range is the same as that in the driver control range, the ECU determines that the collision risk possibility in the system control range is higher than that in the driver control range.

Advantageous Effects

According to the first embodiment of the present disclosure, a voltage logic and a memory logic that may be used in a front-view camera system for an ADAS may be implemented.

Also, according to the first embodiment of the present disclosure, a scheme capable of coupling a lens barrel and a lens holder in a front-view camera system for an ADAS may be provided.

Also, according to the second embodiment of the present disclosure, a scheme capable of coupling a lens barrel and a lens holder in a front-view camera system for an ADAS may be provided.

Also, according to the second embodiment of the present disclosure, it is possible to avoid a collision with a target vehicle by controlling the steering of a host vehicle.

Also, according to the second embodiment of the present disclosure, it is possible to avoid a collision with a target vehicle by controlling the speed of a host vehicle.

Also, according to the second embodiment of the present disclosure, it is possible to avoid a collision between a host vehicle and a vehicle cutting from the next lane by controlling one or more of the speed, braking, and steering of the host vehicle when the vehicle in the next lane changes lanes.

According to the third embodiment of the present disclosure, it is possible to control a vehicle traveling in a left-hand lane to automatically enter a branch lane using state information acquired through a camera system.

According to the third embodiment of the present disclosure, it is possible to reduce a possibility of collision with another vehicle through first information and second information acquired by a camera system when a vehicle enters a branch lane.

According to the third embodiment of the present disclosure, it is possible to determine whether a left turn is allowed through second information acquired by a camera system after a vehicle enters a branch lane, and thus to control the steering of the vehicle.

Also, according to the fourth embodiment of the present disclosure, it is possible to control a start time of emergency braking according to a degree to which a road is slippery.

Also, according to the fourth embodiment of the present disclosure, it is possible to prevent a head-on/rear-end collision accident due to the increase in braking distance by advancing the emergency braking start time when it is determined that the road is slippery.

According to the fifth embodiment of the present disclosure, by sensing a third-party vehicle cutting ahead of a host vehicle through a camera system for sensing a region ahead of the host vehicle, it is possible to prevent a collision between the host vehicle and the third-party vehicle.

According to the fifth embodiment of the present disclosure, a lane ahead of a host vehicle and also a third-party vehicle cutting ahead of the host vehicle may be sensed, and the location of the host vehicle in the lane may be determined. Through such information, it is possible to prevent a collision between the host vehicle and the third-party vehicle through the deceleration, acceleration, and steering control of the host vehicle.

With the CTA system and method according to the sixth embodiment of the present disclosure, a risk of collision between a host vehicle and a nearby vehicle may be sensed, and a driver may be warned of the collision risk according to the level of the collision risk. Also, by controlling the steering of the host vehicle as well as issuing the warning for the collision risk according to the level of the collision risk, it is possible to avoid the collision.

According to the seventh embodiment of the present disclosure, autonomous emergency braking may be implemented on the basis of la longitudinal TTC and a lateral TTC between a host vehicle and a third-party vehicle in a front-view camera system for an ADAS.

According to the eighth embodiment of the present disclosure, data regarding an ambient situation of a host vehicle may be acquired through a camera system and a rear radar, and the ECU may determine a risk of collision between the host vehicle and a nearby vehicle.

According to the eighth embodiment of the present disclosure, when it is determined that there is a possibility of collision between the host vehicle and the nearby vehicle, the ECU may warn a driver of the collision to avoid the collision. Thus, it is possible to prevent an accident that may occur when an intersection is entered.

According to a ninth embodiment of the present disclosure, a time-to-collision of a host vehicle and a nearby vehicle may be calculated, and the steering and braking of the host vehicle may be controlled on the basis of the time-to-collision. Thus, it is possible to avoid a collision between the host vehicle and the nearby vehicle.

According to a tenth embodiment of the present disclosure, priorities for CTA control may be determined through communication between a host vehicle and nearby vehicles when the host vehicle enters an intersection, and a plurality of vehicles may systematically perform CTA control at the intersection according to the determined CTA priorities.

Also, according to the tenth embodiment of the present disclosure, by detecting a laterally appearing vehicle or pedestrian and then performing CTA control when a host vehicle enters an intersection, it is possible to prevent a collision.

With the vehicle control apparatus and method according to an eleventh embodiment of the present disclosure, the side of a host vehicle may be sensed to determine whether a collision will occur between the host vehicle and a target vehicle.

Also, when a collision between the host vehicle and the target vehicle is expected to occur, it is possible to prevent a collision between vehicles by generating an alert and performing emergency braking on the host vehicle.

According to the twelfth embodiment of the present disclosure, it is possible to watch directions, other than a direction that a driver is watching, by means of a camera system and thus to prevent a collision between a host vehicle and a third-party vehicle. Also, it is possible to prevent a collision between the host vehicle and the third-party vehicle by controlling the host vehicle through information acquired by the camera system.

DESCRIPTION OF THE DRAWINGS

FIG. 3 is a diagram showing components of the vehicle equipped with the camera system according to the first embodiment of the present disclosure.

FIG. 16 is a diagram showing an example in which a slippery road sign is recognized using a camera system according to a fourth embodiment of the present disclosure.

DETAILED DESCRIPTION

Figure 1:
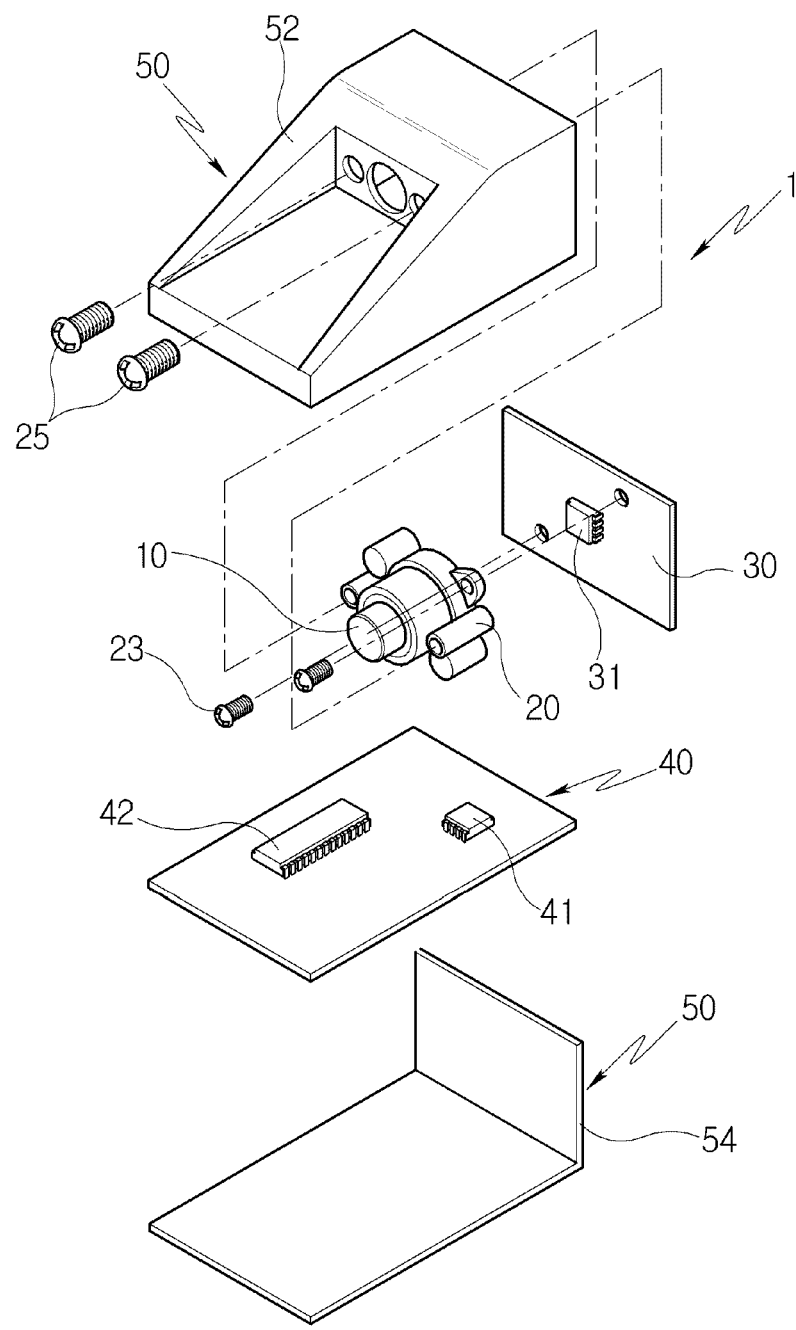
FIG. 1 is an exploded perspective view schematically showing a camera system according to a first embodiment of the present disclosure.

Hereinafter, exemplary embodiments will be described in detail with reference to the accompanying drawings so that they can be easily practiced by those skilled in the art. The present disclosure may, however, be embodied in many different forms and should not be construed as being limited to the embodiments set forth herein.

To clearly describe the present disclosure, portions irrelevant to the description are omitted, and the same or similar elements are denoted by the same reference numerals.

In this disclosure, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when one part is referred to as "comprising" (or "including" or "having") other elements, it should be understood that the part can comprise (or include or have) only those elements or other elements as well as those elements unless specifically described otherwise.

It will be understood that when one part is referred to as being "on" another part, it can be directly on another part or intervening parts may be present therebetween. In contrast, when a part is referred to as being "directly on" another part, there are no intervening parts therebetween.

It will be understood that, although the terms first, second, third, etc. may be used herein to describe various parts, components, regions, layers and/or sections, but are not limited thereto. These terms are only used to distinguish one part, component, region, layer, or section from another part, component, region, layer or section. Thus, a first part, component, region, layer, or section discussed below could be termed a second part, component, region, layer, or section without departing from the scope of the present disclosure.

The technical terms used herein are to simply mention a particular exemplary embodiment and are not meant to limit the present disclosure. An expression used in the singular encompasses the expression of the plural, unless it has a clearly different meaning in the context. In the specification, it is to be understood that the terms such as "including," "having," or the like, are intended to indicate the existence of specific features, regions, integers, steps, operations, elements, and/or components, and are not intended to preclude the possibility that one or more other specific features, regions, integers, steps, operations, elements, components, or combinations thereof may exist or may be added.

Spatially relative terms, such as "below", "above", and the like, may be used herein for ease of description to describe one part's relationship to another part(s) as illustrated in the figures. It will be understood that the spatially relative terms are intended to encompass different meanings or operations of a device in use in addition to the meanings depicted in the drawings. For example, if the device in the figures is turned over, parts described as "below" other parts would then be oriented "above" the other parts. Thus, the exemplary term "below" can encompass both an orientation of above and below. Devices may be otherwise rotated 90 degrees or by other angles and the spatially relative descriptors used herein are interpreted accordingly.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have idealized or excessively formal meanings unless clearly defined in the present application.

Hereinafter, exemplary embodiments will be described in detail with reference to the accompanying drawings so that they can be easily practiced by those skilled in the art to which the present disclosure pertains. The example embodiments may, however, be embodied in many different forms and should not be construed as being limited to the embodiments set forth herein.

First Embodiment

FIG. 1 is an exploded perspective view schematically showing a camera system according to the first embodiment of the present disclosure.

Referring to FIG. 1, a camera system 1 includes a lens 10, a lens holder 20 in which the lens 10 is to be installed, and an image sensor 31 coupled to the lens holder 20 and configured to sense an image of a subject captured by the lens 10. The image sensor 31 is disposed on an image printed circuit board (PCB) 30 and includes an image array sensor composed of pixels. For example, the image sensor 31 includes a complementary metal-oxide-semiconductor (CMOS) photo-sensor array or a charge-coupled device (CCD) photo-sensor array. Such an image sensor 31 is disposed in parallel with the lens 10. Also, the lens 10 and the lens holder 20 may be coupled to each other through active alignment.

Also, the camera system 1 includes a main PCB 40, and an image processor 41 and a camera micro-control unit (MCU) 42 are disposed on the main PCB 40. The image processor 41 may receive image data from the image sensor 31. To this end, the image processor 41 and the image sensor 31 may be connected through a connector (not shown). For example, the connector may be produced as a flexible PCB (FPCB) in order to maximize internal space utilization of the camera system. Through such a connector, an electric signal, power, a control signal, and the like may be transmitted or received. For example, a communication scheme between the image processor 41 and the image sensor 31 may be Inter-Integrated Circuit (I2C). The camera MCU 42 and the image processor 41 may communicate with each other in a communication scheme, such as Universal Asynchronous Receiver/Transmitter (UART) or Serial Peripheral Interface (SPI).

The camera MCU 42 may receive image data processed by the image processor 41 and transfer the image data to an electrical control unit (ECU) (not shown) located in a vehicle. For example, a communication scheme between the camera MCU 42 and the ECU of the vehicle may be Chassis Controller Area Network (CAN). Also, the camera MCU 42 receives data processed by the image processor 41. The data includes, for example, data regarding vehicles ahead, data regarding lanes ahead, data regarding cyclists ahead, data regarding traffic signs, data regarding Active High Beam Control (AHBC), data regarding wheel detection (e.g., data for quickly recognizing a close cut-in vehicle entering the field of view (FOV) of a camera through vehicle wheel recognition), data regarding traffic lights, data regarding road marks (e.g., an arrow on a road), data regarding VD at any angle (data for recognizing a vehicle ahead according to a previous traveling direction or angle of the vehicle), data regarding road profile (e.g., data for recognizing a road shape ahead (a curve, a speed bump, or a hole) and thus enhancing ride quality through suspension control), data regarding semantic free space (e.g., boundary labeling), data regarding general objects (a vehicle to a side, or the like), data regarding advanced path planning (e.g., data for predicting an expected vehicle traveling route through deep learning using surrounding environments even on lane-free or polluted roads), data regarding odometry (e.g., data for recognizing a driving road landmark and fusing the driving road landmark with GPS recognition information), and the like.

Also, the camera system 1 includes a housing 50, and the housing 50 includes an upper housing 52 and a lower housing 54. In detail, a pre-determined accommodation space is formed in the housing 50 composed of the upper housing 52 and the lower housing 54 coupled to each other, and the lens 10, the lens holder 20, the image PCB 30, and the main PCB 40 are accommodated in the accommodation space.

When the camera system 1 is manufactured, the lens 10 may be installed in the lens holder 20, and then the lens holder 20 may be coupled to the image PCB 30. For example, the lens holder 20 and the image PCB 30 may be coupled through a screw 23.

Subsequently, the upper housing 52 may be coupled to the lens holder 20 while the lens holder 20 and the image PCB 30 are coupled to each other. In this case, the upper housing 52 and the lens holder 20 may be coupled through a screw 25.

The number of lenses 10 used may be changed depending on the type of the camera system 1, the number of pixels of the image sensor, or requirements of a function implemented by the camera system 1. For example, when a single lens 10 is used, the lens may be 52 deg when 1.3 MP is required, or for example, 100 deg when 1.7 MP is required. Alternatively, two lenses 10 may be used. Alternatively, when three lenses 10 are used, three image sensors 31 are required, and the lenses may be 28 deg, 52 deg, and 150 deg or 50 deg, 100 deg, and 150 deg, The type of the camera system 1 is determined the number or types of advanced driving assistance system (ADAS) functions supported by the camera system 1. For example, when only some of the ADAS functions are supported (when the data processed by the image processor 41 is data regarding vehicles ahead, data regarding lanes ahead, data regarding cyclists ahead, data regarding traffic signs, data regarding AHBC, data regarding wheel detection (e.g., data for quickly recognizing a close cut-in vehicle entering the FOV of a camera through vehicle wheel recognition), data regarding traffic lights, or data regarding road marks (e.g., an arrow on a road)), a single lens may be used. When more functions are supported (in addition to the above-described example, when the data processed by the image processor 41 is data regarding VD at any angle (data for recognizing a vehicle ahead according to a previous traveling direction or angle of the vehicle), data regarding road profile (e.g., data for recognizing a road shape ahead (a curve, a speed bump, or a hole) and thus enhancing ride quality through suspension control), data regarding semantic free space (e.g., boundary labeling), data regarding general objects (a vehicle to a side, or the like), data regarding advanced path planning (e.g., data for predicting an expected vehicle traveling route through deep learning using surrounding environments even on lane-free or polluted roads), or data regarding odometry (e.g., data for recognizing a driving road landmark and fusing the driving road landmark with GPS recognition information)), and the like, three lenses may be used.

Figure 2:
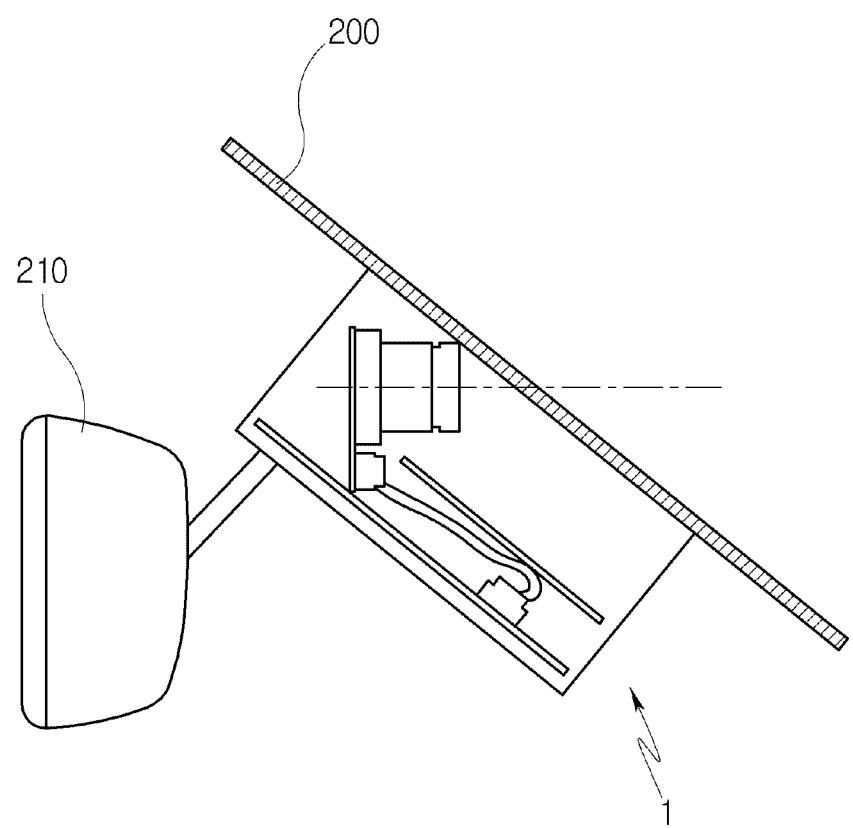
FIG. 2 is a diagram showing an example in which a vehicle is equipped with the camera system according to the first embodiment of the present disclosure.

FIG. 2 is a diagram showing an example in which a vehicle is equipped with the camera system 1 according to the first embodiment of the present disclosure.

As shown in FIG. 2, the camera system 1 may be installed below a windshield 220 or near a rear-view mirror 210 in a vehicle. Thus, the camera system 1 is used to capture a field of view ahead of the vehicle and is used to recognize an object present within the field of view ahead. Also, in case of rain or dust, it is preferable that the camera system be installed in the vehicle according to a region cleaned by a windshield wiper operating outside the windshield 220. The location where the camera system 1 is installed is not limited thereto. The camera system 1 may be installed in a different location in order to capture a region ahead of, to a side of, and behind the vehicle.

Meanwhile, a radar apparatus (not shown), which is a sensor apparatus that uses electromagnetic waves to measure the distance, velocity, and angle of an object, may be typically located at a front grille of the vehicle to cover even a front lower part of the vehicle. The reason why the radar apparatus is disposed at the front grill, that is, outside the vehicle, in other words, the reason why the radar apparatus is not allowed to transmit and receive signals through the windshield 220 of the vehicle is a reduction in sensitivity when electromagnetic waves pass through glass. According to the present disclosure, the electromagnetic waves may be prevented from passing through the windshield 220 although the radar apparatus is located inside the vehicle, in particular, below the windshield inside the vehicle. To this end, the radar apparatus is configured to transmit and receive electromagnetic waves through an opening provided in an upper portion of the windshield 220. Also, a cover is disposed at a location corresponding to the opening for the radar apparatus. The cover is to prevent loss (e.g., an inflow of air, or the like) due to the opening. Also, it is preferable that the cover be made of a material capable of easily transmitting electromagnetic waves of frequencies the radar apparatus uses. As a result, the radar apparatus is located inside the vehicle, but electromagnetic waves are transmitted and received through the opening provided in the windshield 220. The cover corresponding to the opening is provided in order to prevent the loss due to the opening, and the electromagnetic waves are transmitted and received through the cover. The radar apparatus may use beam aiming, beam selection, digital beam forming, and digital beam steering. Also, the radar apparatus may include an array antenna or a phased array antenna.

The above-described camera system 1 and the radar apparatus (not shown) may interoperate with each other in order to improve performance to sense objects ahead. For example, the image processor 41 and a radar processor (not shown) may interoperate with each other to enlarge or focus an object of interest ahead. When the radar apparatus and the front-view camera interoperate with each other, the image sensor 31 and the radar apparatus may be disposed on the same substrate (e.g., the image PCB 30).

Also, an apparatus or system for sensing an object within a field of view ahead, such as the camera system 1 or the radar apparatus (not shown), may be used for the ADAS technology such as Adaptive Cruise Control (ACC). Also, the apparatus or system may be used to recognize a potential dangerous situation ahead. For example, the apparatus or system may be used to recognize another vehicle, a person, and an animal ahead. Also, the apparatus or system for sensing an object within a field of view ahead, such as the camera system 1 or radar apparatus (not shown) may be used in a lane departure warning system, an object detection system, a traffic sign recognition system, a lane keeping assistance system a lane change assistance system, a blind spot warning system, an automatic headlamp control system, a collision prevention system, or the like.

FIG. 3 is a diagram showing components of the vehicle equipped with the camera system 1 according to the first embodiment of the present disclosure.

The components of the vehicle may be classified into MCU level, ECU level, and controller level.

The MCU level includes a lidar MCU, a radar MCU, a GPS MCU, a navigation MCU, and a V2X MCU, as well as a camera MCU 42. Each of the MCUs belonging to the MCU level controls a sensing apparatus connected to a corresponding MCU or an apparatus (e.g., a processor) connected to the sensing apparatus and receives data from the sensing apparatus or the apparatus connected to the sensing apparatus.

The camera MCU 42 will be described as an example. The image sensor 31 senses an image of a subject captured through the lens 10, the image processor 41 receives the data from the image sensor 31 and processes the received data, and the camera MCU 42 receives the data from the image processor 41. The camera MCU 42 controls the image sensor 31 and the image processor 41, and the control includes, for example, power supply control, reset control, clock (CLK) control, data communication control, power control, memory control, and the like. The image processor 41 may process data sensed and output by the image sensor 31, and the processing includes a process of enlarging a sensed object ahead or a process of focusing on a region of the object within the entire region of view.

The lidar MCU 311 will be described as an example. The lidar MCU 311 is connected to a lidar apparatus, which is a kind of sensor. The lidar apparatus may be composed of a laser transmission module, a laser detection module, a signal collection and processing module, and a data transmission and reception module. Laser light sources with wavelengths of 250 nm to 11 µm or variable wavelengths are used. Also, the lidar apparatus is classified into a time of fight (TOF) scheme and a phase shift scheme according to a signal modulation scheme. The lidar MCU 311 controls the lidar apparatus and another apparatus (e.g., a lidar processor (not shown) for processing a lidar sensing output) connected to the lidar apparatus. The control includes, for example, power supply control, reset control, clock (CLK) control, data communication control, memory control, or the like. Meanwhile, the lidar apparatus is used to sense a region ahead of the vehicle. The lidar apparatus is located at a front inner side of the vehicle, in particular, below the windshield 220 to transmit and receive laser light through the windshield 220.

The radar MCU 312 will be described as an example. The radar MCU 312 is connected to a radar apparatus, which is a kind of sensor. The radar apparatus is a sensor apparatus that uses electromagnetic waves to measure the distance, speed, or angle of an object. The radar apparatus may be used to sense objects ahead within a horizontal angle of 30 degrees and a distance of 150 meters by Frequency Modulation Carrier Wave (FMCW) or Pulse Carrier. The radar MCU 312 controls the radar apparatus and another apparatus (e.g., a radar processor (not shown) for processing a radar sensing output) connected to the radar apparatus. The control includes, for example, power supply control, reset control, clock (CLK) control, data communication control, memory control, or the like. Meanwhile, the radar apparatus typically uses a 77-GHz band radar or other appropriate frequency bands to sense a region ahead of the vehicle. The information acquired from the radar apparatus may be used for the ADAS technology such as ACC. Also, the radar processor may process data sensed and output by the radar apparatus. The processing includes a process of enlarging a sensed object ahead or a process of focusing on a region of the object within the entire region of view.

The GPS MCU 313 will be described as an example. The GPS MCU 313 is connected to a GPS apparatus, which is a kind of sensor. The GPS apparatus is an apparatus for measuring the location, speed, and time of a vehicle through communication with a satellite. In detail, the GPS apparatus is an apparatus for measuring a delay time of radio waves emitted from a satellite and obtaining a current location from a distance from an obit. The GPS MCU 313 controls the GPS apparatus and another apparatus (e.g., a GPS processor (not shown) for processing a GPS sensing output) connected to the GPS apparatus. The control includes, for example, power supply control, reset control, clock (CLK) control, data communication control, memory control, or the like.

The navigation MCU 314 will be described as an example. The navigation MCU 314 is connected to a navigation apparatus, which is a kind of sensor. The navigation apparatus is an apparatus for displaying map information through a display apparatus installed at a front side inside the vehicle. In detail, the map information is stored in a memory apparatus, and represents the current location of the vehicle measured through the GPS apparatus in map data. The navigation MCU 314 controls the navigation apparatus and another apparatus (e.g., a navigation processor (not shown) for processing a navigation sensing output) connected to the navigation apparatus. The control includes, for example, power supply control, reset control, clock (CLK) control, data communication control, memory control, or the like.

The V2X MCU 315 will be described as an example. The V2X MCU 315 is connected to a V2X apparatus, which is a kind of sensor. In detail, the V2X apparatus is an apparatus for performing vehicle-to-vehicle communication (V2V communication), vehicle-to-infrastructure (V2I) communication, or vehicle-to-mobile (V2M) communication. The V2X MCU 315 controls the V2X apparatus and another apparatus (e.g., a V2X processor (not shown) for processing a V2X sensing output) connected to the V2X apparatus. The control includes, for example, power supply control, reset control, clock (CLK) control, data communication control, memory control, or the like.

An electrical control unit (ECU) 320 belonging to the ECU level is an apparatus for integrally controlling a plurality of electronic apparatuses used in the vehicle. For example, the ECU 320 may control all of the MCUs belonging to the MCU level and controllers belonging to the controller level. The ECU 320 receives the sensing data from the MCUs, generates a control command for controlling a controller according to a situation, and transmits the control command to the controller. In this specification, for convenience of description, the ECU level is described as a level higher than the MCU level. However, one of the MCUs belonging to the MCU level may serve as an ECU, and two of the MCUs may serve as an ECU in combination.

In the controller level, there are a driver warning controller 331, a head lamp controller 332, a vehicle posture controller 333, a steering controller 334, an engine controller 335, a suspension controller 336, a brake controller 337, and the like. The controller controls the components of the vehicle on the basis of the control commands received from the MCUs in the MCU level or the ECU 320.

The driver warning controller 331 will be described as an example. The driver warning controller 331 generates an audio warning signal, a video warning signal, or a haptic warning signal in order to warn a driver of a specific dangerous situation. For example, the driver warning controller 331 may use a vehicle sound system to output warning sounds. Alternatively, in order to display a warning message, the driver warning controller 331 may output a warning message through a head-up display (HUD) or a side mirror display. Alternatively, in order to generate a warning vibration, the driver warning controller 331 may operate a vibration motor mounted on a steering wheel.

The head lamp controller 332 will be described as an example. The head lamp controller 332 is located at a front side of the vehicle to control a head lamp for securing a driver's field of view ahead of the vehicle at night. For example, the head lamp controller 332 may perform high beam control, low beam control, left and right auxiliary light control, adaptive head lamp control, or the like.

The vehicle posture controller 333 will be described as an example. The vehicle posture controller 333 is referred to as vehicle dynamic control (VDC) or electrical stability control (ESP), and performs control to correct the vehicle's behavior through electronic equipment when the vehicle's behavior suddenly becomes unstable due to a road condition or a driver's urgent steering wheel operation. For example, sensors such as a wheel speed sensor, a steering angle sensor, a yaw rate sensor, and a cylinder pressure sensor sense a steering wheel operation. When the running direction of the steering wheel does not match that of the wheels, the vehicle posture controller 333 performs control to disperse the braking force of each wheel using an anti-lock braking system (ABS) or the like.

The steering controller 334 will be described as an example. The steering controller 334 controls an electronic power steering system (MPDS) for driving the steering wheel. For example, when the vehicle is expected to collide, the steering controller 334 controls the steering of the vehicle such that the collision may be avoided or such that damage may be minimized.

The engine controller 335 will be described as an example. The engine controller 335 serves to control elements such as an injector, a throttle, a spark plug, or the like according to control commands when the ECU 320 receives data from an oxygen sensor, an air quantity sensor, and a manifold absolute pressure sensor.

The suspension controller 336 will be described as an example. The suspension controller 336 is an apparatus for performing motor-based active suspension control. In detail, by variably controlling the damping force of a shock absorber, the suspension controller 336 provides smooth ride quality during normal running and provides hard ride quality during high-speed running or upon posture changes. Thus, it is possible to ensure ride comfort and driving stability. Also, the suspension controller 336 may perform vehicle height control, posture control, or the like as well as the damping force control.

The brake controller 337 will be described as an example. The brake controller 337 controls whether to operate the brake of the vehicle and controls the pedal effort of the brake. For example, when a forward collision is probable, the brake controller 337 may perform control so that emergency braking is automatically activated according to a control command of the ECU 320 irrespective of whether the driver operates the brake.

As described above with reference to the drawings, the MCU, ECU, and controller have been described as independent elements. However, it should be understood that the present disclosure is not limited thereto. Two or more MCUs may be integrated into a single MCU and may interoperate with each other. Two or more MCUs and an ECU may be integrated as a single apparatus. Two or more controllers may be integrated into a single controller and may interoperate with each other. Two or more controllers and an ECU may be integrated as a single apparatus.

For example, the radar processor processes an output of the radar apparatus, and the image processor 41 processes an output of the image sensor 31. The output of the radar apparatus and the output of the image sensor 31 may interoperate with a single processor (e.g., the radar processor, the image processor 41, an integrated processor, or the ECU 320). For example, the radar processor processes data sensed and output by the radar apparatus. Based on information regarding an object ahead, which is derived from a result of the processing, the image processor 41 may perform a process of enlarging or focusing on data sensed and output by the image sensor 31. On the other hand, the image processor 41 processes the data sensed and output by the image sensor 31. Based on information regarding an object ahead, which is derived from a result of the processing, the radar processor may perform a process of enlarging or focusing on data sensed and output by the radar apparatus. To this end, the radar MCU may control the radar apparatus to perform beam aiming or beam selection. Alternatively, the radar processor may perform digital beam forming or digital beam steering in an array antenna or a phased array antenna system. In this way, when the radar apparatus and the front-view camera interoperate with each other, the image sensor 31 and the radar apparatus may be disposed on the same substrate (e.g., the image PCB 30).

Figure 4A:
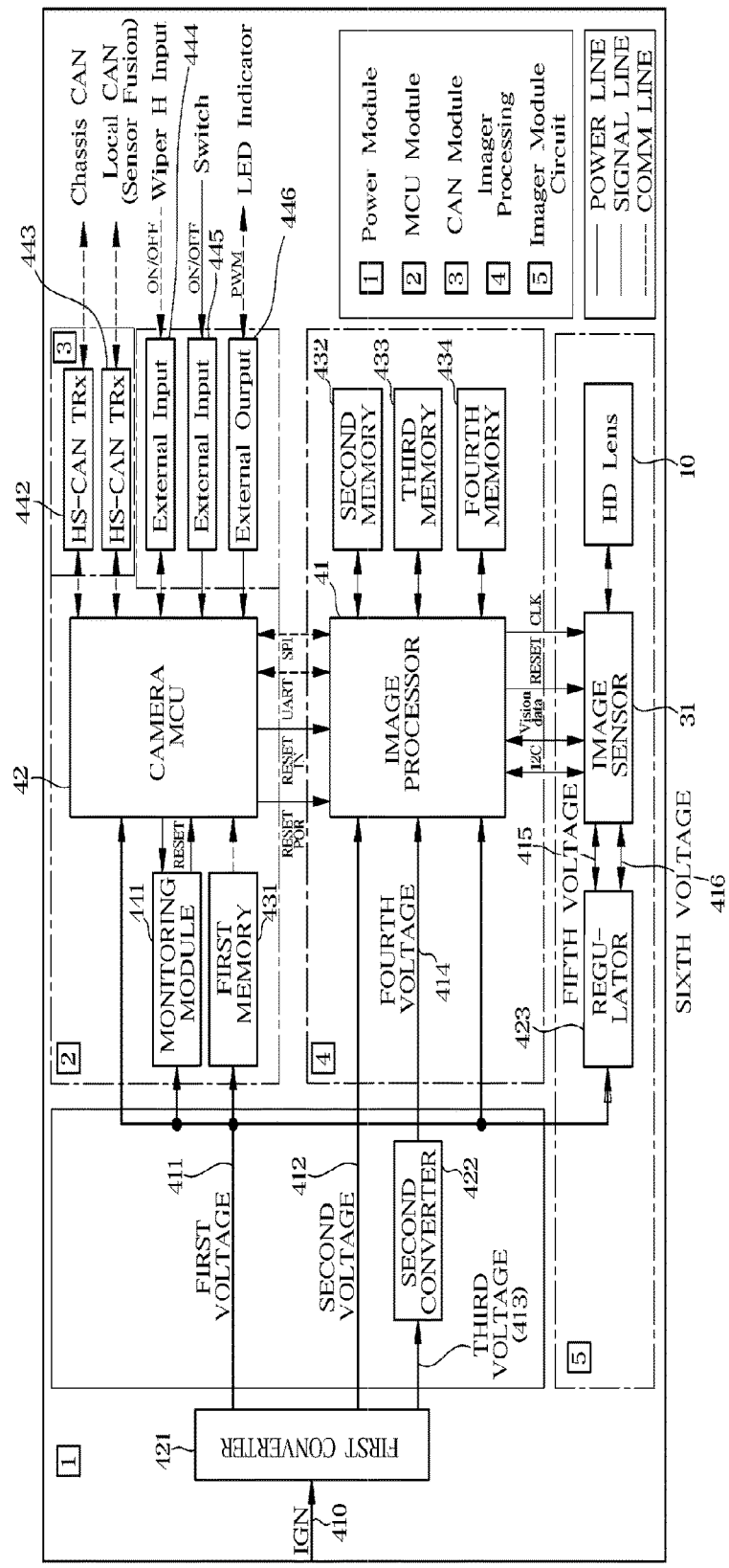
FIG. 4A is a diagram showing components of the camera system according to the first embodiment of the present disclosure.

FIG. 4A is a diagram showing components of the camera system 1 according to the first embodiment of the present disclosure.

Referring to FIG. 4A, the camera system 1 includes a lens 10, an image sensor 31, an image processor 41, and a camera MCU 42.

Also, the camera system 1 includes a first converter unit 421 configured to receive an ignition voltage 410 and convert the ignition voltage 410 into a first voltage 411, a second voltage 412, and a third voltage 413, a second converter unit 422 configured to receive the third voltage 413 and convert the third voltage 413 into a fourth voltage 414, and a regulator unit 423 configured to receive the first voltage 411 and convert the first voltage 411 into a fifth voltage 415 and a sixth voltage 416. As shown in FIG. 4A, the first converter unit 421 may be composed of a single 3ch DC-DC converter. However, the present disclosure is not limited thereto, and the first converter unit 421 may be composed of a 1ch DC-DC converter and a 2ch DC-DC converter or may be composed of three 1 ch DC-DC converters. As shown in FIG. 4A, the regulator unit 423 may be composed of a 2ch low-dropout (LDO). However, the present disclosure is not limited thereto, and the regulator unit 423 may be composed of two 1ch LDOs. The reason why the regulator unit 423 is implemented with an LDO is that an electric current level required by the image sensor 31 is not high.

The ignition voltage 410, which is a voltage generated when the driver starts the vehicle by turning a vehicle key or pushing a start button, may be generally 14 V. The first voltage 411, which is a voltage into which the first converter unit 421 receives and converts the ignition voltage 410, may be 3.3 V. The first voltage 411 may be input to the camera MCU 42 and may be used as power for operating the camera MCU 42. Also, the first voltage 411 may be used as power for operating a monitoring module 441 and a first memory 431. Also, the first voltage 411 may be used as power for operating the image processor 41. The reason why the same operating power, that is, the first voltage 411 is applied to the camera MCU 42 and the image processor 41 is to allow the two communication components to have the same communication level (IO voltage). The second voltage 412, which is a voltage into which the first converter unit 421 receives and converts the ignition voltage 410, may be 1.8 V. Meanwhile, as described below, the fifth voltage (e.g., 1.8 V) is applied to the image sensor 31, and this voltage is the same as the second voltage. The reason why the second voltage 412 applied to the image processor 41 is the same as the fifth voltage 415 applied to the image sensor 31 is to allow the image processor 41 and the image sensor 31 to have the same communication level (IO voltage). The third voltage 413, which is a voltage into which the first converter unit 421 receives and converts the ignition voltage 410, may be 5 V. The third voltage 413 may be applied to the second converter unit 422, and the second converter unit 422 may output the fourth voltage 414. The fourth voltage 414 is applied to the image processor 41 and is operable as core power of the image processor 41. For example, the fourth voltage 414 may be 1.2 V. Meanwhile, the reason why the first converter unit 421 outputs the third voltage 413 and the second converter unit 422, which receives the third voltage 413, outputs the fourth voltage 414 even if the first converter unit 421 is capable of directly outputting the fourth voltage 414, is to satisfy an allowable electric current required by the image processor 41. In addition, the reason is to use the third voltage 413 as power for operating other components (e.g., HS-CAN TRx).

The first voltage 411 is applied to the regulator unit 423, and the regulator unit 423 outputs the fifth voltage 415 and the sixth voltage 416. The fifth voltage 415 may be 1.8 V, and the sixth voltage 416 may be 2.8 V. The fifth voltage 415 is applied to the image sensor 31 to allow the image sensor 31 and the image processor 41 to have the same communication level. The sixth voltage 416 is applied to the image sensor 31 and is operable as core power of the image sensor 31. As a result, the camera MCU 42 and the image processor 41 have the same communication level set to the first voltage 411, and the image processor 41 and the image sensor 31 have communication levels set to the second voltage 412 and the fifth voltage 415 equal to the second voltage 412.

Also, the camera system 1 includes a first memory 431 connected to the camera MCU 42 and configured to receive the first voltage 411, a second memory 432 connected to the image processor 41, a third memory 433 connected to the image processor 41, and a fourth memory 434 connected to the image processor 41. The first memory 431 may be an electrically erasable programmable read-only memory (EEPROM), the second memory 432 may be a low power double-data-rate 2 (LPDDR2), the third memory 433 may be an LPDDR2, and the fourth memory 434 may be a flash memory. The first memory 431 is connected to the camera MCU 42 to store MCU logic data (an algorithm for controlling a controller) and MCU basic software (a startup algorithm for driving the image processor 41, the image sensor 31, and the like). The second memory 432 is connected to the image processor 41 and serves to execute a function implementation algorithm stored in the fourth memory 434 according to a command from the image processor 41. The third memory 433 is connected to the image processor 41 and serves to execute the function implementation algorithm stored in the fourth memory 434 according to a command from the image processor 41. The fourth memory 434 is connected to the image processor 41 to store algorithm data (e.g., LD, PD, VD, TSR, or the like) used by the image processor 41 to implement functions. The second memory 432 and the third memory 433 may have capacity determined depending on the number of functions supported by the camera system 1. For example, when only some of the functions are supported (when the data processed by the image processor 41 is data regarding vehicles ahead, data regarding lanes ahead, data regarding cyclists ahead, data regarding traffic signs, data regarding AHBC, data regarding wheel detection (e.g., data for quickly recognizing a close cut-in vehicle entering the FOV of a camera through vehicle wheel recognition), data regarding traffic lights, or data regarding road marks (e.g., an arrow on a road)), the second memory 432 and the third memory 433 may be each 128 MB. When more functions are supported (in addition to the above-described example, when the data processed by the image processor 41 is data regarding VD at any angle (data for recognizing a vehicle ahead according to a previous traveling direction or angle of the vehicle), data regarding road profile (e.g., data for recognizing a road shape ahead (a curve, a speed bump, or a hole) and thus enhancing ride quality through suspension control), data regarding semantic free space (e.g., boundary labeling), data regarding general objects (a vehicle to a side, or the like), data regarding advanced path planning (e.g., data for predicting an expected vehicle traveling route through deep learning using surrounding environments even on lane-free or polluted roads), or data regarding odometry (e.g., data for recognizing a driving road landmark and fusing the driving road landmark with GPS recognition information)), the second memory 432 and the third memory 433 may be each 256 MB. Also, the second memory 432 and the third memory 433 may be integrated into a single memory depending on the number of lenses 10. When only one lens 10 is used, a total of two memories, i.e., the second memory 432 and the third memory 433 may be used (e.g., 2×218 MB). When two lenses 10 are used, a single memory having a larger capacity than those of the two memories may be used (e.g., 1×512 MB). Also, when three lenses 10 are used, two memories having large capacity may be used (e.g., 2×512 MB). That is, the second memory 432 and the third memory 433 may be changed in number and capacity depending on the number of lenses.

Also, the camera system 1 includes a monitoring module 441 connected to the camera MCU 42, a high-speed CAN transceiver (HS-CAN_TRx) 442 connected to the camera MCU 42 to perform chassis CAN communication, a high-speed CAN transceiver 443 connected to the camera MCU 42 to perform local CAN communication, an external input unit 444 connected to the camera MCU 42 to receive a windshield wiper operation input, an external input unit 445 connected to the camera MCU 42 to receive an on/off switching input, and an external output unit 446 connected to the camera MCU 42 to output a light-emitting diode (LED) signal. The reason why the camera MCU 42 receives a windshield wiper operation input is that when a windshield wiper ON signal is received, recognition of a region ahead through the camera system 1 is degraded due to rain and thus there is a need to turn off the camera MCU 42 or switch off a specific function of the camera MCU 42.

Figure 4B:
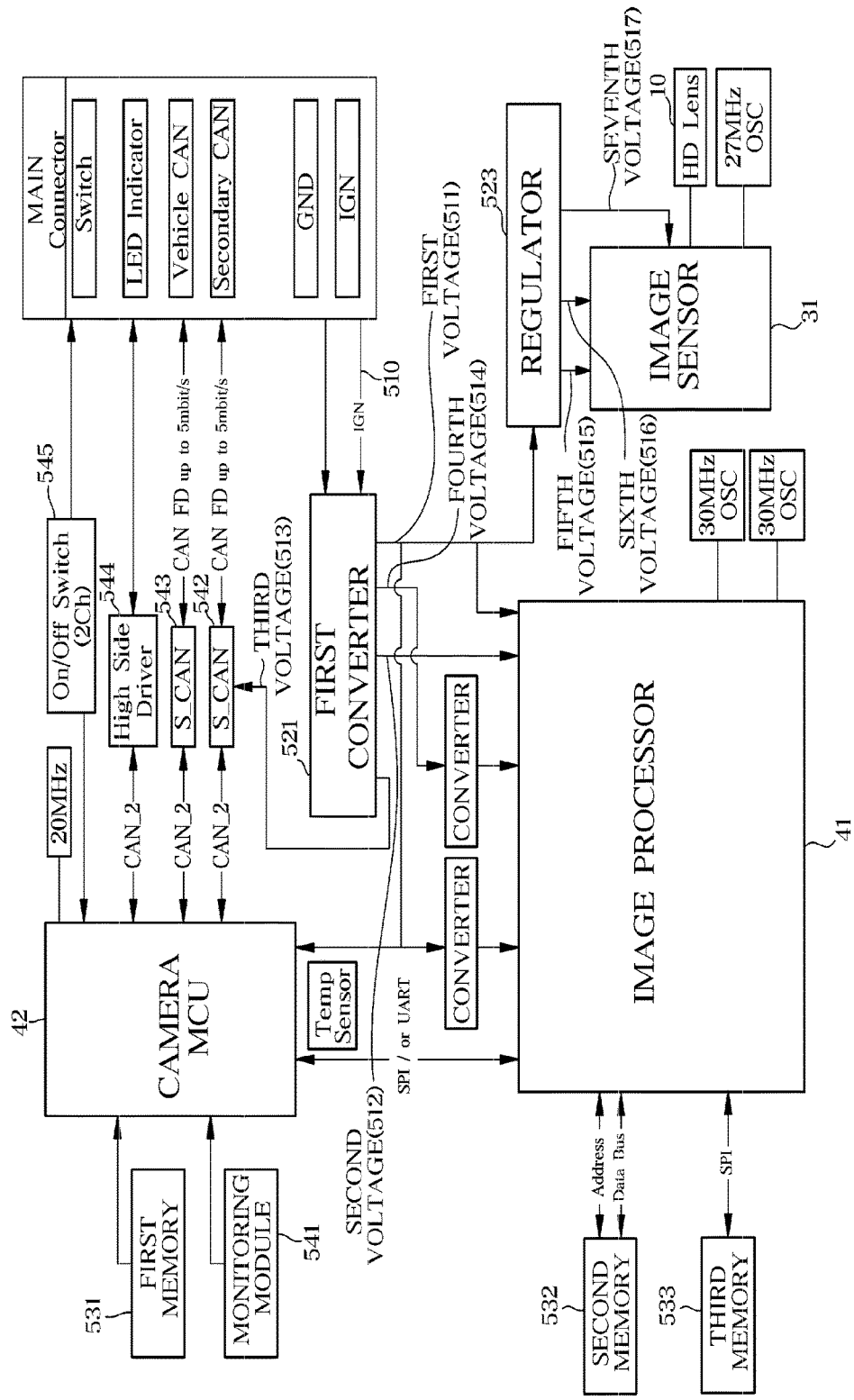
FIG. 4B is a diagram showing components of the camera system according to the first embodiment of the present disclosure.

FIG. 4B is a diagram showing components of the camera system 1 according to the first embodiment of the present disclosure.

Referring to FIG. 4B, the camera system 1 may include a lens 10, an image sensor 31, an image processor 41, and a camera MCU 42.

Also, the camera system 1 includes a first converter unit 421 configured to receive an ignition voltage 510 and covert the ignition voltage 510 into a first voltage 511, a second voltage 512, a third voltage 513, and the fourth voltage 514 and a regulator unit 523 configured to receive the first voltage 511 and convert the first voltage 511 into a fifth voltage 515, a sixth voltage 516, and a seventh voltage 517. As shown in FIG. 4B, the first converter unit 521 may be composed of a single 4ch DC-DC converter. However, the present disclosure is not limited thereto, and the first converter unit 521 may be composed of a 1ch DC-DC converter and a 3ch DC-DC converter, may be composed of two 2ch DC-DC converters, or may be composed of four 1ch DC-DC converters. Alternatively, the first converter unit 521 may be composed of a 4ch power management integrated circuit (PMIC). By using a PMIC, it is advantageously possible to mount a plurality of buck regulators, mount a boost regulator, support a universal serial bus (USB) function, and provide an I2C function for power setting. As shown in FIG. 4B, the regulator unit 523 may be composed of a 3ch LDO. However, the present disclosure is not limited thereto, and the regulator unit 523 may be composed of three 1ch LDOs.

The reason why the regulator unit 523 is implemented with an LDO is that an electric current level required by the image sensor 31 is not high.

The ignition voltage 510, which is a voltage generated when the driver starts the vehicle by turning the vehicle key or pushing the start button, may be generally 14 V. The first voltage 511, which is a voltage into which the first converter unit 521 receives and converts the ignition voltage 510, may be 3.3 V. The first voltage 511 may be input to the camera MCU 42 and may be used as power for operating the camera MCU 42. Also, the first voltage 511 may be used as power for operating a monitoring module 541 and a first memory 531. Also, the first voltage 511 may be used as power for operating the image processor 41. The reason why the same operating power, that is, the first voltage 511 is applied to the camera MCU 42 and the image processor 41 is to allow the two communication components to have the same communication level (IO voltage). The second voltage 512, which is a voltage into which the first converter unit 521 receives and converts the ignition voltage 510, may be 1.8 V. As described below, the fifth voltage 515 (e.g., 1.8 V) is applied to the image sensor 31, and this voltage is the same as the second voltage 512. The reason why the second voltage 512 applied to the image processor 41 is the same as the fifth voltage 515 applied to the image sensor 31 is to allow the image processor 41 and the image sensor 31 to have the same communication level (IO voltage). The third voltage 513, which is a voltage into which the first converter unit 521 receives and converts the ignition voltage 510 and which the first converter unit 521 outputs, may be 5 V. The third voltage 513 may be used as power for driving components (e.g., an S-CAN communication module, a C-CAN communication module, a high side driver, and the like) used by the camera MCU 42 to perform communication. The fourth voltage 514, which is a voltage into which the first converter unit 521 receives and converts the ignition voltage 510 and which the first converter unit 521 outputs, may be 2.8V. The fourth voltage 514 may be converted into 1.1 V through a converter and then may be applied to the image processor 41. The voltage of 1.1 V operates as core power of the image processor 41. The reason why the first converter unit 521 lowers the fourth voltage 514 (2.8 V) to the core power (1.1 V) of the image processor through a separate converter even if the first converter unit 521 can directly output the core power (1.1 V) is to satisfy an allowable electric current required by the image processor 41.

The first voltage 511 is applied to the regulator unit 523, and the regulator unit 523 outputs the fifth voltage 515, the sixth voltage 516, and the seventh voltage 517. The fifth voltage 515 may be 1.8 V, the sixth voltage 516 may be 2.8 V, and the seventh voltage 517 may be 1.2 V. The fifth voltage 515 is applied to the image sensor 31 and is operable to allow the image sensor 31 and the image processor 41 to have the same communication level. The sixth voltage 516 is applied to the image sensor 31 and is operable as core power of the image sensor 31. As a result, the camera MCU 42 and the image processor 41 have the same communication level set to the first voltage 511, and the image processor 41 and the image sensor 31 have communication levels set to the second voltage 512 and the fifth voltage 515 equal to the second voltage 412.

Also, the camera system 1 includes a first memory 531 connected to the camera MCU 42 and configured to receive the first voltage 511, a second memory 532 connected to the image processor 41, and a third memory 533 connected to the image processor 41. The first memory 531 may be an EEPROM, the second memory 532 may be a low power double-data-rate 4 (LPDDR4), and the third memory 533 may be a flash memory. The first memory 531 is connected to the camera MCU 42 to store MCU logic data (an algorithm for controlling a controller) and MCU basic software (a startup algorithm for driving the image processor 41, the image sensor 31, and the like). The second memory 532 is connected to the image processor 41 and serves to execute a function implementation algorithm stored in the third memory 533 according to a command from the image processor 41. The third memory 533 is connected to the image processor 41 to store algorithm data (e.g., LD, PD, VD, TSR, or the like) used by the image processor 41 to implement functions. The second memory 532 may have capacity determined depending on the number of functions supported by the camera system 1. For example, when only some of the functions are supported (when the data processed by the image processor 41 is data regarding vehicles ahead, data regarding lanes ahead, data regarding cyclists ahead, data regarding traffic signs, data regarding AHBC, data regarding wheel detection (e.g., data for quickly recognizing a close cut-in vehicle entering the FOV of a camera through vehicle wheel recognition), data regarding traffic lights, or data regarding road marks (e.g., an arrow on a road)), the second memory 532 may be 128 MB. When more functions are supported (in addition to the above-described example, when the data processed by the image processor 41 is data regarding VD at any angle (data for recognizing a vehicle ahead according to a previous traveling direction or angle of the vehicle), data regarding road profile (e.g., data for recognizing a road shape ahead (a curve, a speed bump, or a hole) and thus enhancing ride quality through suspension control), data regarding semantic free space (e.g., boundary labeling), data regarding general objects (a vehicle to a side, or the like), data regarding advanced path planning (e.g., data for predicting an expected vehicle traveling route through deep learning using surrounding environments even on lane-free or polluted roads), or data regarding odometry (e.g., data for recognizing a driving road landmark and fusing the driving road landmark with GPS recognition information)), the second memory 432 may be 256 MB.

Also, the camera system 1 includes a monitoring module 541 connected to the camera MCU 42, a high-speed CAN transceiver (HS-CAN_TRx) 542 connected to the camera MCU 42 to perform chassis CAN communication, a high-speed CAN transceiver 543 connected to the camera MCU 42 to perform local CAN communication, a high side driver 544 connected to the camera MCU 42 to output an LED signal, and an external input unit 545 connected to the camera MCU 42 to receive an on/off switching input. Also, the camera system 1 may include an external input receiver (not shown) connected to the camera MCU 42 to receive a wire input. The reason why the camera MCU 42 receives a windshield wiper operation input is that when a windshield wiper ON signal is received, recognition of a region ahead through the camera system 1 is degraded due to rain and thus there is a need to turn off the camera MCU 42 or switch off a specific function of the camera MCU 42.

The above-described camera system 1 may be used to implement at least one of the following functions: Road Boundary Departure Prevention Systems (RBDPS), Cooperative Adaptive Cruise Control Systems (CACC), Vehicle/roadway warning systems, Partially Automated Parking Systems (PAPS), Partially Automated Lane Change Systems (PALS), Cooperative Forward Vehicle Emergency Brake Warning Systems (C-FVBWS), Lane Departure Warning Systems (LDWS), Pedestrian Detection and Collision Mitigation Systems (PDCMS), Curve Speed Warning Systems (CSWS), Lane Keeping Assistance Systems (LKAS), Adaptive Cruise Control systems (ACC), Forward Vehicle Collision Warning Systems (FVCWS), Maneuvering Aids for Low Speed Operation systems (MALSO), Lane Change Decision Aid Systems (LCDAS), Low Speed Following systems (LSF), Full Speed Range Adaptive cruise control systems (FSRA), Forward Vehicle Collision Mitigation Systems (FVCMS), Extended Range Backing Aids systems (ERBA), Cooperative Intersection Signal Information and Violation Warning Systems (CIWS), and Traffic Impediment Warning Systems (TIWS).

Figure 5:
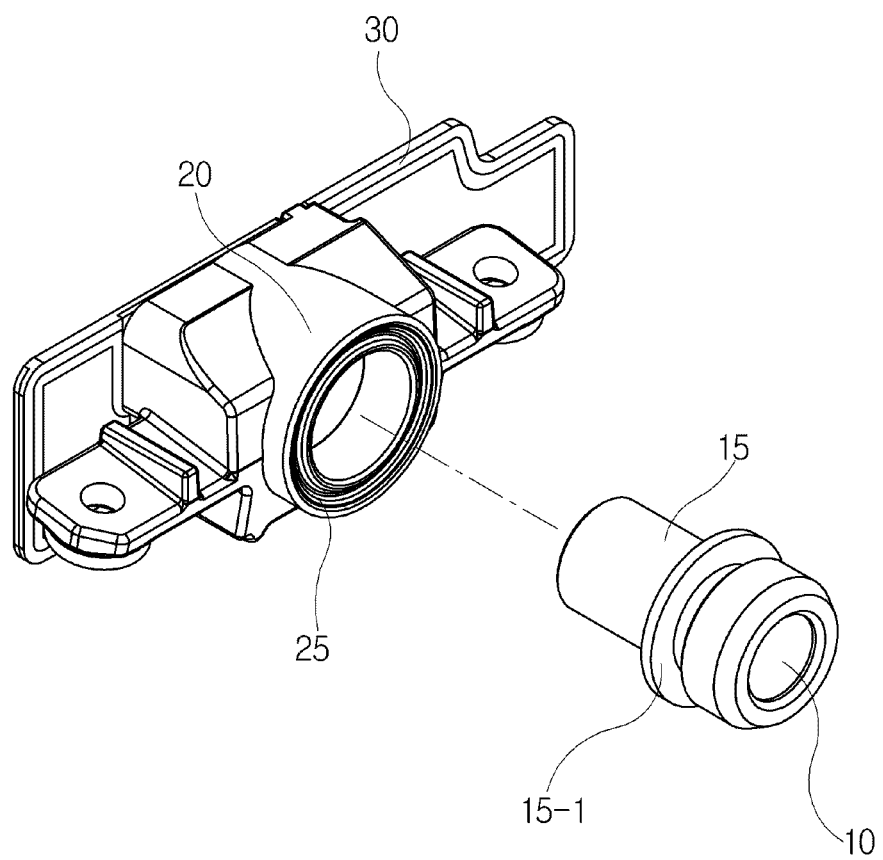
FIG. 5 is an exploded perspective view illustrating a coupling relationship between a lens barrel and a lens holder according to the first embodiment of the present disclosure.

FIG. 5 is an exploded perspective view illustrating a coupling relationship between a lens barrel and a lens holder according to the first embodiment of the present disclosure.

According to the present disclosure, the lens 10 is inserted into a lens barrel 15, and the lens barrel 15 includes a flange 15-1. The lens barrel 15 and the lens holder 20 are coupled to each other by a body of the lens barrel 15 including the lens 10 and the flange 15-1 being inserted into the lens holder 20. Also, the lens barrel 15 and the lens holder 20 may be coupled to each other through active alignment. This will be described below with reference to FIG. 6.

Figure 6:
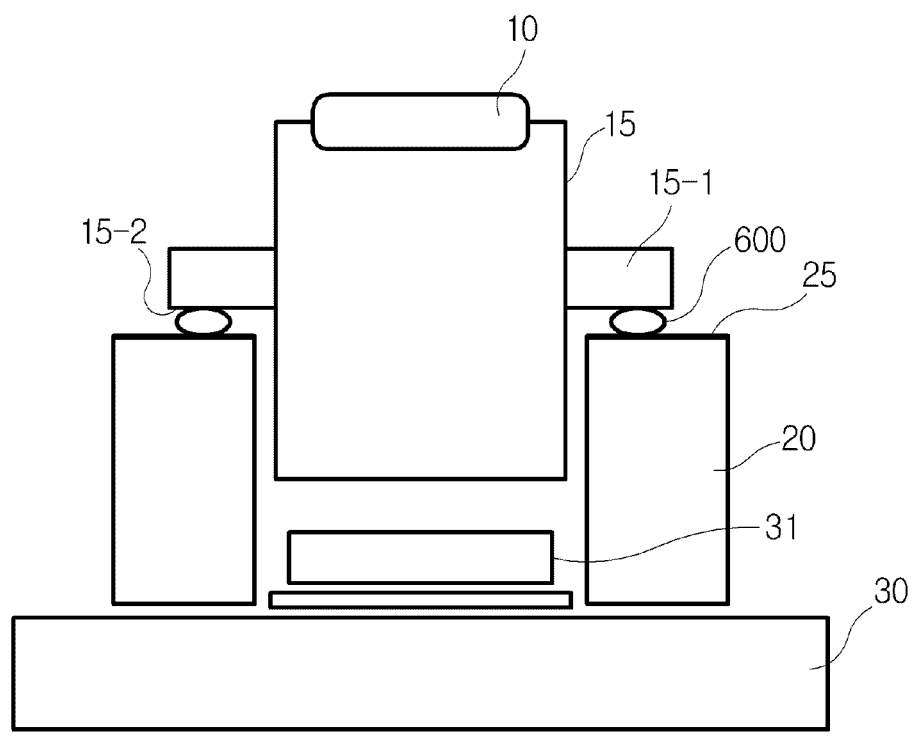
FIG. 6 is a diagram illustrating active alignment of the lens barrel and the lens holder according to the first embodiment of the present disclosure.

FIG. 6 is a diagram illustrating active alignment of the lens barrel and the lens holder according to the first embodiment of the present disclosure.

The active alignment is used when the lens barrel 15 is coupled to the lens holder 20. In this case, the active alignment refers to an operation of placing an adhesive material 600 between the flange 15-1 of the lens barrel 15 and an upper surface 25 of the lens holder 20 and changing the location of the lens barrel 15 horizontally or vertically to focus an object recognized through the image sensor 31. As a representative example, epoxy that is deformable before hardening and that has strong adhesion after hardening may be used as the adhesive material 600.

According to one scheme, a lower surface 15-2 of the flange 15-1 and the upper surface 25 of the lens holder 20, which are to be in contact with the adhesive material 600, may be flat. According to such a scheme, there is no problem in attaching the lens barrel 15 and the lens holder 20. However, when an impact occurs in the camera or when an extreme situation occurs in terms of temperature, the adhesive strength of the adhesive material 600 is degraded, and the lens barrel 15 and the lens holder 20 are separated from each other.

Figure 7A:
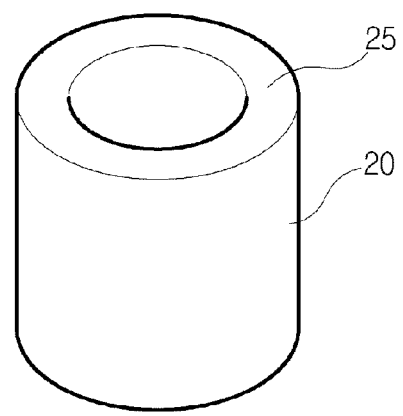
FIGS. 7A to 7E are diagrams showing a lens holder 20 according to the first embodiment of the present disclosure.
Figure 7B:
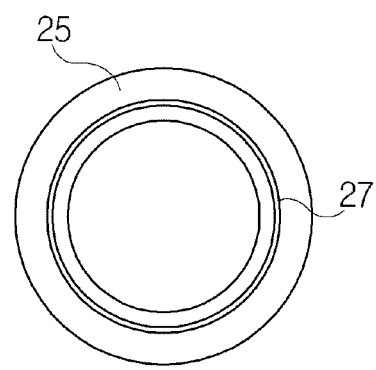
Figure 7C:
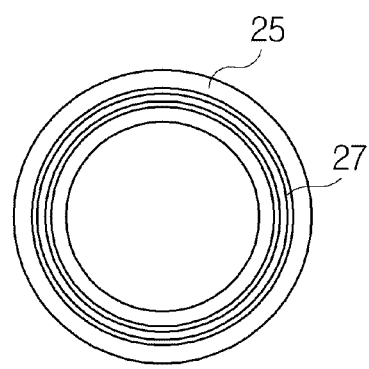
Figure 7D:
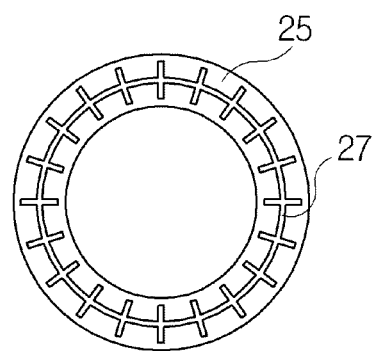
Figure 7E:
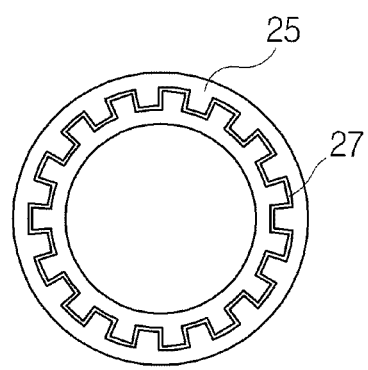

FIGS. 7A to 7E are diagrams showing the lens holder 20 according to the first embodiment of the present disclosure. In detail, FIG. 7A is a perspective view of the lens holder 20, and FIGS. 7B to 7E are top views of the lens holder 20, which show the upper surface 25 of the lens holder 20. As shown in FIGS. 7B to 7E, a groove 27 may be formed on the upper surface 25 of the lens holder 20. The groove 27 may be a single circular groove (FIG. 7B), a dual circular groove (FIG. 7C), a cross lattice groove (FIG. 7D), or a zigzag groove (FIG. 7E). Such a groove 27 may be formed using a laser. By the groove 27 increasing the surface roughness of the upper surface 25 of the lens holder 20, it is possible to maximize an area brought into contact with the adhesive material 600 and thus also to maximize the adhesive strength.

Figure 8A:
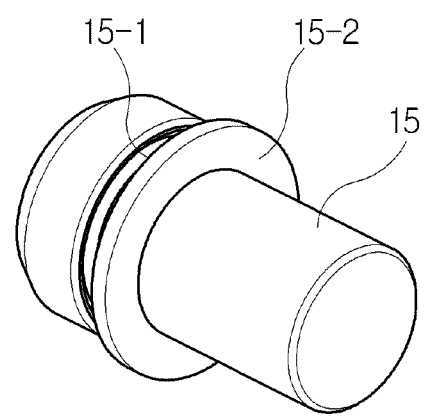
FIGS. 8A to 8E are diagrams showing a lens barrel 15 according to the first embodiment of the present disclosure.
Figure 8B:
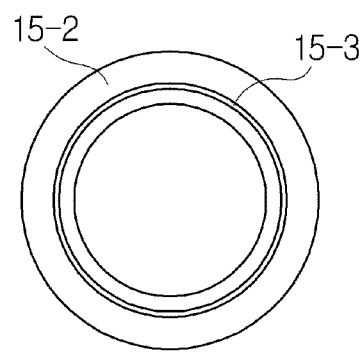
Figure 8C:
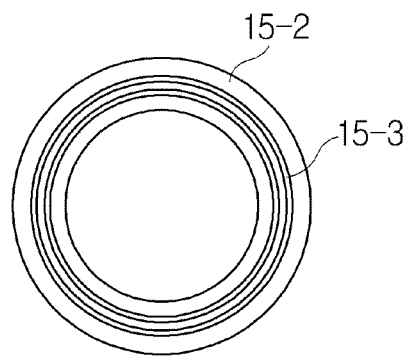
Figure 8D:
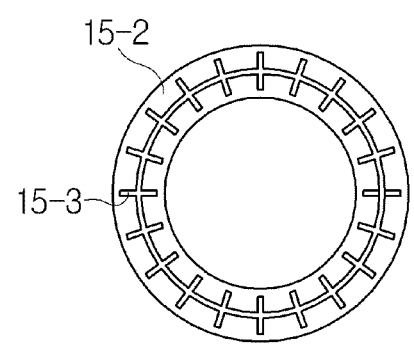
Figure 8E:
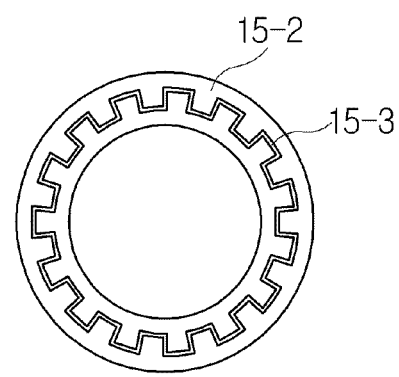

FIGS. 8A to 8E are diagrams showing the lens barrel 15 according to the first embodiment of the present disclosure. In detail, FIG. 8A is a perspective view of the lens barrel 15, and FIGS. 8B to 8E are bottom views of the lens barrel 15, which show a lower surface 15-2 of the flange 15-1 of the lens barrel 15. As shown in FIGS. 8B to 8E, a groove 15-3 may be formed on the lower surface 15-2 of the flange 15-1 of the lens barrel 15. The groove 15-3 may be a single circular groove (FIG. 8B), a dual circular groove (FIG. 8C), a cross lattice groove (FIG. 8D), or a zigzag groove (FIG. 8E). Such a groove 15-3 may be formed using a laser. By the groove 15-3 increasing the surface roughness of the lower surface 15-2 of the flange 15-1 of the lens barrel 15, it is possible to maximize an area brought into contact with the adhesive material 600 and thus also to maximize the adhesive strength.

Second Embodiment

For autonomous driving beyond driving assistance, collision avoidance between a host vehicle and nearby vehicles should be guaranteed. An emergency braking system may calculate a relative speed and a relative acceleration of the host vehicle with respect to each forward collision risk factor, check the time-to-collision, and perform braking control on the host vehicle to avoid the collision. However, in order to avoid a collision with a vehicle ahead, only a longitudinal control (e.g., acceleration or deceleration control in the longitudinal direction of travel of the vehicle) has been performed, and thus when a dangerous situation occurs, there is a limitation on avoidance of the collision with the vehicle ahead.

The second embodiment of the present disclosure relates to a camera system for an ADAS and a collision prevention system and method which are capable of determining a risk of collision with a nearby vehicle, detecting a target vehicle with a collision risk, controlling the speed and steering of the host vehicle, and avoiding the collision with the target vehicle.

The second embodiment of the present disclosure will be described below with reference to FIGS. 9 to 12.

Figure 9:
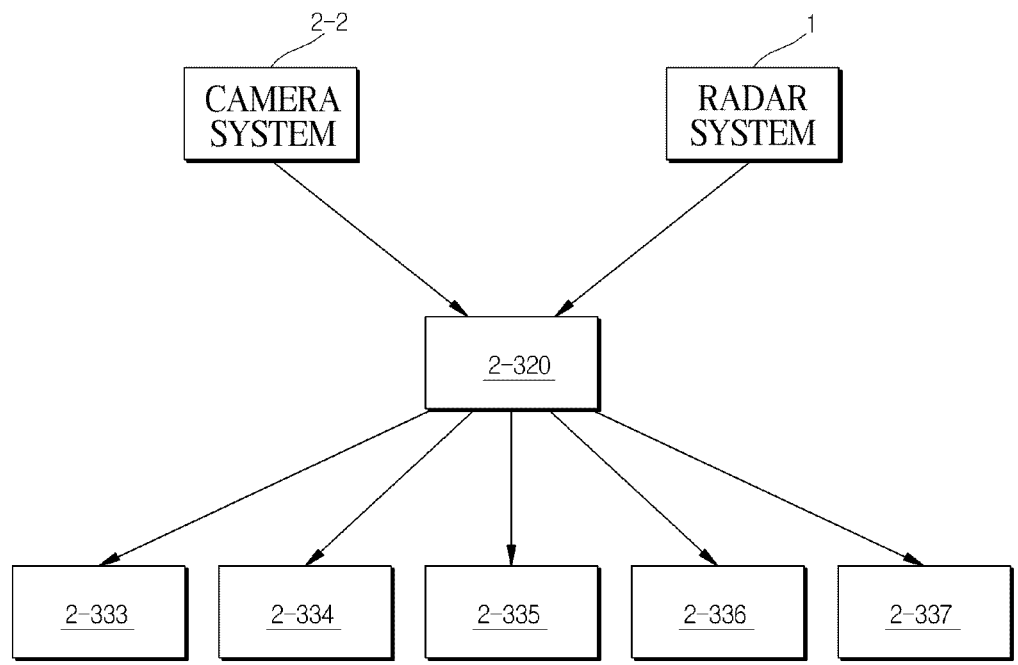
FIG. 9 is a diagram showing a collision prevention system according to a second embodiment of the present disclosure.

FIG. 9 is a diagram showing a collision prevention system according to a second embodiment of the present disclosure.

Referring to FIG. 9, the collision prevention system according to the second embodiment of the present disclosure includes a camera system 1, a radar system 2-2, an ECU 2-320 (e.g., a controller including at least one microprocessor), a vehicle posture controller 2-333, a steering controller 2-334, an engine controller 2-335, a suspension controller 2-336, and a brake controller 2-337. Each of the controllers 2-222, 2-334, 2-335, 2-336, and 2-337 controls a corresponding component of the vehicle on the basis of a control command received from the ECU 2-320.

The camera system 1 includes one or more cameras each with at least one image sensor, an image processor 41, and a camera MCU 42. The camera system 1 generates image data regarding regions ahead of, behind, to the left of, and to the right of the host vehicle and transmits the generated image data to the ECU 2-320.

The radar system 2-2 includes one or more radars and a radar MCU 2-312. The radar system 2-2 emits radio waves to the regions ahead, behind, to the left, and to the right and receives reflected waves to detect objects located in the regions ahead, behind, to the left, and to the right within a distance of 150 meters and a horizontal angle of 30 degrees. Here, the radar system 2-2 detects the objects using FMCW and Pulse Carrier and transmits radar data including a result of detecting the objects to the ECU 2-320.

The ECU 2-320 detects a target vehicle from among nearby vehicles on the basis of the image data input from the camera system 1 and the radar data input from the radar system 2-2 and determines a risk of collision between the host vehicle and the target vehicle. Here, the image data transmitted from the camera system 1 to the ECU 2-320 includes lane recognition information, vehicle-in-front recognition information, vehicle-behind recognition information, vehicle-to-the-left recognition information, and vehicle-to-the-right recognition information. Also, the radar data transmitted from the radar system 2-2 to the ECU 2-320 includes vehicle-in-front recognition information, vehicle-behind recognition information, vehicle-to-the-left recognition information, and vehicle-to-the-right recognition information.

When it is determined that there is a risk of collision between the host vehicle and the target vehicle, a control signal is transmitted to the vehicle posture controller 2-333, the steering controller 2-334, the engine controller 2-335, the suspension controller 2-336, and the brake controller 2-337 in order to avoid the collision. In this way, the posture, speed, and steering of the host vehicle are controlled to avoid the collision between the host vehicle and the target vehicle.

By controlling the steering controller 2-334, the engine controller 2-335, and the brake controller 2-337, the collision with the target vehicle may be avoided. In order to prevent a reduction of ride quality due to a significant change in speed or steering of the host vehicle and prevent an accident due to a driver's posture instability, the vehicle posture controller 2-333 and the suspension controller 2-336 are also controlled to ensure driving stability along with collision avoidance.

Figure 10:
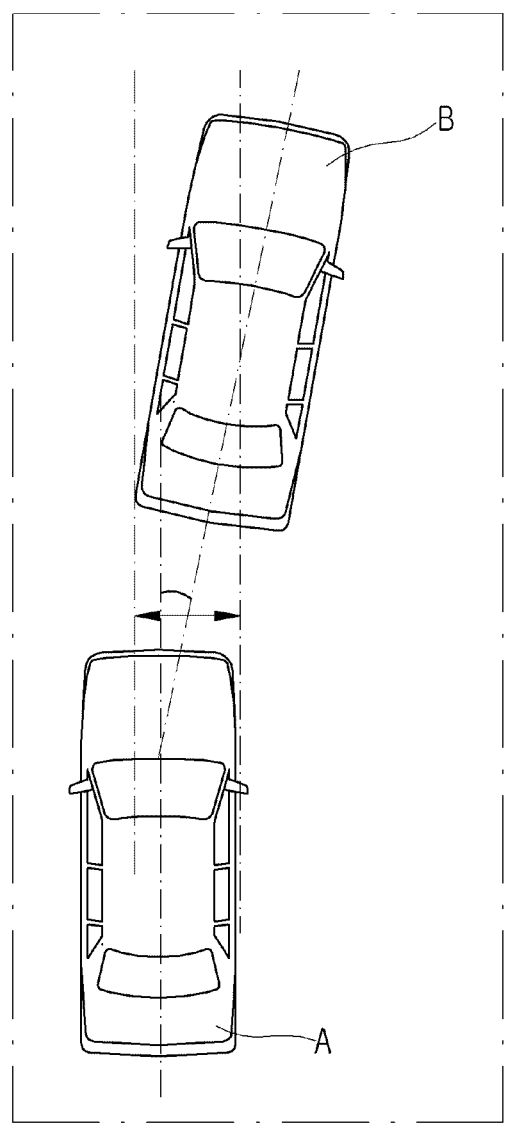
FIG. 10 is a diagram showing a method of detecting a target vehicle with a collision risk according to the second embodiment of the present disclosure.

FIG. 10 is a diagram showing a method of detecting a target vehicle with a collision risk according to the second embodiment of the present disclosure.

Referring to FIG. 10, the ECU 2-320 corrects signals of the image data input from the camera system 1 and the radar data input from the radar system 2-2 (lateral offset, angle, target lateral speed).

The ECU 2-320 detects, as a target vehicle B, a vehicle overlapping a host vehicle A by a certain percentage or higher from among nearby vehicles. As an example, the ECU 2-320 may detect a vehicle overlapping the host vehicle A by 50% or higher as the target vehicle B.

Also, the ECU 2-320 detects a nearby vehicle having a traveling angle that differs from that of the host vehicle A by a certain degree or less as the target vehicle B. As an example, when the angle difference between the host vehicle A and the nearby vehicle ranges 0° to 30° (e.g., or 0% to 30%), the ECU 2-320 may detect the nearby vehicle as the target vehicle B. The angle difference between the host vehicle A and the nearby vehicle may be measured as an angle between the direction of travel of the host vehicle and the direction of travel of the nearby vehicle. Here, the ECU 2-320 detects, as the target vehicle B, a nearby vehicle (or object) overlapping the host vehicle A by a certain percentage or higher and/or having an angle that differs from that of the host vehicle A by a certain degree or less, irrespective of whether the vehicle (or object) is stopped or is traveling.

The ECU 2-320 detecting the target vehicle B has been described above. However, a collision with a pedestrian or an object as well as a vehicle should be avoided, and thus the ECU 2-320 detects a target object (including a target vehicle) and controls the host vehicle A to avoid a collision with the target object. That is, when an object (including a vehicle and a pedestrian) is detected on a traveling direction route of the host vehicle A, the ECU 2-320 detects the detected object as the target object. Here, the traveling route of the host vehicle A may be set on the basis of lanes. When a road has no lanes, the ECU 2-320 may generate a virtual lane and detect a target object on the traveling route on the basis of the virtual lane and the location of the nearby object. In particular, when a new object cuts into the traveling route, the ECU 2-320 detects this object as the target object (or target vehicle).

Figure 11:
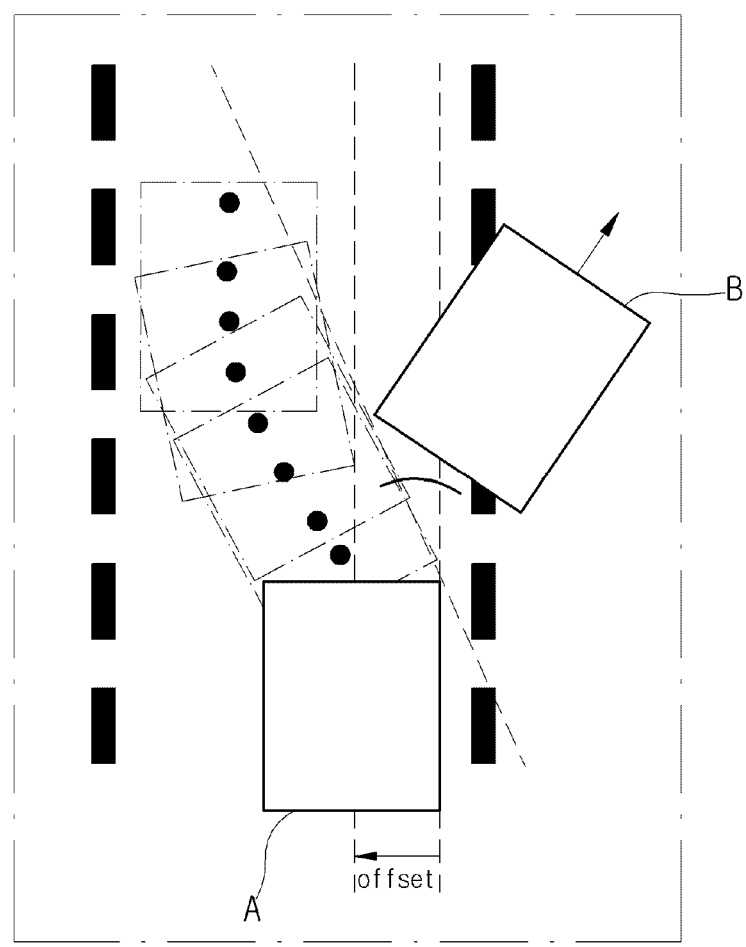
FIG. 11 is a diagram showing a method of avoiding a collision with a target vehicle by controlling the speed and steering of a host vehicle according to the second embodiment of the present disclosure.

FIG. 11 is a diagram showing a method of avoiding a collision with a target vehicle by controlling the speed and steering of a host vehicle according to the second embodiment of the present disclosure.

Referring to FIG. 11, a collision risk is calculated on the basis of a lateral offset between a host vehicle and a target vehicle as represented in the following Equation 1.

Lateral offset=lateral speed of target object*TTC= (relative distance)/(relative speed) (Equation 1)

Dynamic control: lateral offset (TTC, Vlat)<X

Deceleration+avoidance control: X1<lateral offset (TTC, Vlat)<X2

No control required: lateral offset (TTC, Vlat)>X3

ECU 2-320 calculates a heading angle and a lateral offset and performs update. Also, the ECU 2-320 maintains a lane curvature and a curvature derivative.

When the risk of collision between the host vehicle and the target vehicle exceeds a pre-determined reference value, the ECU 2-320 generates an avoidance route in consideration of an expected heading angle (HA) and controls the speed and steering of the host vehicle. In this case, the ECU 2-320 may generate a steering avoidance route on the basis of a three-dimensional (3D) lane-based model.

3D lane-based model Y=C0I+C1IX+C2IX2+C3IX3

C0I indicates a lateral offset (Lane Mark Position), C1I indicates a line heading angle (Lane Mark Heading Angle), 2C2I indicates a line curvature (Lane Mark Model A), 6C3I indicates a line curvature derivative (Lane Mark Model d(A)).

Steering Control Collision Avoidance

When a collision is avoided through steering control, the ECU 2-320 transmits a control signal to the steering controller 2-334 and controls the steering of the host vehicle A. Here, when the steering of the host vehicle A is controlled in order to avoid a collision with the target vehicle B, a collision with a nearby vehicle approaching behind may occur. According to the present disclosure, before performing steering avoidance control, the ECU 2-320 determines a risk of collision with a vehicle approaching behind or a vehicle traveling in the left or right lane.

When there is no risk of collision with a vehicle traveling behind and there is no vehicle traveling in the left or right lane or no risk of collision with a vehicle traveling in the left or right lane, the ECU 2-320 controls the steering of the host vehicle A to avoid the collision with the target vehicle B.

Also, when a collision with the target vehicle B ahead is expected to occur and it is determined that the collision can be avoided only by decelerating the host vehicle A, the ECU 2-320 may control the steering of the host vehicle A to avoid the collision with the target vehicle B.

Speed Control Collision Avoidance

When a collision is avoided through speed control, the ECU 2-320 transmits a control signal to the engine controller 2-335 and the brake controller 2-337 to decelerate the host vehicle A. Here, when a collision with the target vehicle B ahead is expected, the ECU 2-320 determines a risk of collision with a vehicle traveling in the left or right lane upon the steering avoidance. When the collision with the vehicle traveling in the left or right lane is determined upon the steering avoidance, the ECU 2-320 decelerates the host vehicle A to avoid the collision with the target vehicle B.

Also, when a collision with the target vehicle B ahead is expected and it is determined that the collision can be avoided by decelerating the host vehicle A, the ECU 2-320 may decelerate the host vehicle A to avoid the collision with the target vehicle B.

Collision Avoidance upon Land Change of Vehicle in the Next Lane

A method of preventing a collision when a vehicle traveling in the next lane enters (cuts into, partially engages in, or impinges on) a traveling route of the host vehicle will be described.

As an example, by the ECU 2-320 analyzing image data obtained by capturing vehicles traveling in the next lane, the camera system 1 senses lane change intentions of the vehicles traveling in the next lane. The ECU 2-320 may detect turn signal lights (blinkers) of nearby vehicles to detect that a vehicle traveling in the next lane enters (cuts into) the traveling route of the host vehicle A.

As another example, by the ECU 2-320 analyzing image data obtained by capturing vehicles traveling in the next lane, the camera system 1 senses lane change intentions of the vehicles traveling in the next lane. The ECU 2-320 may detect tire orientations of nearby vehicles to detect that a vehicle traveling in the next lane enters (cuts into) the traveling route of the host vehicle A.

As still another example, the ECU 2-320 analyzes image data obtained by the camera system 1 capturing the vehicles traveling in the next lane and radar data obtained by the radar system 2-2 detecting the vehicles traveling in the next lane. In this way, the ECU 2-320 senses the lane change intentions of the vehicles traveling in the next lane. The ECU 2-320 may detect lateral accelerations and directions of nearby vehicles to detect that a vehicle traveling in the next lane enters (cuts in) the traveling route of the host vehicle A.

TABLE 1

| | |
|---|---|
| Acceleration of host vehicle | Relative speed with respect to vehicle traveling in next lane < V |
| | Longitudinal distance with respect to vehicle traveling in next lane < Y |
| | Lateral distance with respect to vehicle traveling in next lane < X |
| Deceleration of host vehicle | Speed of vehicle traveling in next lane < Speed of host vehicle + α |
| | Longitudinal distance with respect to vehicle traveling in next lane > Y |
| | Lateral distance with respect to vehicle traveling in next lane > X |
| Braking of host vehicle | Speed of host vehicle > Speed of vehicle traveling in next lane |
| | Longitudinal distance with respect to vehicle traveling in next lane < Y |
| | Lateral distance with respect to vehicle traveling in next lane < X |
| Host vehicle steering avoidance | Speed of host vehicle > Speed of vehicle traveling in next lane |
| | Longitudinal distance with respect to vehicle traveling in next lane < Y |
| | X1 < Lateral distance with respect to vehicle traveling in next lane < X2 |
| | Case in which there is no vehicle in next lane |
| | Lateral distance from avoidance direction lane to vehicle ahead being greater than or equal to certain value |

When a vehicle traveling in the next lane enters (cuts into, partially engages in, or impinges on) the traveling route of the host vehicle A, when a vehicle in the right lane cuts ahead of the host vehicle A upon a left turn at an intersection, or when a vehicle in the left lane cuts ahead of the host vehicle A upon a right turn at an intersection, as shown in Table 1, the ECU 2-320 determines a control mode of the host vehicle A. The ECU 2-320 may avoid a collision between the host vehicle A and a nearby vehicle through one of or a combination of an acceleration control mode, a deceleration control mode, a braking control mode, and a steering control mode. As an example, the ECU 2-320 may avoid the collision by performing acceleration control, deceleration control, braking control, or steering control on the host vehicle A. Here, the acceleration control and the steering control may be simultaneously performed on the host vehicle A, the acceleration control and the steering control may be simultaneously performed on the host vehicle A, and the braking control and the steering control may be simultaneously performed on the host vehicle A.

Figure 12:
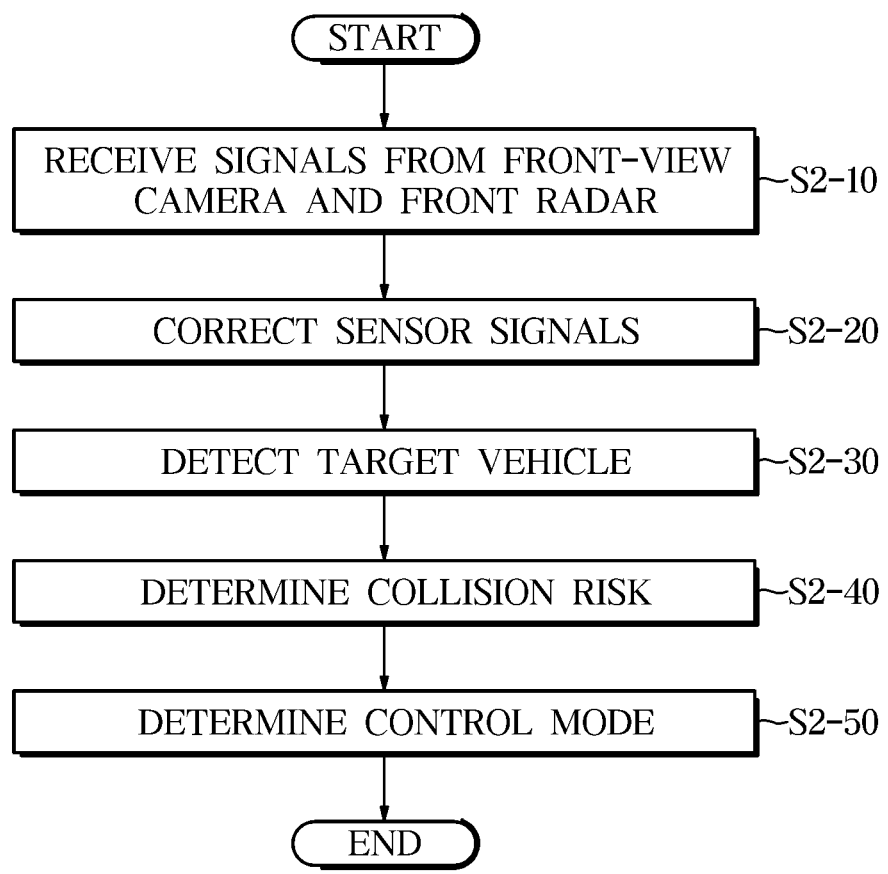
FIG. 12 is a diagram showing the collision avoidance method according to the second embodiment of the present disclosure.

FIG. 12 is a diagram showing the collision avoidance method according to the second embodiment of the present disclosure.

Referring to FIG. 12, the ECU 2-320 receives image data generated by the camera system 1 and radar data generated by the radar system 2-2 (S2-10).

Subsequently, the ECU 2-320 corrects signals of the image data and the radar data. That is, the ECU 2-320 corrects sensor signals (S2-20).

Subsequently, the ECU 2-320 detects a target vehicle from among nearby vehicles on the basis of the image data and the radar data (S2-30). Here, the ECU 2-320 detects, as a target vehicle B, a vehicle overlapping a host vehicle A by a certain percentage or higher from among the nearby vehicles. As an example, the ECU 2-320 may detect a vehicle overlapping the host vehicle A by 50% or higher as the target vehicle B. Also, the ECU 320 detects a nearby vehicle having a traveling angle that differs from that of the host vehicle A by a certain degree or less as the target vehicle B. As an example, when the angle difference between the host vehicle A and the nearby vehicle ranges 0° to 30° (e.g., 0% to 30%), the ECU 2-320 may detect the nearby vehicle as the target vehicle B. The ECU 2-320 detects, as the target vehicle B, a nearby vehicle (or object) overlapping the host vehicle A by a certain percentage or higher and/or having an angle that differs from that of the host vehicle A by a certain degree or less, irrespective of whether the nearby vehicle (or object) is stopped or is traveling.

Subsequently, the ECU 2-320 determines a risk of collision between the host vehicle and the target vehicle on the basis of a lateral offset between the host vehicle and the target vehicle (S2-40).

Subsequently, when the collision between host vehicle and the target vehicle is determined, the ECU 2-320 determines a control mode of the host vehicle and transmits a control signals to the vehicle posture controller 2-333, the steering controller 2-334, the engine controller 335, the suspension controller 2-336, and the brake controller 2-337 according to the determined control mode. In this way, the posture, speed, and steering of the host vehicle are controlled to avoid the collision between the host vehicle and the target vehicle.

Here, the collision with the target vehicle may be avoided by controlling the steering of the host vehicle. Also, the collision with the target vehicle may be avoided by controlling the speed of the host vehicle. Also, a collision between the host vehicle and a vehicle cutting in from the next lane may be avoided by controlling one or more of the speed, braking, and steering of the host vehicle when the vehicle traveling in the next lane changes lanes.

Third Embodiment

At an intersection, a host vehicle may go straight, turn around, or turn left or right and may change lanes in order to turn around or turn left or right. Also, vehicles other than the host vehicle may also turn around or turn left or right, and thus there is a high possibility of a collision between vehicles. To this end, a vehicle needs a control system for preventing a vehicle collision and a variety of sensors for sensing a collision.

The third embodiment of the present disclosure relates to a driving assistance system that controls a vehicle using a camera system for an ADAS.

The third embodiment of the present disclosure will be described below with reference to FIGS. 13 to 15.

Figure 13:
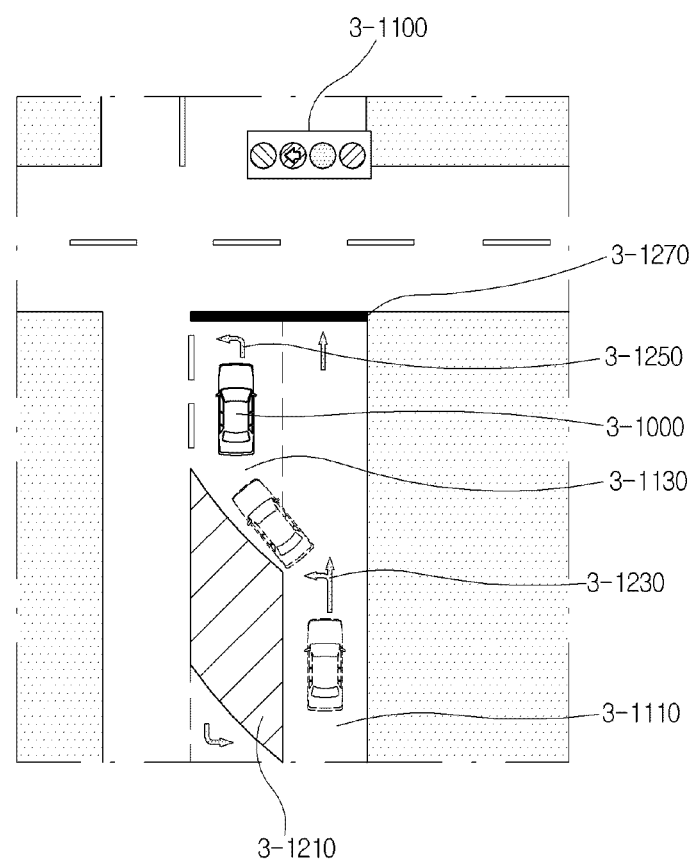
FIG. 13 is a diagram showing vehicle control according to a third embodiment of the present disclosure.

FIG. 13 is a diagram showing vehicle control according to the third embodiment of the present disclosure.

Referring to FIGS. 1, 3, and 13, a camera system 1 and/or a GPS processor 3-313 may discover that a vehicle 3-1000 enters an intersection. The camera system 1 may discover a traffic light 3-1100 of the intersection to discover that the vehicle 3-1000 enters the intersection. The GPS processor 3-313 may measure the location of the vehicle 3-1000 through communication with a satellite, compare the measured location to prestored map information, and determine whether the vehicle 3-1000 enters the intersection.

The camera system 1 may capture state information of the surroundings of the vehicle 3-1000, first information, and second information and transmit the captured information to the ECU 3-320. The ECU 3-320 may receive the state information, the first information, and the second information and control the steering of the vehicle 3-1000 on the basis of the received information. The state information may include at least one of an expanded branch lane and road marks 3-1210 and 3-1230. The first information may include at least one of data regarding vehicles ahead, data regarding lanes ahead, distances from font vehicles, data regarding traffic signs of an intersection, and signal data of an intersection. The second information may include a left-turn road mark 3-1250 of the branch lane 3-1130, an intersection stop line 3-1270, the presence of a vehicle ahead, and intersection signal data. The expanded branch lane 3-1130 may refer to a lane which the vehicle 3-1000 traveling in a left hand lane 3-1110 (the leftmost lane with respect to a vehicle traveling direction) will enter in order to turn left. That is, the expanded branch lane 3-1130 may refer to a lane that is newly provided to the left of the left hand lane 3-1110. The first information may be information discovered by the camera system 1 before or while the vehicle 3-1000 enters the branch lane 3-1130, and the second information may be information discovered by the camera system 1 after the vehicle 3-1000 enters the branch lane 3-1130.

As an example, the camera system 1 may capture a region ahead of the vehicle 3-1000 or sense the road marks 3-1210 and 3-1230 present ahead of the vehicle 3-1000 to discover whether there is a branch lane. For example, the road marks 3-1210 and 3-1230 may include a safety zone mark 3-1210 displayed for the branch lane on a road and a guidance mark 3-1230 representing a vehicle traveling direction. The guidance mark 3-1230 may inform a driver that the vehicle 3-1000 may enter the branch lane 3-1130.

As an example, before or while the vehicle 3-1000 enters the branch lane 3-1130, the camera system 1 may discover whether a lane ahead of the vehicle 3-1000 is empty, whether another vehicle is present ahead, a distance from a vehicle ahead, and the like. Thus, it is possible for the vehicle 3-1000 to avoid colliding with a vehicle ahead while entering the branch lane 3-1130. Also, after the vehicle 3-1000 enters the branch lane 3-1130, the camera system 1 may discover the left-turn road mark 3-1250, the intersection stop line 3-1270, data regarding traffic signs of the intersection, and the intersection signal data.

The ECU 3-320 may control some of the elements in the control level on the basis of the state information, the first information, and the second information. As an example, the ECU 3-320 may control the steering controller 3-334 using the state information to control the steering of the vehicle 3-1000. Through information regarding the expanded branch lane and the road marks 3-1210 and 3-1230, the ECU 3-320 may control the steering such that the vehicle 3-1000 traveling in the left-hand lane 3-1110 enters the branch lane 3-1130. Also, the ECU 3-320 may control the speed and braking of the vehicle 3-1000 using the first information. In this case, the ECU 3-320 may control an engine controller 3-335, a suspension controller 3-336, a brake controller 3-337, and the like. When the vehicle 3-1000 enters the branch lane 3-1130, the ECU 3-320 may prevent a collision with a vehicle ahead using the first information, which includes data regarding vehicles ahead, data regarding lanes ahead, and distances from vehicles ahead. For example, when a distance from a vehicle ahead is smaller than a pre-determined distance or when a vehicle ahead travels at low speed, the ECU 3-320 may decelerate the vehicle 3-1000 or operate the brake.

As an example, after the vehicle 3-1000 enters the branch lane 3-1130, the ECU 3-320 may determine whether to stop or turn left at an intersection through the second information, which includes the left-turn road mark 3-1250, the intersection stop line 3-1270, the data regarding traffic signs of the intersection, and the intersection signal data and then may control the vehicle 3-1000. For example, when the intersection signal data indicates turning on a left-turn signal, the camera system 1 may recognize the intersection signal data and the left-turn road mark 3-1250. The ECU 3-320 may receive information regarding the left-turn road mark 3-1250 and the intersection signal data from the camera system 1 and control the vehicle 3-1000 located in the branch lane 3-1130 to turn left. When the intersection signal data indicates turning off a left-turn signal, the ECU 3-320 may control the vehicle 3-1000 to stop before the intersection stop line 3-1270 or may control the vehicle 3-1000 to stop away from another vehicle ahead of the vehicle 3-1000. In this case, the ECU 3-320 may control the steering controller 3-334, the engine controller 3-335, the suspension controller 3-336, the brake controller 3-337, and the like. However, the control of the vehicle 3-1000 through the ECU 3-320 according to the present disclosure may not be limited to the above examples.

As another example, the data regarding the vehicles ahead, the data regarding the lanes ahead, and the distance from the vehicle ahead may be discovered through a Lidar and a radar. The camera system 1 may interoperate with the lidar and the radar to discover information regarding the surroundings of the vehicle and to transmit the information to the ECU 3-320.

The ECU 3-320 may control a driver warning controller 3-331 to inform a driver of whether the vehicle 3-1000 can enter the branch lane 3-1130, whether a left-turn is allowed in the branch lane 3-1130, and the like. The driver warning controller 331 may display a video-type notification message or a notification image to the driver through an HUD or a side mirror display or may inform the driver in an audio manner. Through the information provided by the driver warning controller 3-331, the driver may directly change the steering of the vehicle 3-1000 or may control the overall configuration of the vehicle 3-1000.

Figure 14:
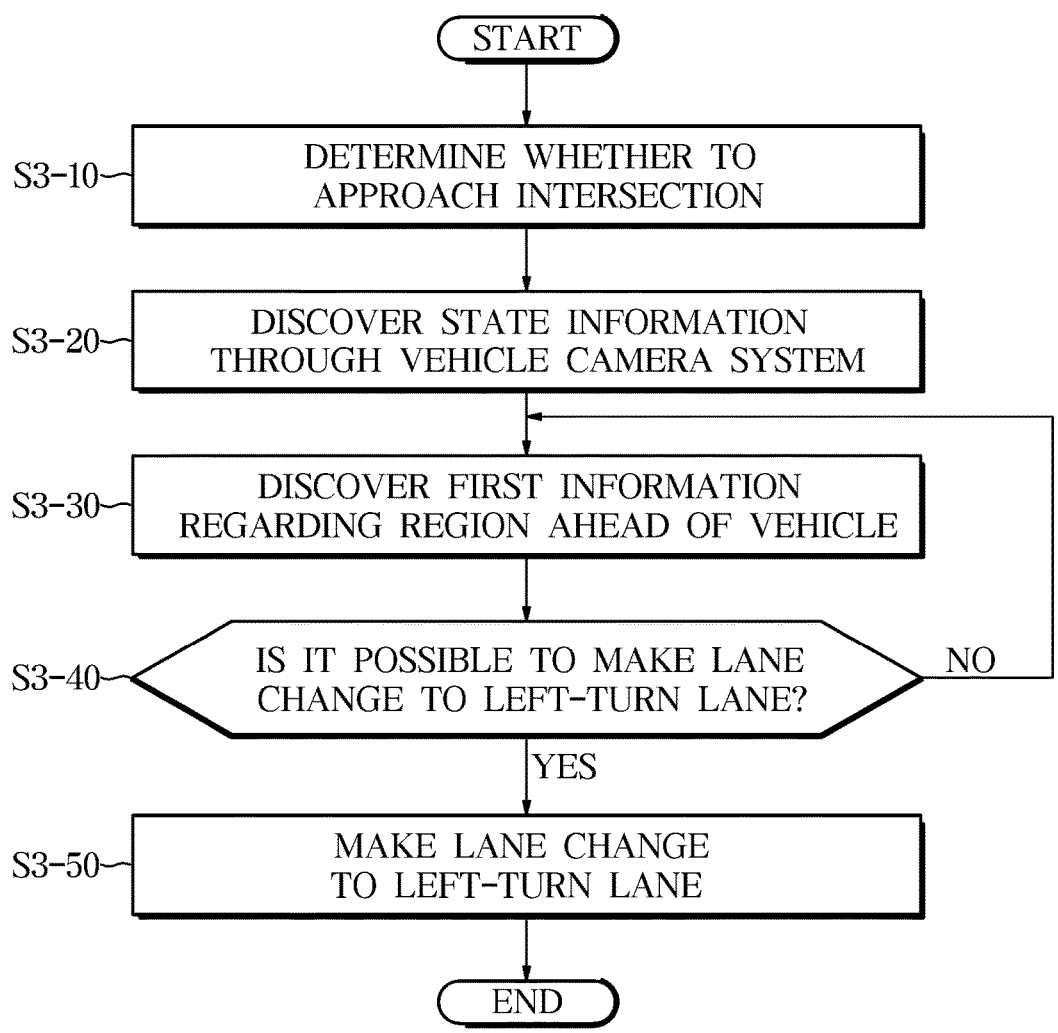
FIG. 14 is a flowchart illustrating the order of controlling a vehicle according to the third embodiment of the present disclosure.

FIG. 14 is a flowchart illustrating the order of controlling a vehicle according to the third embodiment of the present disclosure.

Referring to FIGS. 1, 6, and 14, the ECU 3-320 may determine whether the vehicle 3-1000 is approaching an intersection on the basis of location information of the vehicle 3-1000 and information of the intersection by using a GPS apparatus. Also, the ECU 3-320 may discover a traffic light 3-1100 of the intersection using the camera system 1 to determine whether the vehicle 3-1000 is approaching the intersection (S3-10).

The camera system 1 may discover state information of the surroundings of the vehicle. For example, the state information may include at least one of the expanded branch lane and the road marks 3-1210 and 3-1230 (S3-20). Additionally, the camera system 1 may discover the first information, which is information regarding the region ahead of the vehicle 3-1000. For example, the first information may include at least one of the data regarding vehicles ahead, the data regarding lanes ahead, the distances from the font vehicles, the data regarding the traffic signs of the intersection, and the intersection signal data (S3-30).

The camera system 1 may transmit the state information and the first information to the ECU 3-320, and the ECU 3-320 may determine whether the vehicle 3-1000 can make a lane change from the left hand lane 3-1110 to the branch lane 3-1130 on the basis of the state information and the first information. First, the ECU 3-320 may determine whether the branch lane 3-1130 is present on the basis of the state information. When it is determined that the branch lane 3-1130 is present, the ECU 3-320 may determine a possibility of the vehicle 3-1000 colliding with another vehicle ahead on the basis of the first information. When it is determined through the state information that the safety zone mark 3-1210 and the guidance mark 3-1230 are present to the left of the left hand lane 3-1110, the ECU 3-320 may control the steering of the vehicle 3-1000 to make a lane change to a lane allowing a left-turn, that is, the branch lane 3-1130. In this case, the ECU 3-320 may control the vehicle 3-1000 to prevent a collision with another vehicle in consideration of the first information. When it is determined in consideration of the first information that there is a possibility of colliding with a vehicle ahead, the ECU 3-320 may not enter the branch lane 3-1130, the camera system 1 may rediscover first information and transmit the first information to the ECU 3-320, and the ECU 3-320 may determine whether there is a possibility of colliding with a vehicle ahead again (S3-45, S3-50).

As another example, when it is determined through the state information that there are no safety zone mark 3-1210 and no guidance mark 3-1230 to the left of the left hand lane 3-1110, the ECU 3-320 may not control the steering of the vehicle 3-1000. That is, the ECU 3-320 may control the vehicle 3-1000 not to enter the branch lane 3-1130.

Figure 15:
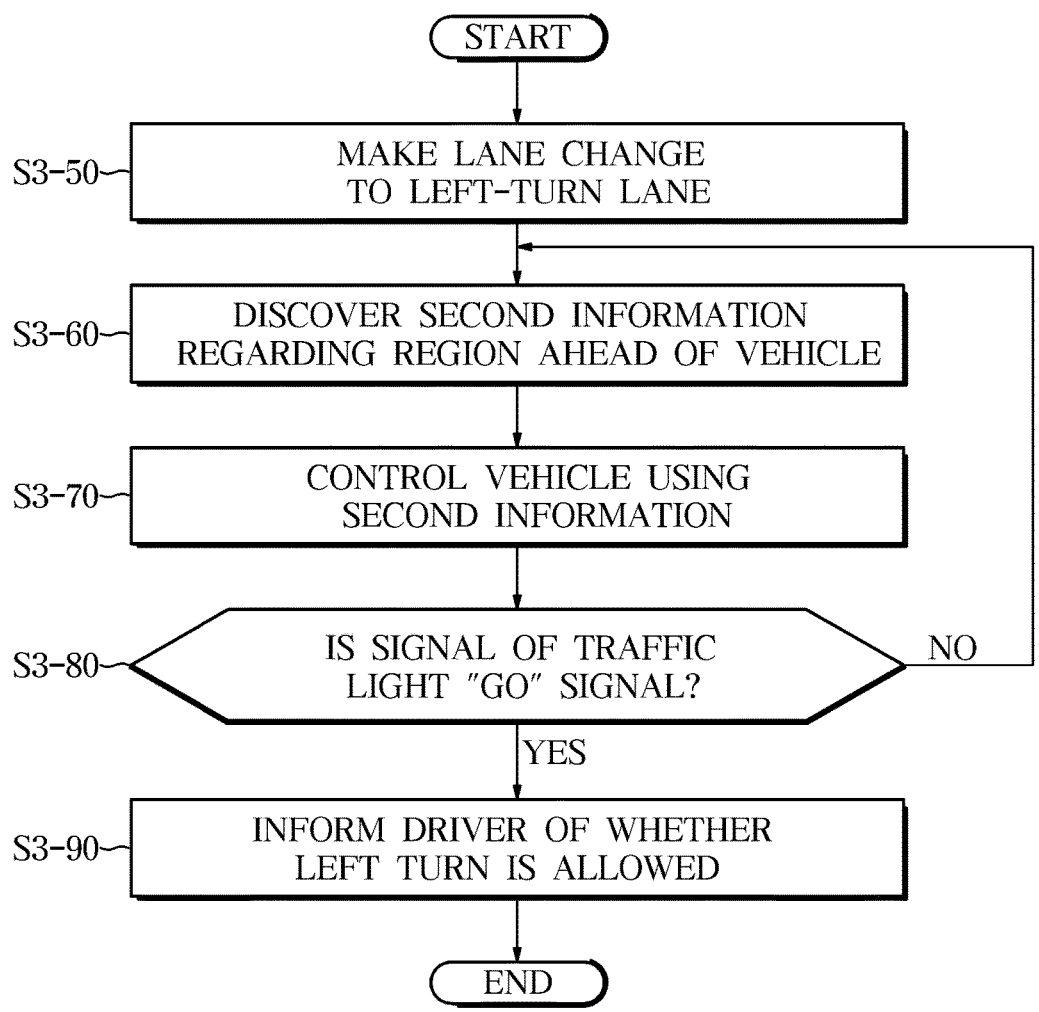
FIG. 15 is a flowchart illustrating the order of controlling a vehicle according to the third embodiment of the present disclosure.

FIG. 15 is a flowchart illustrating the order of controlling a vehicle according to the third embodiment of the present disclosure.

Referring to FIGS. 1, 6, and 15, the camera system 1 may discover the second information regarding a region ahead of the vehicle 3-1000 having made a lane change to the left lane. The second information may include the left-turn road mark 3-1250 of the branch lane 3-1130, the intersection stop line 3-1270, the presence of a vehicle ahead, and the intersection signal data (S3-50, S3-60). The camera system 1 may transmit the second information to the ECU 3-320, and the ECU 3-320 may control the speed and braking of the vehicle 3-1000 on the basis of the intersection stop line 3-1270 and the presence of a vehicle ahead. For example, when another vehicle is present ahead of the vehicle 3-1000, the ECU 3-320 may perform control to decelerate the vehicle 3-1000 or to drive the brake. When there is no other vehicle ahead of the vehicle 3-1000, the ECU 3-320 may control the speed and braking of the vehicle 3-1000 in order to stop at the intersection stop line 3-1270 (S3-70). When the intersection signal is a "Go" signal allowing a left turn, the ECU 3-320 may control the vehicle 3-1000 to turn left. When the intersection signal is not a "Go" signal allowing a left turn, the camera system 1 may rediscover second information, and the ECU 3-320 may control the vehicle 3-1000 on the basis of the second information. The ECU 3-320 may control a driver warning controller to inform the driver of whether the vehicle can turn left, which is determined through the state information, the first information, and the second information (S3-80, S3-90).

Fourth Embodiment

The emergency braking system provides collision warning and automatic braking control when a collision with a vehicle ahead or pedestrian is expected. To this end, the emergency braking system calculates a relative speed and acceleration of the host vehicle with respect to each collision risk factor ahead, checks the time-to-collision, and determines a braking control start time of the host vehicle. However, an emergency braking system according to the related art determines the braking control start time of the host vehicle without considering a road condition. When it comes to rain or snow, a road becomes slippery, and the braking distance increases compared to a normal road. Accordingly, it is assumed that a braking control start time set on the basis of a normal road is applied to a slippery road. In this case, even when an emergency braking is performed, a collision with a vehicle ahead or object (including a pedestrian) cannot be avoided.

The fourth embodiment of the present disclosure relates to a camera system for an ADAS and an emergency braking system and method which are capable of controlling an emergency braking start time according to the degree to which a road is slippery.

The fourth embodiment of the present disclosure will be described below with reference to FIGS. 16 to 18.

FIG. 16 is a diagram showing an example in which a slippery road sign is recognized using a camera system according to the fourth embodiment of the present disclosure.

Referring to FIG. 16, the emergency braking system according to the fourth embodiment of the present disclosure may recognize a slippery road and may control the emergency braking start time according to the degree to which the road is slippery. Also, by advancing the emergency braking start time when it is determined that the road is slippery, it is possible to prevent a head-on/rear-end collision due to an increase in braking distance. To this end, the emergency braking system according to an embodiment of the present disclosure includes an ECU 4-320, a GPS MCU 4-313, a navigation MCU 4-314, a driver warning controller 4-331, an engine controller 4-335, a brake controller 4-337, and a camera system 1.

As an example of recognizing a slippery road, the emergency braking system according to the fourth embodiment of the present disclosure recognizes road signs S1 and S2 indicating a road condition using the camera system 1 and provides a result of recognizing the road signs to the ECU 4-320. As an example, the emergency braking system may recognize the road sign S1, which indicates a slippery road, the road sign S2, which indicates a wet road, or the like. In addition, the emergency braking system may recognize a sign indicating a bridge inclinable to freeze, a sign indicating a habitual flooding zone, and the like.

As an example of recognizing a slippery road, the emergency braking system according to the fourth embodiment of the present disclosure may check a weather condition corresponding to a current road to recognize whether the road is slippery. Using the navigation MCU 4-314 or a smart device (e.g., a cellular phone), the emergency braking system receives current weather information corresponding to a current road and provides the weather information to the ECU 4-320.

As an example of recognizing a slippery road, the emergency braking system according to the fourth embodiment of the present disclosure may check whether the windshield wiper of the vehicle operates. When the windshield wiper operates continuously for a certain period of time, the emergency braking system may recognize that a current road is slippery.

As an example of recognizing a slippery road, the emergency braking system according to the fourth embodiment of the present disclosure may check a road condition by analyzing a road image because moisture remains on the road in the case of rain or snow. Using the camera system 1, the emergency braking system captures a region ahead of a current road and recognizes a road condition from the image regarding the region ahead. The camera system 1 provides information regarding the road condition to the ECU 4-320.

Emergency Braking Control on Normal Road

Figure 17:
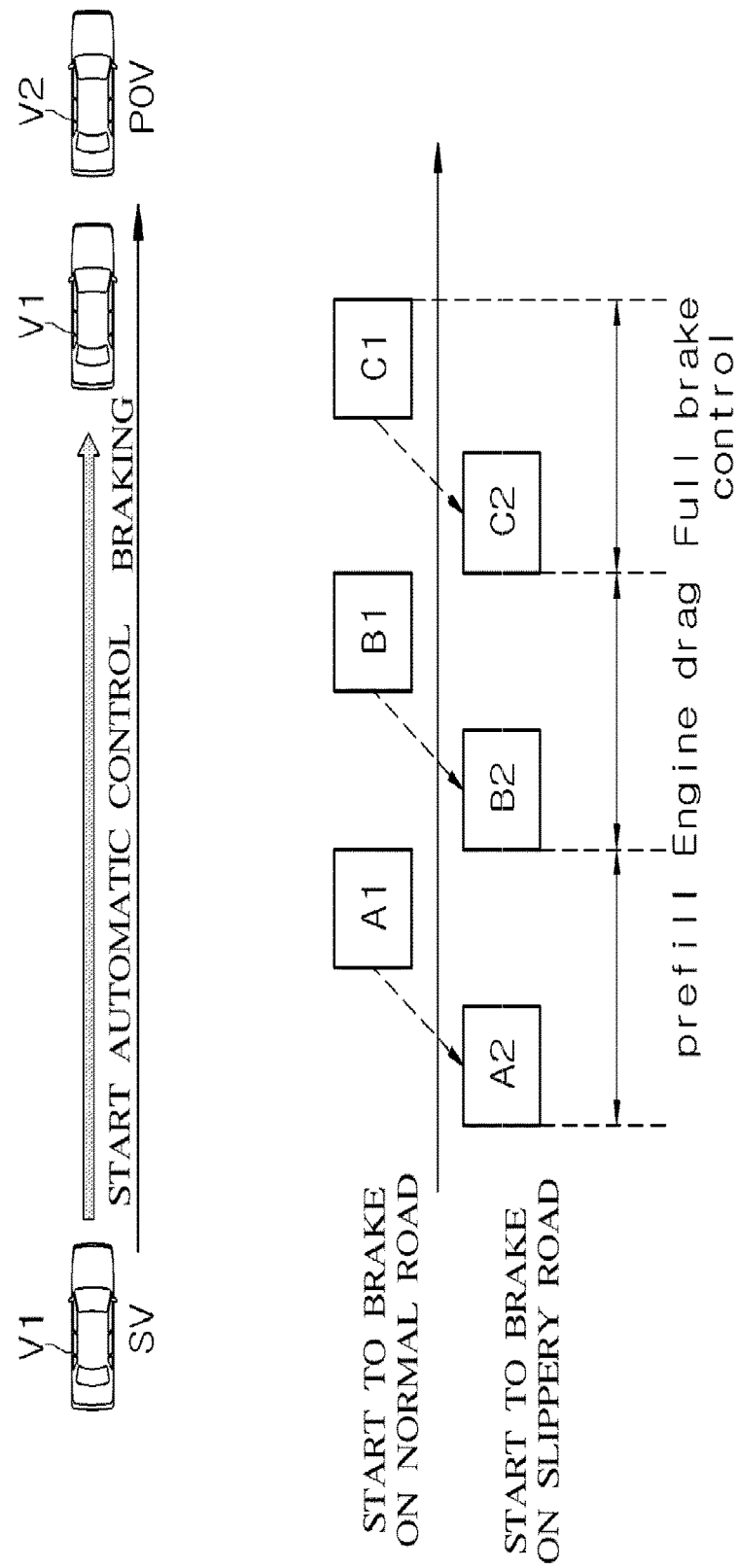
FIG. 17 is a diagram showing an example in which an emergency braking system changes an emergency braking start time according to a degree to which a road is slippery according to the fourth embodiment of the present disclosure.

FIG. 17 is a diagram showing an example in which an emergency braking system changes an emergency braking start time according to a degree to which a road is slippery according to the fourth embodiment of the present disclosure.

Referring to FIG. 17, when it is determined that a host vehicle is traveling on a normal road, the ECU 4-320 maintain a default value without applying a separate weight when the emergency braking start time is calculated.

The navigation MCU 4-314 computes the speed of a host vehicle V1 and calculates a relative speed between the host vehicle V1 and a target vehicle V2 on the basis of a distance between the host vehicle V1 and the target vehicle V2. Information regarding the relative speed between the host vehicle V1 and the target vehicle V2 is provided to the ECU 4-320.

The ECU 4-320 calculates the time to collision (TTC) of the host vehicle V1 and the target vehicle V2 on the basis of the relative speed between the host vehicle V1 and the target vehicle V2 and sets times for a first warning A1, a second warning B1, and a third warning C1 according to the TTC.

Here, the first warning A1 is a step of pre-filling the brake with pressure. The ECU 4-320 controls the brake controller 4-337 to pre-fill the brake with pressure so that the vehicle may be braked immediately upon emergency braking.

The second warning B1 is a step of decreasing/stopping the output of the engine. The ECU 4-320 controls the engine controller 4-331 to decrease or stop the output of the engine so that the vehicle may be braked immediately upon emergency braking.

The third warning C1 is a step of actually performing braking. The ECU 4-320 controls the brake controller 4-337 to perform full braking.

In the steps for the first warning A1, the second warning B1, and the third warning C1, the ECU 4-320 controls the driver warning controller 4-331 to warn a driver of an emergency braking situation and to notify the driver that emergency braking is performed. Here, the ECU 4-320 may warn the driver of an abnormal situation by outputting warning sounds through an audio apparatus of the vehicle, visually outputting a warning situation through a video apparatus, and tactically outputting a warning situation through a haptic apparatus.

Emergency Braking Control on Slippery Road

The ECU 4-320 recognizes whether a current road is slippery on the basis of a result of recognizing a sign on the road. Also, the ECU 4-320 may check a weather condition corresponding to the current road to recognize whether the road is slippery. Also, the ECU 4-320 may check whether the windshield wiper of the vehicle operates and may recognize that the current road is slippery when the windshield wiper operates continuously for a certain period of time. Also, the ECU 4-320 may check a road condition from the image regarding the region ahead to recognize whether the current road is slippery.

When it is determined that the host vehicle is traveling on a slippery road, the ECU 4-320 advances the emergency braking control start time by applying a weight (ranging, for example, from +30% to +70%) when calculating an emergency braking start time in consideration of an increase in braking distance.

The navigation MCU 4-314 computes the speed of a host vehicle V1 and calculates a relative speed between the host vehicle V1 and a target vehicle V2 on the basis of a distance between the host vehicle V1 and the target vehicle V2. Information regarding the relative speed between the host vehicle V1 and the target vehicle V2 is provided to the ECU 4-320.

The ECU 4-320 calculates the TTC of the host vehicle V1 and the target vehicle V2 on the basis of the relative speed between the host vehicle V1 and the target vehicle V2 and sets times for a first warning A2, a second warning B2, and a third warning C2 according to the TTC. Here, the emergency braking control start time is advanced by applying a weight (ranging, for example, from +30% to +70%) when the emergency braking start time is calculated.

Generally, the slippery road has a braking distance greater than about 1.5 times the braking distance of a normal road. Thus, the emergency braking control start time is advanced by applying a weight of 50% when the emergency braking start time is calculated.

Here, the first warning A2 is a stage of pre-filling the brake with pressure. The ECU 4-320 controls the brake controller 4-337 to pre-fill the brake with pressure so that the vehicle may be braked immediately upon emergency braking.

The second warning B2 is a step of decreasing/stopping the output of the engine. The ECU 4-320 controls the engine controller 4-331 to decrease or stop the output of the engine so that the vehicle may be braked immediately upon emergency braking.

The third warning C2 is a step of actually performing braking. The ECU 4-320 controls the brake controller 4-337 to perform full braking.

In the steps for the first warning A1, the second warning B1, and the third warning C1, the ECU 4-320 controls the driver warning controller 4-331 to warn a driver of an emergency braking situation and to notify the driver that emergency braking is performed. Here, the ECU 4-320 may warn the driver of an abnormal situation by outputting warning sounds through an audio apparatus of the vehicle, visually outputting a warning situation through a video apparatus, and tactically outputting a warning situation through a haptic apparatus.

Figure 18:
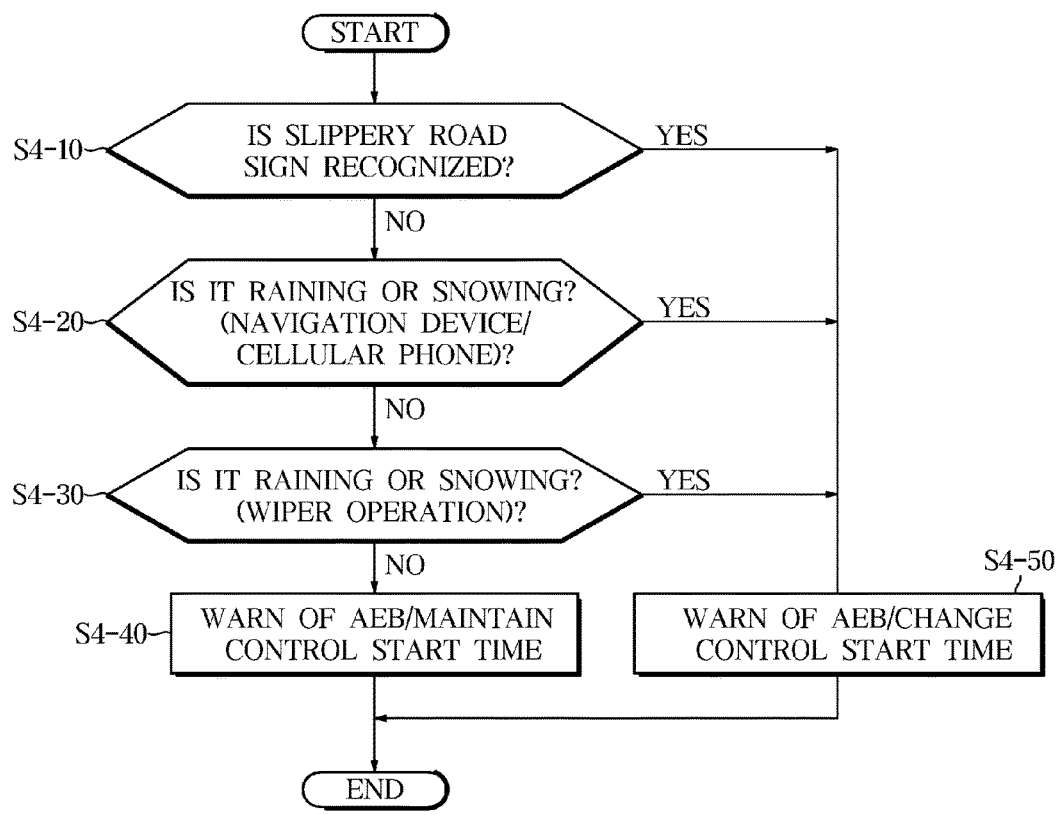
FIG. 18 is a diagram showing an emergency braking method according to the fourth embodiment of the present disclosure.

FIG. 18 is a diagram showing an emergency braking method according to the fourth embodiment of the present disclosure.

Referring to FIG. 18, on the basis of recognition of a road sign, it is determined whether a current road is slippery (S4-10).

When it is determined in S4-10 that no road sign is recognized or that the recognized road sign does not warn of a road condition, weather information is checked to determine whether a current road is slippery (S4-20).

When it is determined in S4-20 that the current road is not slippery, it is checked whether the windshield wiper of the host vehicle operates to determine whether the current road is slippery (S4-30).

When it is determined in S4-30 that the current road is not slippery, an emergency braking control start time is maintained without a separate weight being applied when an emergency braking control start time is calculated (S4-40).

When it is determined in S4-10 on the basis of a result of recognizing the road sign that the current road is slippery, the emergency braking control start time is advanced by applying a weight (e.g., ranging from +30% to +70%) when calculating the emergency braking start time in consideration of the increase in braking distance (S4-50).

Also, when it is determined in S4-20 on the basis of the weather information that the current road is slippery, the emergency braking control start time is advanced by applying a weight (e.g., ranging from +30% to +70%) when calculating the emergency braking start time in consideration of the increase in braking distance (S4-50).

Also, when it is determined in S4-30 on the basis of the operation of the windshield wiper of the host vehicle that the current road is slippery, the emergency braking control start time is advanced by applying a weight (e.g., ranging from +30% to +70%) when calculating the emergency braking start time in consideration of the increase in braking distance (S4-50).

Also, when a result of analyzing the road condition from the region-in-front image acquired using the camera system 1 is that the current road is slippery, the emergency braking control start time is advanced by applying a weight (e.g., ranging from +30% to +70%) when calculating the emergency braking start time in consideration of the increase in braking distance (S4-50).

According to the present disclosure, it is possible to implement a voltage logic and a memory logic that may be used in a front-view camera system for an ADAS.

Also, according to the present disclosure, a scheme capable of coupling a lens barrel and a lens holder in a front-view camera system for an ADAS may be provided.

Also, according to the present disclosure, it is possible to control an emergency braking start time according to a degree to which a road is slippery.

Also, according to the present disclosure, it is possible to prevent a head-on/rear-end collision accident due to the increase in braking distance by advancing the emergency braking start time when it is determined that the road is slippery.

Fifth Embodiment

When a host vehicle is traveling at high speed, the possibility of an accident increases due to a vehicle cutting ahead of the host vehicle. In this case, when a driver's response is late, a collision with the vehicle ahead may occur. The collision may be prevented through vehicle deceleration, vehicle acceleration, and a change of a lane in which the vehicle is traveling. To this end, a technique for finding the presence of a vehicle traveling ahead of the host vehicle and a vehicle cutting ahead of the host vehicle is required.

The fifth embodiment of the present disclosure relates to a camera system for an ADAS and a driving assistance system for controlling a host vehicle using the camera system.

The fifth embodiment of the present disclosure will be described below with reference to FIGS. 19A to 19C, 20A to 20C, and 21.

Figure 19A:
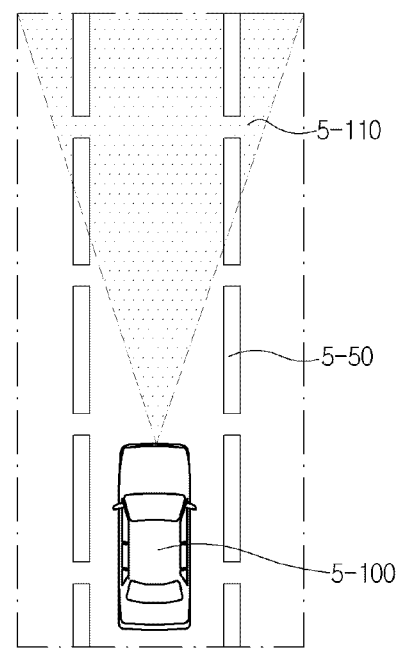
FIGS. 19A to 19C are views illustrating lateral vehicle control according to a fifth embodiment of the present disclosure.
Figure 19B:
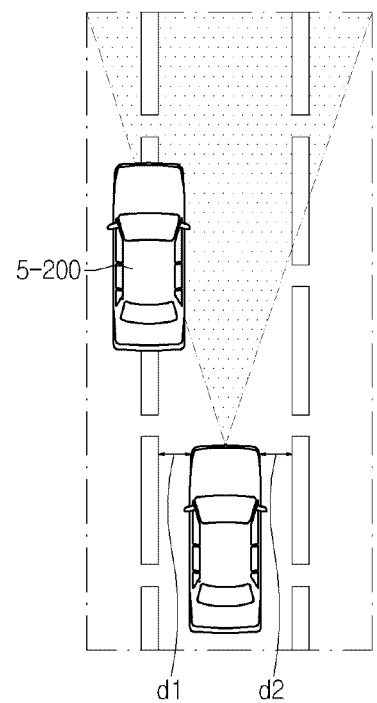
Figure 19C:
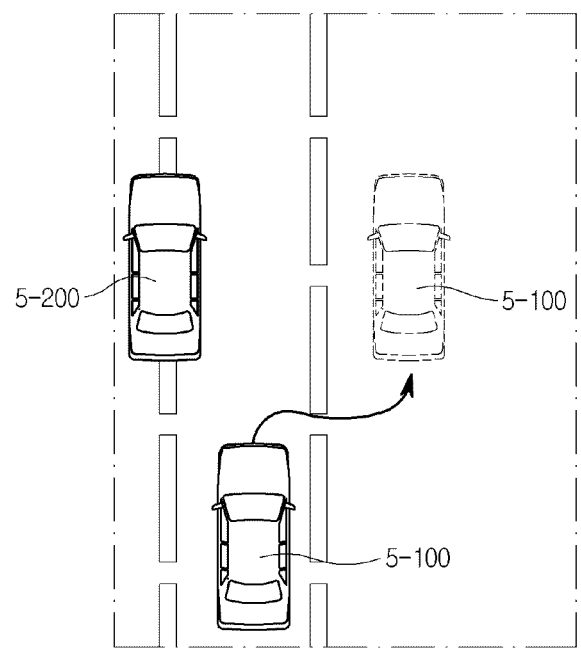

FIGS. 19A to 19C are views illustrating lateral vehicle control according to the fifth embodiment of the present disclosure.

Reference will be made to FIGS. 1, 3, and 19A to 19C. In FIG. 19A, a host vehicle 5-100 may use the camera system 1 including at least one image sensor to discover the location of the host vehicle 5-100 and a region 5-110 ahead of the host vehicle 5-100 in a lane in which the host vehicle 5-100 is traveling. The region 5-110 ahead may refer to a lane ahead of the host vehicle 5-100 and a lane next to the front lane. The lane in which the host vehicle 5-100 is traveling is defined as the first lane 5-50. The location of the host vehicle 5-100 in the first lane 5-50 may be a lateral distance between the host vehicle 5-100 and the first lane 5-50.

In FIG. 19B, the host vehicle 5-100 may use the camera system 1 to discover the first lane 5-50 in which the host vehicle 5-100 is traveling and a third-party vehicle 5-200 which cuts ahead of the host vehicle 5-100 (e.g., a third-party vehicle that cuts into, at least partially overlaps with, or impinges on the travel lane or route of the host vehicle 5-100). In this case, the camera system 1 may discover a distance between the host vehicle 5-100 and the first lane 5-50 by discovering the first lane 5-50. In this case, the ECU 5-320 may calculate a location at which the host vehicle 5-100 is placed in the first lane 5-50. In detail, the ECU 5-320 may calculate a first distance d1 between the first lane 5-50 and the left side of the host vehicle 5-100 and a second distance d2 between the first lane 5-50 and the right side of the host vehicle 5-100. Also, the ECU 5-320 may obtain a lateral positional relationship between the host vehicle 5-100 and the third-party vehicle 5-200 through information regarding the first lane 5-50 detected by the camera system 1 and information regarding the location of the third-party vehicle 5-200. As an example, the ECU 5-320 may obtain the lateral locations of the host vehicle 5-100 and the third-party vehicle 5-200 through the location of the third-party vehicle 5-200, the first-lane overlapping degree between the host vehicle 100 and the third-party vehicle 5-200, and the like, which are detected by the camera system 1.

Also, a radar apparatus may measure the distance between the host vehicle 5-100 and the third-party vehicle 5-200. A radar system is a sensor that uses electromagnetic waves to measure the distance, speed, or angle of an object. Generally, the radar system may be located at the front grille of a vehicle to cover even a front lower portion of the vehicle. The reason why the radar apparatus is disposed at the front grill, that is, outside the vehicle, in other words, the reason why the radar apparatus is not allowed to transmit and receive signals through the windshield of the vehicle is a reduction in sensitivity when electromagnetic waves pass through glass. According to the present disclosure, the electromagnetic waves may be prevented from passing through the windshield while the radar apparatus is located inside the vehicle, in particular, below the windshield inside the vehicle. To this end, the radar apparatus is configured to transmit and receive electromagnetic waves through an opening provided in an upper portion of the windshield. Also, a cover is disposed at a location corresponding to the opening for the radar apparatus. The cover is to prevent loss (e.g., an inflow of air, or the like) due to the opening. Also, it is preferable that the cover be made of a material capable of being easily penetrated by electromagnetic waves of frequencies the radar apparatus uses. As a result, the radar apparatus is located inside the vehicle, but electromagnetic waves are transmitted and received through the opening provided in the windshield. The cover corresponding to the opening is provided in order to prevent the loss due to the opening, and the electromagnetic waves are transmitted and received through the cover. The radar apparatus may use beam aiming, beam selection, digital beam forming, and digital beam steering. Also, the radar apparatus may include an array antenna or a phased array antenna. In this case, the ECU 5-320 may obtain a lateral positional relationship between the host vehicle 5-100 and the third-party vehicle 5-200 through the information measured by the radar apparatus.

In FIG. 19C, the ECU 5-320 may determine a risk of collision with the third-party vehicle 5-200 on the basis of the location of the host vehicle 5-100 in the first lane 5-50 and thus may control the steering and speed of the host vehicle 5-100. The camera system 1 may discover whether another vehicle is present in the second lane, which is opposite to a lane from which the third-party vehicle 5-200 cuts into the first lane 5-50.

As an example, when there is no vehicle in the second lane, the ECU 5-320 may control the steering of the host vehicle 5-100 so that the host vehicle 5-100 makes a lane change to the second lane. By the control of the ECU 5-320, it is possible to prevent a collision between the host vehicle 5-100 and the third-party vehicle 5-200.

Figure 20A:
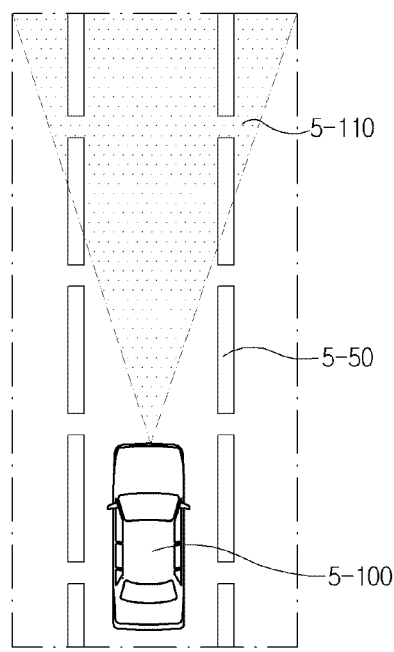
FIGS. 20A to 20C are views illustrating longitudinal vehicle control according to the fifth embodiment of the present disclosure.
Figure 20B:
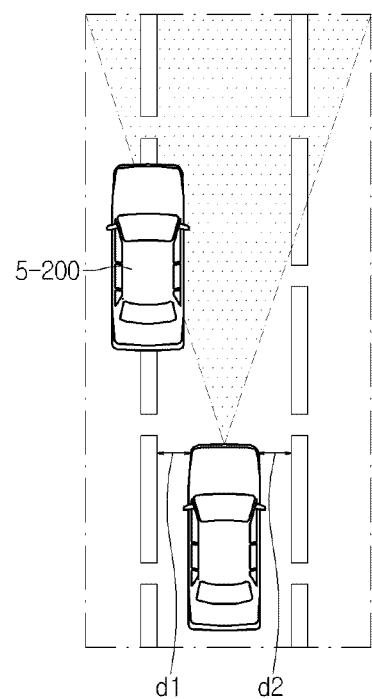
Figure 20C:
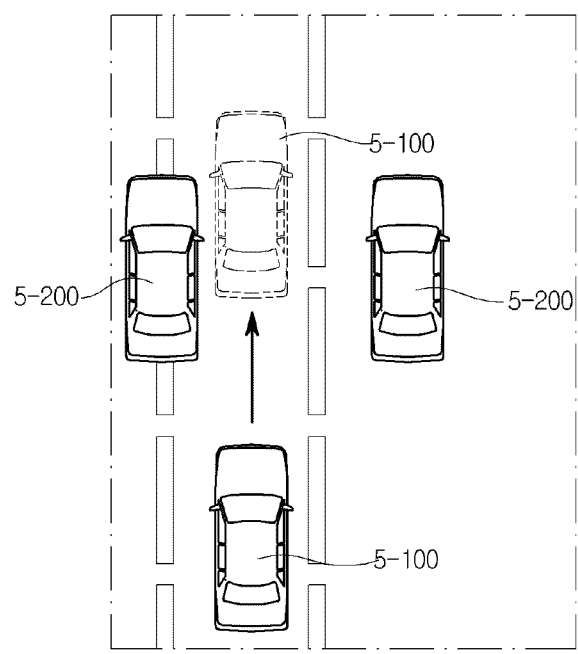

FIGS. 20A to 20C are views illustrating longitudinal vehicle control according to the fifth embodiment of the present disclosure. For simplicity of description, a repetitive description of those described with reference to FIG. 19 will be omitted. FIGS. 20A and 20B are the same as or similar to FIGS. 19A and 19B, and thus a description thereof will be omitted.

Reference will be made to FIGS. 1, 3, and 20. In FIG. 20C, the ECU 5-320 may determine a risk of collision with the third-party vehicle 5-200 on the basis of the location of the host vehicle 5-100 in the first lane 5-50 and thus may control the steering and speed of the host vehicle 5-100. The camera system 1 may discover whether another vehicle is present in the second lane, which is opposite to a lane from which the third-party vehicle 5-200 cuts into the first lane 5-50.

As an example, when a third vehicle 5-300, which is still another vehicle, is present in the second lane, the ECU 5-320 may determine whether the host vehicle 5-100 can pass the third-party vehicle 5-200 before the third-party vehicle 5-200 completely enters the first lane 5-50. In detail, the ECU 5-320 may determine whether the host vehicle 5-100 can pass the third-party vehicle 5-200 through the lateral and longitudinal positional relationships between the host vehicle 5-100 and the third-party vehicle 5-200, which are discovered by the camera system 1, and the speeds of the host vehicle 5-100 and the third-party vehicle 5-200, which are discovered by the radar apparatus. When it is determined that the host vehicle 5-100 can pass the third-party vehicle 5-200, the ECU 5-320 may accelerate the host vehicle 5-100. On the other hand, when it is determined that the host vehicle 5-100 cannot pass the third-party vehicle 5-200, the ECU 5-320 may decelerate the host vehicle 5-100 to prevent a collision with the third-party vehicle 5-200. Thus, the third-party vehicle 5-200 may enter the first lane 5-50 and may be located ahead of the host vehicle 5-100.

Figure 21:
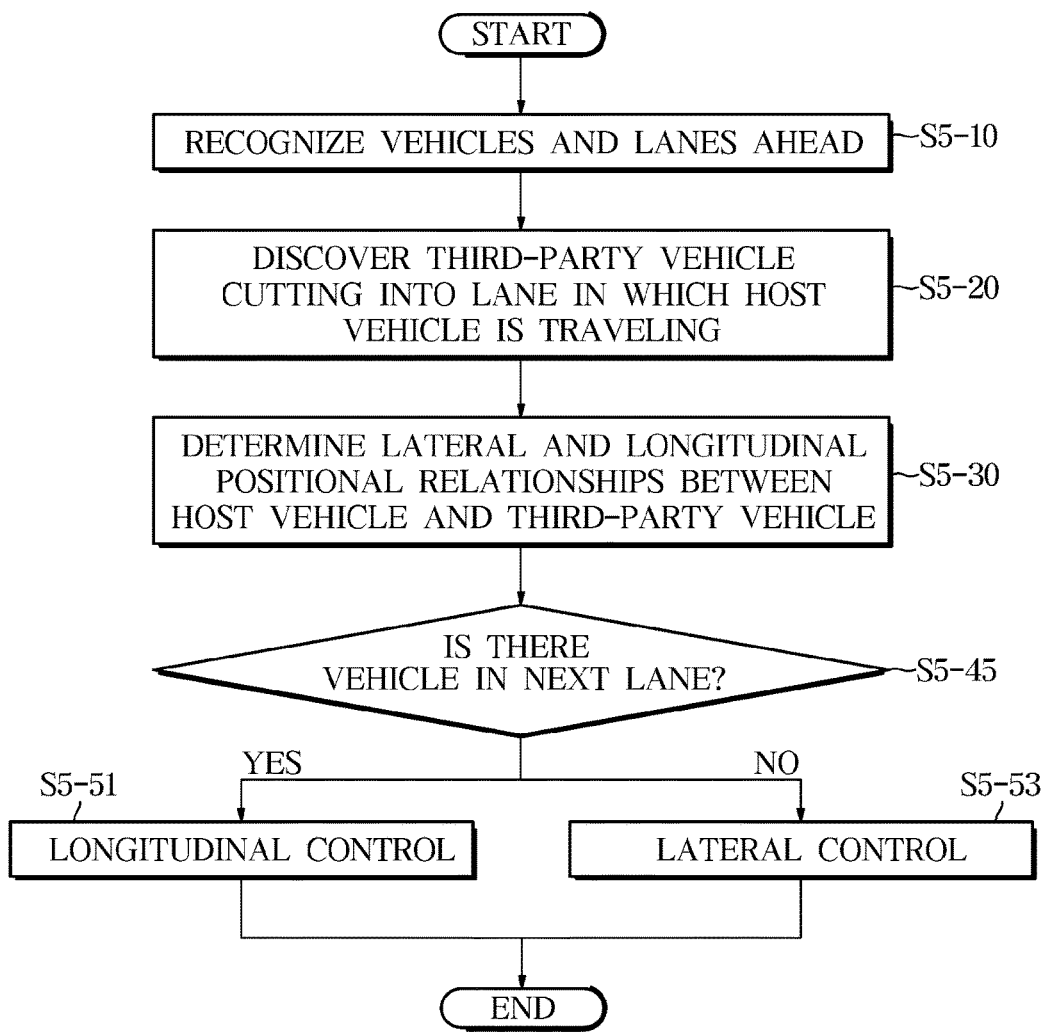
FIG. 21 is a flowchart illustrating vehicle control according to the fifth embodiment of the present disclosure.

FIG. 21 is a flowchart illustrating vehicle control according to the fifth embodiment of the present disclosure.

Referring to FIG. 21, a camera system installed in a host vehicle may discover a region ahead of the host vehicle. The camera system may recognize a vehicle ahead and a lane which are located ahead of the host vehicle (S5-10). When a third-party vehicle cuts ahead into a lane in which the host vehicle is traveling, the camera system may discover the lateral location of the third-party vehicle through the location of the third-party vehicle and the overlapping degree between the third-party vehicle and the lane (S5-20). The ECU may determine the lateral and longitudinal positional relationships between the host vehicle and the third-party vehicle through information regarding the location of the host vehicle and the location of the third-party vehicle in the first lane, which is acquired by the camera system, and information regarding a distance between the host vehicle and the third-party vehicle, which is acquired by the radar apparatus (S5-30). In this case, the camera system may discover whether still another vehicle (a third-party vehicle) is present in a lane next to the lane in which the host vehicle is traveling. The next lane refers to a lane opposite to a lane from which the third-party vehicle is entering the first lane (S5-45). When a third vehicle is present in the next lane, the ECU may decelerate or accelerate the host vehicle to prevent a collision between the host vehicle and the third-party vehicle. That is, the ECU may perform longitudinal control on the host vehicle (S5-51). When no third vehicle is present in the next lane, the ECU may control the steering of the host vehicle so that the host vehicle enters the next lane. That is, the ECU may perform lateral control on the host vehicle. In addition, the ECU may control the speed of the host vehicle (S5-53).

Sixth Embodiment

At an intersection, a host vehicle may go straight, turn around, or turn left or right, and vehicles other than the host vehicle may also turn around or turn left or right. Thus, a vehicle collision accident may occur frequently. When a collision between the host vehicle and a nearby vehicle is expected, a CTA system according to the related art performs only braking control. Also, the convention CTA system does not have a function of warning a driver of a collision risk or of controlling steering to avoid the collision, and thus has a limitation in preventing a collision accident at an intersection.

The sixth embodiment of the present disclosure is directed to providing a camera system for an ADAS and a CTA system and method which are capable of performing steering control on the host vehicle as well as capable of sensing a risk of collision between the host vehicle and a nearby vehicle at an intersection on the basis of whether the host vehicle is stopped or traveling and whether the steering wheel is operated and capable of warning the driver of a collision risk according to a collision risk level.

The sixth embodiment will be described below with reference to FIGS. 22A, 22B, 23A, and 23B.

Figure 22A:
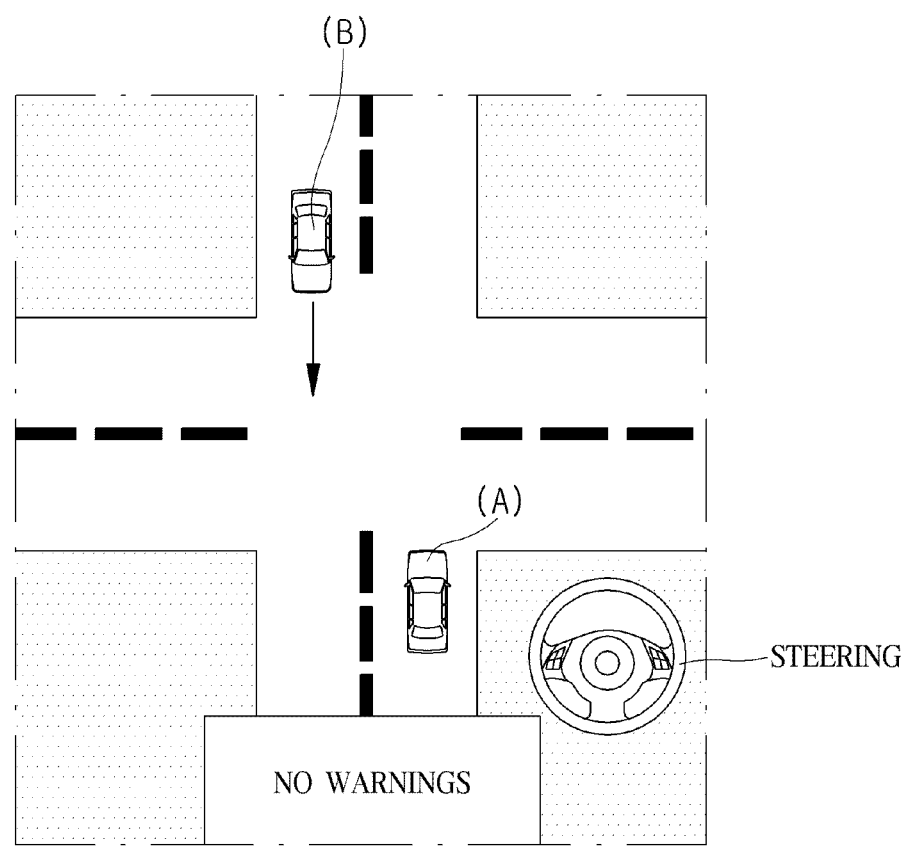
FIG. 22A is a diagram showing an example in which a warning for a collision risk is not issued when a steering wheel is not operated while a host vehicle is stopped at an intersection according to a sixth embodiment of the present disclosure.

FIG. 22A is a diagram showing an example in which a warning for a collision risk is not issued when while a host vehicle is stopped at an intersection and the steering wheel is not operated according to the sixth embodiment of the present disclosure.

Referring to FIG. 22A, when a host vehicle A is stopped at an intersection and the steering wheel is not operated, that is, the driver has no intention to turn left, right, or around, there is less or no risk of collision between the host vehicle A and a nearby vehicle B. Accordingly, a separate warning for the collision risk is not issued.

Figure 22B:
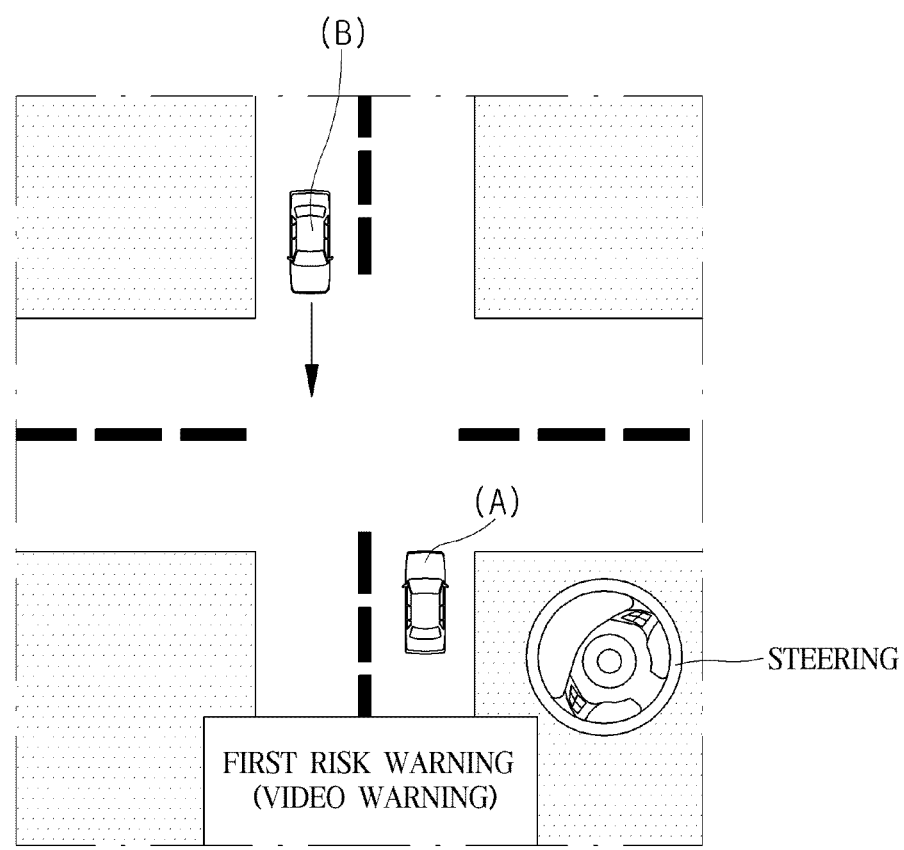
FIG. 22B is a diagram showing an example in which a warning for a first-level collision risk is issued when the steering wheel is operated while a host vehicle is stopped at an intersection according to the sixth embodiment of the present disclosure.

FIG. 22B is a diagram showing an example in which a warning for a first-level collision risk is issued when a host vehicle is stopped at an intersection and the steering wheel is operated.

Referring to FIG. 22B, when the host vehicle A is stopped at the intersection, an ECU 6-320 checks whether the steering wheel is operated to turn left, right, or around. Also, when the steering wheel of the host vehicle A is operated, the ECU 6-320 determines whether there is a risk of collision with the nearby vehicle B while the host vehicle A is traveling in a desired direction.

Here, at least one of a lidar MCU 6-311, a radar MCU 6-312, and a camera MCU 6-42 may detect the nearby vehicle B, and the ECU 6-320 may determine whether there is a risk of collision between the host vehicle A and the nearby vehicle B. When the steering wheel is operated while the host vehicle A is stopped, the ECU 6-320 determines a first-level risk of collision between the host vehicle A and the nearby vehicle B and warns the driver of the first-level collision risk.

When the warning for the first-level collision risk is issued, a driver warning controller 6-331 may display a video warning message or a warning image to the driver through an HUD or a side mirror display to warn the driver of the first-level collision risk.

Figure 23A:
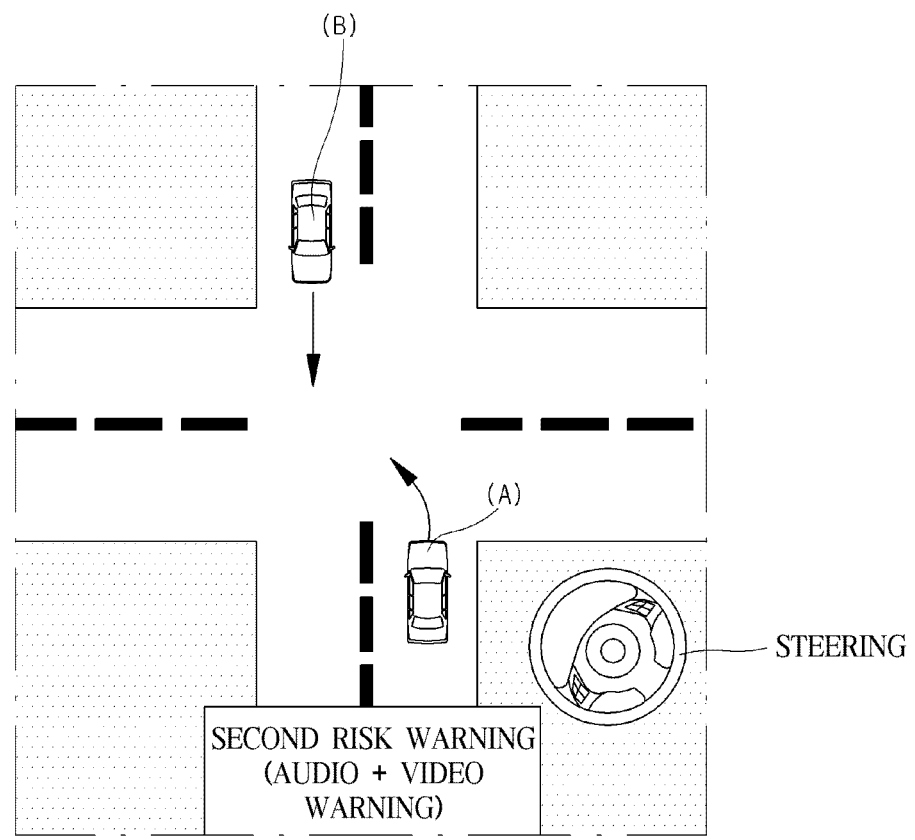
FIG. 23A is a diagram showing an example in which a warning for a second-level collision risk is issued when a host vehicle starts traveling at an intersection and is expected to collide with a nearby vehicle according to the sixth embodiment of the present disclosure.

FIG. 23A is a diagram showing an example in which a warning for a second-level collision risk is issued when a host vehicle starts traveling at an intersection and is expected to collide with a nearby vehicle.

Referring to FIG. 23A, when a host vehicle A starts traveling at the intersection and the steering wheel is operated to turn left, right, or around, the ECU 6-320 determines whether there is a risk of collision between the host vehicle A and a nearby vehicle B.

When a risk of collision between the host vehicle and the nearby vehicle is expected while the vehicle is traveling in a direction in which the steering wheel is operated, the ECU 6-320 determines a second-level collision risk and warns the driver of the second-level collision risk. When the host vehicle starts traveling although the warning for the first collision risk is issued while the host vehicle A is stopped, the risk of collision with the nearby vehicle increases, and thus the ECU 6-320 determines the second-level collision risk.

When the warning for the second-level collision risk is issued, the driver warning controller 6-331 displays a video warning message or a warning image to the driver through an HUD or a side mirror display and also generates a warning signal in an audio manner. In this case, the driver warning controller 6-331 may use a vehicle sound system to output warning sounds. That is, when the host vehicle starts traveling at an intersection and the steering wheel is operated to turn left, right, or around, the ECU 6-320 determines the second-level collision risk and outputs a video collision warning and an audio collision warning simultaneously to warn the driver of the second-level warning risk.

Figure 23B:
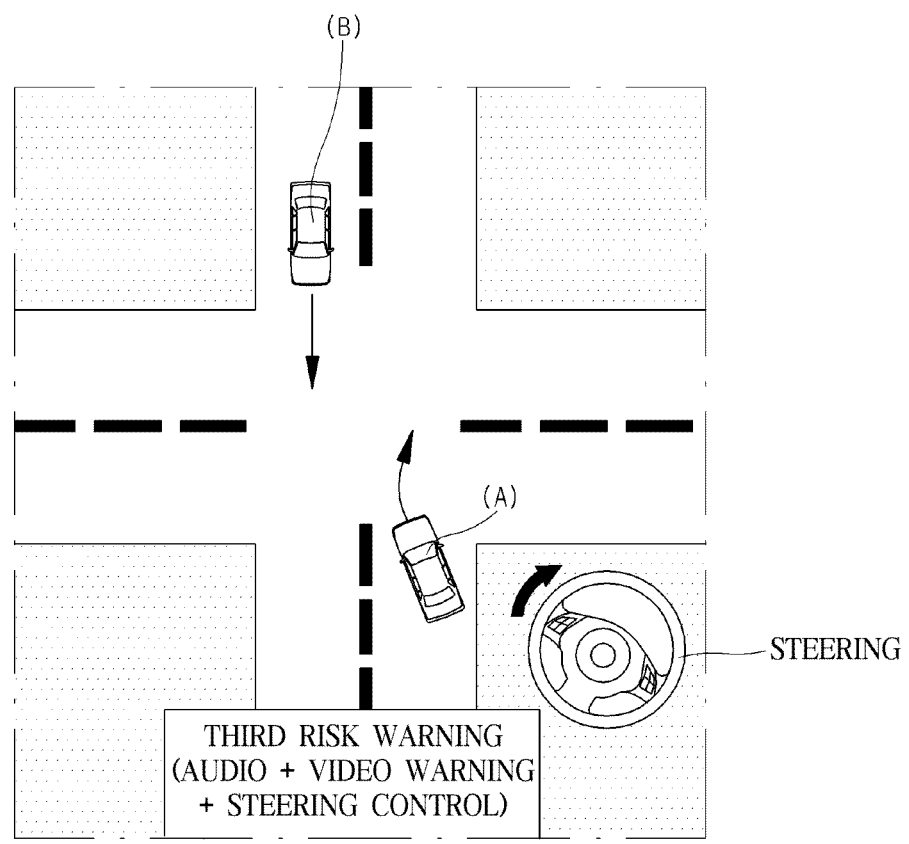
FIG. 23B is a diagram showing an example in which a warning for a third-level collision risk is issued when a host vehicle starts traveling at an intersection and is expected to collide with a nearby vehicle and the steering wheel is not operated for the purpose of braking or collision avoidance according to the sixth embodiment of the present disclosure.

FIG. 23B is a diagram showing an example in which a warning for a third-level collision risk is issued when a host vehicle starts traveling at an intersection and is expected to collide with a nearby vehicle and the steering wheel is not operated for the purpose of braking or collision avoidance.

Referring to FIG. 23B, while the steering wheel is operated for the host vehicle to turn left, right, or around at an intersection, the ECU 6-320 determines whether there is a risk of collision with a nearby vehicle. Here, it is assumed that there is a collision risk when the host vehicle maintains a current traveling direction, but braking is not performed or the steering wheel is not operated to avoid the collision. In this case, the ECU 6-320 determines the third-level collision risk and warns the driver of the third-level collision risk.

When the warning for the first-level collision risk or the warning for the second-level collision risk is already issued or when the braking is not performed or the steering wheel is not operated for collision avoidance although the warning for the first-level collision risk or the warning for the second-level collision risk is issued, a serious collision risk is expected. In this case, the ECU 6-320 determines the third-level collision risk, and a steering controller 6-334 controls the steering of the host vehicle so that the host vehicle travels to avoid the collision, as well as the driver warning controller 6-331 issues the warning for the second-level collision risk.

When the warning for the third-level collision risk is issued, the driver warning controller 6-331 displays a video warning message or a warning image to the driver through an HUD or a side mirror display and also generates a warning signal in an audio manner. In this case, the driver warning controller 6-331 may use a vehicle sound system to output warning sounds. That is, when the host vehicle starts traveling at an intersection and the steering wheel is operated to turn left, right, or around, the ECU 6-320 determines the second-level collision risk and outputs a video collision warning and an audio collision warning simultaneously. Furthermore, the steering controller 6-334 controls the steering of the host vehicle to avoid a collision between the host vehicle and the nearby vehicle.

Here, the steering controller 6-334 controls an electronic power steering system (MPDS) for driving the steering wheel. When the vehicle is expected to collide, the steering controller 6-334 controls the steering of the vehicle such that the collision may be avoided or such that damage may be minimized.

When the warning for the third-level collision risk is issued, a suspension controller 6-336 controls the host vehicle such that the posture of the host vehicle is normally maintained, in response to a sudden steering operation for collision avoidance. That is, even when steering control is suddenly performed to avoid the collision, the vehicle posture is maintained to ensure ride comfort and driving stability.

When the warning for the third-level collision risk is issued, but the collision avoidance cannot be guaranteed only by the steering control, the ECU 6-320 may use a brake controller 6-337 to brake the vehicle. That is, when the warning for the third-level risk is issued, the brake controller 6-337 brakes the vehicle on the basis of the control of the ECU 6-320.

Here, when a forward collision is probable, the brake controller 6-337 may perform control so that emergency braking is automatically activated according to a control command of the ECU 6-320 irrespective of whether the driver operates the brake.

With the CTA system and method according to the present disclosure, it is possible to sense a risk of collision between a host vehicle and a nearby vehicle at an intersection and warn a driver of the collision risk according to the level of the collision risk. Also, it is possible to avoid a collision by controlling the steering of the host vehicle as well as issuing the warning for the collision risk according to the level of the collision risk.

Seventh Embodiment

The seventh embodiment of the present disclosure relates to implementation of automatic emergency braking on the basis of a longitudinal TTC and a lateral TTC between a host vehicle and a third-party vehicle in a front-view camera system for an ADAS.

The seventh embodiment of the present disclosure will be described below with reference to FIGS. 24 and 25.

Figure 24:
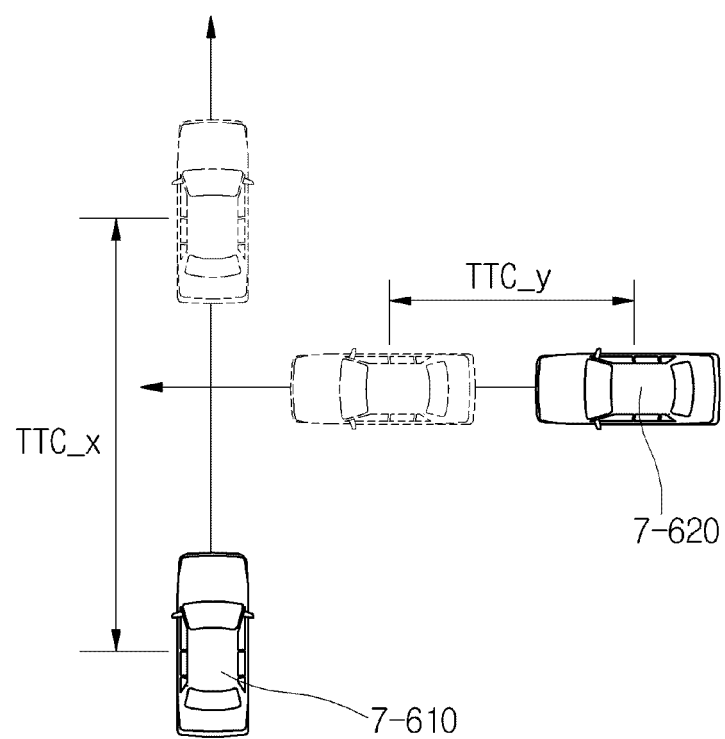
FIG. 24 is a diagram illustrating a host vehicle, a third-party vehicle, and a time-to-collision (TTC) according to a seventh embodiment of the present disclosure.

FIG. 24 is a diagram illustrating a host vehicle, a third-party vehicle, and a TTC according to the seventh embodiment of the present disclosure.

FIG. 24 shows a host vehicle 7-610 and a third-party vehicle 7-620. The host vehicle 7-610 is a vehicle equipped with a camera system according to the present disclosure, and the third-party vehicle 7-620 is any vehicle other than the host vehicle 7-610. As shown in FIG. 6, the third-party vehicle 7-620 is traveling laterally with respect to the host vehicle 7-610. As a representative example, the lateral traveling may occur at an intersection. The TTC is the time required for the host vehicle 7-610 and the third-party vehicle 7-620 to collide with each other. The TTC may be considered as being divided into a longitudinal TTC ($TTC_x$) and a lateral TTC ($TTC_y$). That is, the lateral TTC ($TTC_y$) corresponds to the time required for the third-party vehicle 7-620 to collide with the host vehicle 7-610 along a traveling path of the host vehicle 7-610, and the longitudinal TTC ($TTC_x$) corresponds to the time required for the host vehicle 7-610 to collide with the third-party vehicle 7-620 along a traveling path of the third-party vehicle 7-620.

Figure 25:
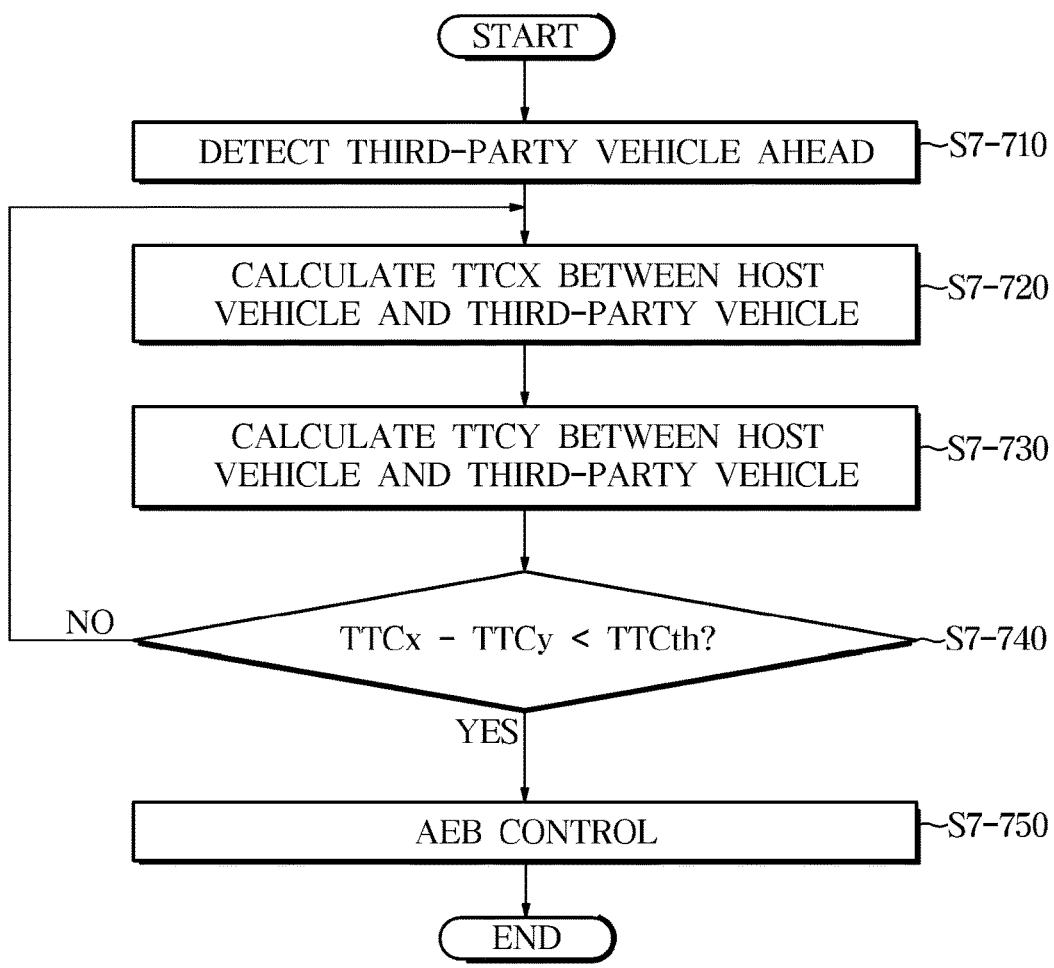
FIG. 25 is a diagram illustrating an autonomous emergency braking (AEB) control algorithm according to the seventh embodiment of the present disclosure.

FIG. 25 is a diagram illustrating an autonomous emergency braking (AEB) control algorithm according to the seventh embodiment of the present disclosure. Such an AEB control algorithm may be performed by the camera system installed in the host vehicle. In detail, the AEB control algorithm may be performed by an image processor in the camera system. However, the present disclosure is not limited thereto, and it is to be understood that the AEB control algorithm may be performed by a camera MCU, another MCU, an ECU, or a combination of a plurality of MCUs and/or ECUs.

First, a third-party vehicle ahead is detected (S7-710). The third-party vehicle is a vehicle traveling laterally with respect to the host vehicle. As a representative example, such a situation may occur at an intersection.

Subsequently, the longitudinal TTC ($TTC_x$) between the host vehicle and the third-party vehicle is calculated (S7-720). The longitudinal TTC is the time required for the host vehicle to collide with respect to a traveling path of the third-party vehicle. The longitudinal TTC may be calculated by calculating an intersection point between the traveling path of the host vehicle and the traveling path of the third-party vehicle, calculating a distance between the host vehicle and the intersection point, and dividing the calculated distance by the speed of the host vehicle.

Subsequently, the lateral TTC ($TTC_y$) between the host vehicle and the third-party vehicle is calculated (S7-730). The lateral TTC is the time required for the third-party vehicle to collide with respect to a traveling path of the host vehicle. The lateral TTC may be calculated by calculating an intersection point between the traveling path of the host vehicle and the traveling path of the third-party vehicle, calculating a distance between the third-party vehicle and the intersection point, and dividing the calculated distance by the speed of the third-party vehicle.

Subsequently, a difference between the longitudinal TTC and the lateral TTC is compared to a pre-determined threshold $TTC_{th}$ (S7-740). When it is determined that the absolute value of the difference is smaller than the pre-determined threshold, AEB is executed (S7-750). When it is determined that the absolute value of the difference is larger than the pre-determined threshold, AEB is not executed. For example, when the longitudinal TTC is 10 seconds and the lateral TTC is 1 second, the absolute value of the difference is calculated as 9 seconds. Nine seconds are enough for the driver to depend (that is, the time is greater than a pre-determined threshold). In this case, the AEB is not executed. However, for example, when the longitudinal TTC is 10 seconds and the lateral TTC is 9 seconds, the absolute value of the difference is calculated as 1 second. One second is not enough for the driver to respond (that is, the time is smaller than the pre-determined threshold). In this case, the AEB is executed.

The pre-determined threshold is determined on the basis of at least one of a longitudinal TTC, a lateral TTC, a road condition, a road inclination, and a temperature. For example, when the longitudinal TTC and the lateral TTC are large (e.g., which are equal to 50 seconds and 49 seconds, respectively) although the absolute value of the difference is 1 second, it is preferable that the pre-determined threshold be set to be small. On the other hand, when the longitudinal TTC and the lateral TTC are small (e.g., which are equal to 5 seconds and 4 seconds, respectively) although the absolute value of the difference is 1 second, it is preferable that the pre-determined threshold be set to be large. Also, it is preferable that the pre-determined threshold be set to be larger when the road is wet than when the road is dry. Also, it is preferable that the pre-determined threshold be set to be larger when the road is downhill than when the road is uphill or flat. Also, it is preferable that the threshold value be set to be larger when the temperature is low than when the temperature is high.

Eighth Embodiment

A vehicle entering an intersection is more likely to collide with a nearby vehicle. When the host vehicle is decelerated or stopped while entering the intersection, a vehicle traveling behind the host vehicle may not recognize a signal at the intersection and thus may not decelerate. Accordingly, the collision risk may increase. In order to prepare for such a case, recently, research has been actively conducted on a control or warning system capable of a driver avoiding a collision possibility.

The eighth embodiment of the present disclosure relates to a camera system for an ADAS and a driving assistance system for warning a driver using the camera system.

The eighth embodiment will be described below with reference to FIGS. 26 and 27.

Figure 26:
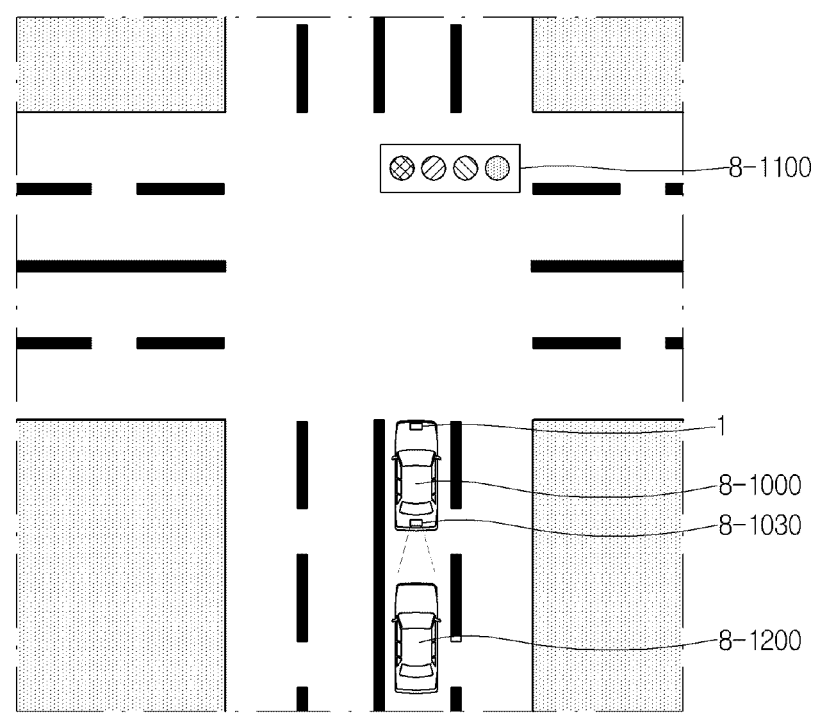
FIG. 26 is a diagram showing an example in which a host vehicle recognizes an ambient situation at an intersection according to an eighth embodiment of the present disclosure.

FIG. 26 is a diagram showing an example in which a host vehicle recognizes an ambient situation at an intersection according to an eighth embodiment of the present disclosure. For simplicity of description, a repetitive description will be omitted.

Referring to FIGS. 3 and 26, there are a host vehicle 8-1000 entering an intersection and a nearby vehicle 8-1200 traveling behind or beside the host vehicle 8-1000. The host vehicle 8-1000 may be equipped with a camera system 1 for sensing a region ahead with respect to a vehicle traveling direction and a rear radar 8-1030 for recognizing regions behind and to a side. Generally, the camera system 1 may be placed on the front of the host vehicle 8-1000, and the rear radar 8-1030 may be placed on the rear of the host vehicle 8-1000. However, the rear radar 8-1030 may be placed on the side of the host vehicle 8-1000, and the locations of the camera system 1 and the rear radar 8-1030 may not be particularly limited.

The camera system 1 may sense that the signal of a traffic light 8-1100 changes from green to yellow or red. That is, the camera system 1 may sense that the signal of the traffic light 8-1100 changes from a "Go" signal to a "Stop" signal and may transmit data regarding the sensed signal to an ECU 8-320. The driver is aware of the yellow or red signal of the traffic light 8-1100 and decelerates the host vehicle 8-1000.

The rear radar 8-1030 may recognize the nearby vehicle 8-1200 that may be likely to collide with the host vehicle 8-1000. The rear radar 8-1030 may be the radar apparatus that has been described with reference to FIG. 3. The rear radar 8-1030 may measure the presence of the nearby vehicle 8-1200, the distance from the nearby vehicle 8-1200, the speed of the nearby vehicle 8-1200, and/or the traveling angle of the nearby vehicle 8-1200, or the like. The traveling angle may refer to a direction in which the nearby vehicle 8-1200 is actually traveling with respect to the direction of a lane in which the nearby vehicle 8-1200 is traveling. The rear radar apparatus 8-1030 may be used to sense objects ahead within a horizontal angle of 30 degrees and a distance of 150 meters by FMCW or Pulse Carrier.

The ECU 8-320 may receive signal data of the traffic light 8-1100 sensed by the camera system 1 and data regarding the nearby vehicle 8-1200 sensed by the rear radar 8-1030 and determine a risk of collision with the host vehicle 8-1000 and the nearby vehicle 8-1200. As an example, when the host vehicle 8-1000 decelerates or travels at constant speed and the nearby vehicle 8-1200 located behind the host vehicle 8-1000 accelerates toward the host vehicle 8-1000, the ECU 8-320 may determine a collision risk through data regarding a distance between the host vehicle 8-1000 and the nearby vehicle 8-1200, which is measured by the rear radar 8-1030. According to another example, when the host vehicle 8-1000 decelerates or travels at constant speed and the nearby vehicle 8-1200 located beside the host vehicle 8-1000 is steered toward the host vehicle 8-1200, the ECU 8-320 may determine a collision risk through data regarding a distance between the host vehicle 8-1000 and the nearby vehicle 8-1200, which is measured by the rear radar 8-1030, and data regarding a traveling angle of the nearby vehicle 8-1200. As another example, when the host vehicle 8-1000 decelerates and the nearby vehicle 8-1200 accelerates toward the host vehicle 8-1000, the ECU 8-320 may determine a collision risk through the degree of deceleration of the host vehicle 8-1000, the degree of acceleration of the nearby vehicle 8-1200, and the distance between the host vehicle 8-1000 and the nearby vehicle 8-1200. The method in which the ECU 8-320 determines the collision risk is not limited thereto, and the collision risk may be variously determined by combining the data provided by the camera system 1 and the data provided by the rear radar 8-1030.

When it is determined that there is a possibility of a collision between the host vehicle 8-1000 and the nearby vehicle 8-1200, the ECU 8-320 may control a driver warning controller 8-331 to warn the driver of the collision risk. The driver warning controller 8-331 may warn the driver by using at least one of video, audio, and steering wheel vibration. For example, when there is a possibility of a collision between the host vehicle 8-1000 and the nearby vehicle 8-1200, the ECU 8-320 may warn the driver through a dashboard or an HUD in a video manner, warn the driver by generating warning sounds, or warn the driver by vibrating the steering wheel above a certain intensity level. The certain intensity level may be defined as an intensity level greater than normal vibration of the steering wheel that the driver may feel while driving.

Figure 27:
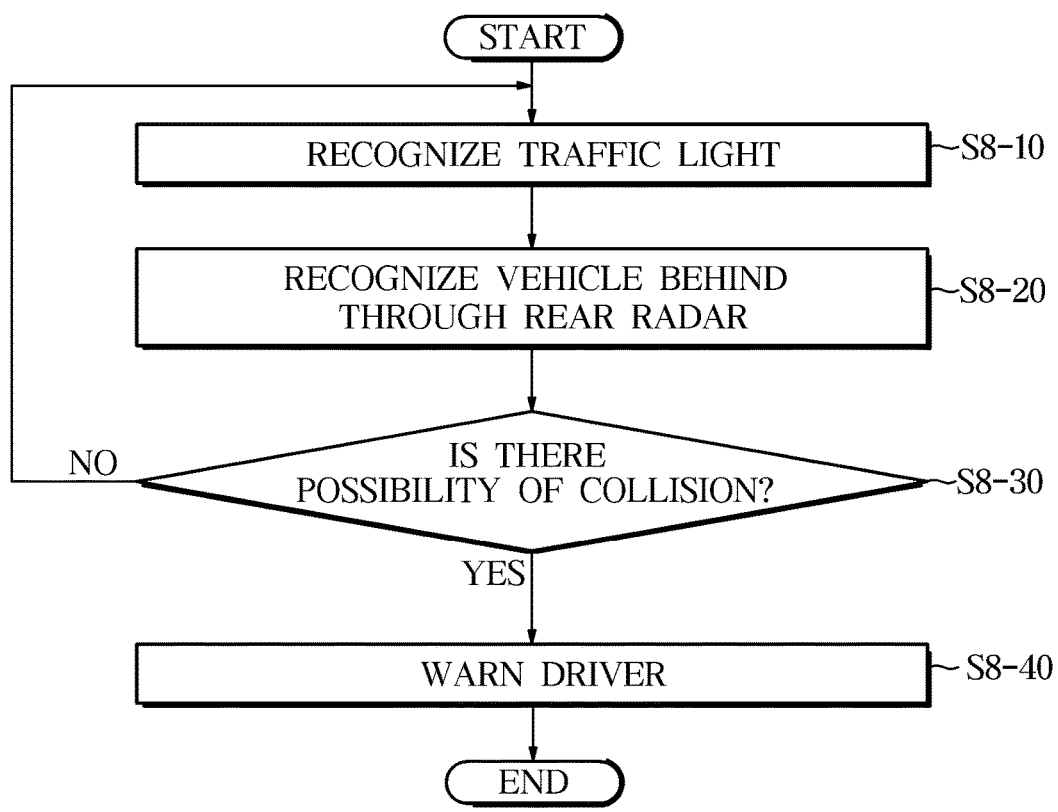
FIG. 27 is a flowchart illustrating an example in which a driver is warned depending on an ambient situation of a host vehicle according to the eighth embodiment of the present disclosure.

FIG. 27 is a flowchart illustrating an example in which a driver is warned depending on an ambient situation of a host vehicle according to the eighth embodiment of the present disclosure. The following description with reference to FIG. 7 will focus on an example in which a vehicle behind is recognized.

Referring to FIG. 27, a traffic light located ahead of the host vehicle may be recognized through a camera system installed in the host vehicle. Through the camera system, a change of the signal of the traffic light from green (indicating a "Go" signal) to yellow or red (indicating a "Stop" signal) may be recognized (S8-10). When the signal of the traffic light is changed to yellow or red, a vehicle behind may be recognized through a rear radar. In this case, the rear radar may be discover the presence of a vehicle behind, the speed of a vehicle behind, a distance between the host vehicle and a vehicle behind, and the traveling angle of a vehicle behind (S8-20). The ECU may determine a possibility of collision between the host vehicle and the vehicle behind by combining the data discovered by the camera system and the data discovered by the rear radar. When the collision possibility is determined, the ECU may mainly compare the speed of the host vehicle and the speed of the vehicle behind. In addition, the ECU may compare the speed of the host vehicle and the data regarding the vehicle behind, which is detected by the rear radar, to determine a collision possibility (S8-35). When there is no collision possibility, the host vehicle may stop or go according to the control of the driver. When the host vehicle enters an intersection again, the ECU may recognize a traffic light at the intersection. When there is a collision possibility, the ECU may warn the driver that there is a collision possibility. When the driver is warned, the driver may control the host vehicle to help avoiding the collision with the vehicle behind (S8-40).

Ninth Embodiment

An intersection is a point where traveling paths of vehicles intersect each other, and thus an accident may occur frequently at an intersection. In particular, when the signal of a traffic light at an intersection is changed, vehicles may cross the intersection without recognizing a "Stop signal" of the traffic light. In this case, there is a need for a technique for determining a collision possibility through the speeds of vehicles and a distance between vehicles irrespective of the presence or absence of the signal.

The ninth embodiment of the present disclosure relates to a driving assistance system for avoiding a collision between vehicles.

The ninth embodiment will be described below with reference to FIGS. 28 to 30.

Figure 28:
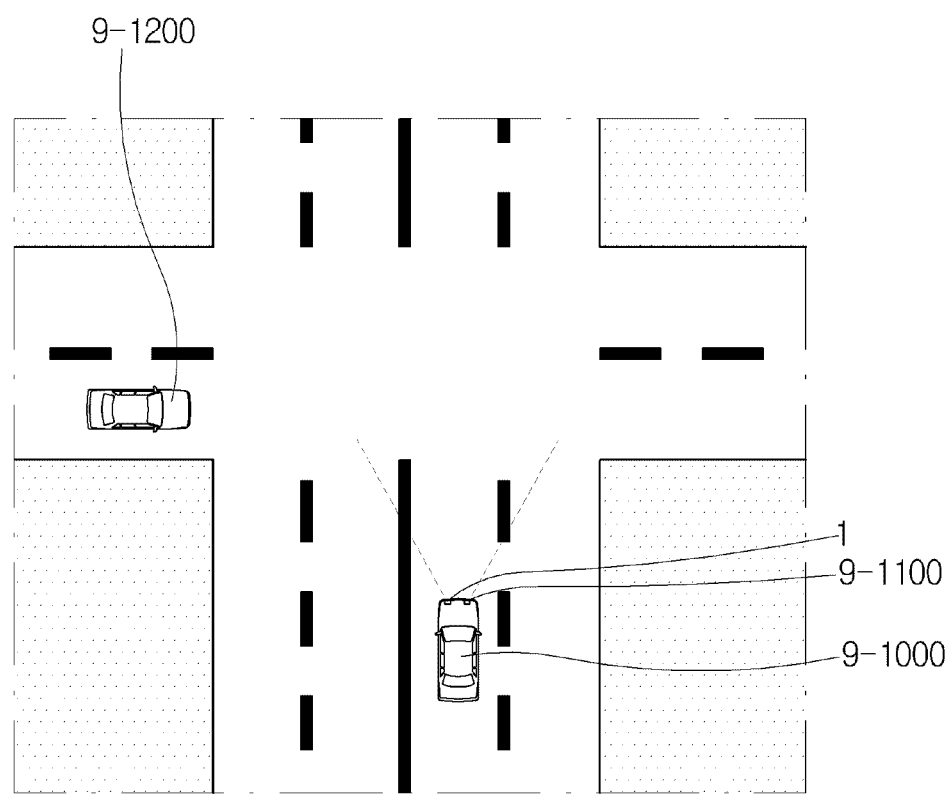
FIG. 28 is a diagram showing locations of a host vehicle and a nearby vehicle at an intersection according to a ninth embodiment of the present disclosure.

FIG. 28 is a diagram showing locations of a host vehicle and a nearby vehicle at an intersection according to the ninth embodiment of the present disclosure. For simplicity of description, a repetitive description will be omitted.

Referring to FIGS. 3 and 28, a host vehicle 9-1000 and a nearby vehicle 9-1200 enter an intersection. As an example, the host vehicle 9-1000 may change steering to turn left, and thus the traveling directions of the host vehicle 9-1000 and the nearby vehicle 9-1200 may intersect each other. The host vehicle 9-1000 may be equipped with a sensor 9-1100 and a camera system 1 for sensing a region ahead of the host vehicle 9-1000. The camera system 1 may acquire an image of the region ahead of the host vehicle 9-1000 and measure the presence and location of the nearby vehicle 9-1200. The sensor 9-1100 may measure a distance between the host vehicle 9-1000 and the nearby vehicle 9-1200 and the speed (relative speed or absolute speed) of the nearby vehicle 9-1200. The sensor 9-1100 may include at least one of a radar and a Lidar.

An ECU 9-320 may determine a risk of collision between the host vehicle 9-1000 and the nearby vehicle 9-1200 through the data acquired by the camera system 1 and the data acquired by the sensor 9-1100 and may calculate a TTC, which is a time to collision. The TTC may be calculated through the traveling paths of the host vehicle 9-1000 and the nearby vehicle 9-1200, the speed (relative speed or absolute speed) of the nearby vehicle 9-1200, and the location of the nearby vehicle 1200 acquired through the camera system 1.

The ECU 9-320 may set a vehicle control start time after calculating the TTC. The vehicle control start time may refer to a time at which a possibility of collision between the host vehicle 9-1000 and the nearby vehicle 9-1200 is recalculated after the TTC is calculated. The vehicle control start time may include a first vehicle control start time and a second vehicle control start time, and the first vehicle control start time may precede the second vehicle control start time. That is, after the collision possibility is re-determined at the first vehicle control start time, the collision possibility is determined at the second vehicle control start time. The ECU 9-320 may recalculate the possibility of collision between the host vehicle 9-1000 and the nearby vehicle 9-1200 gain in the first and second vehicle control start time and may control the host vehicle 9-1000. The ECU 9-320 may control a warning controller 9-331, a steering controller 9-334, and a brake controller 9-337 in order to control the host vehicle 9-1000. However, controller controlled by the ECU 9-320 are not limited thereto.

As an example, when the camera system 1 recognizes the nearby vehicle 9-1200 ahead of the host vehicle 9-1000, the ECU 9-320 may calculate a first TTC and may calculate a second TTC at the first vehicle control start time. In this case, when the second TTC is smaller than the first TTC, the ECU 9-320 may generate a warning to warn the driver. For example, the warning may include a video warning, an audio warning, and a steering handle vibration warning. The ECU 9-320 may calculate a third TTC at the second vehicle control start time. In this case, when the third TTC is smaller than the first TTC or the second TTC, the ECU 9-320 may control the steering and brake of the host vehicle 9-1000 to avoid the collision.

Figure 29:
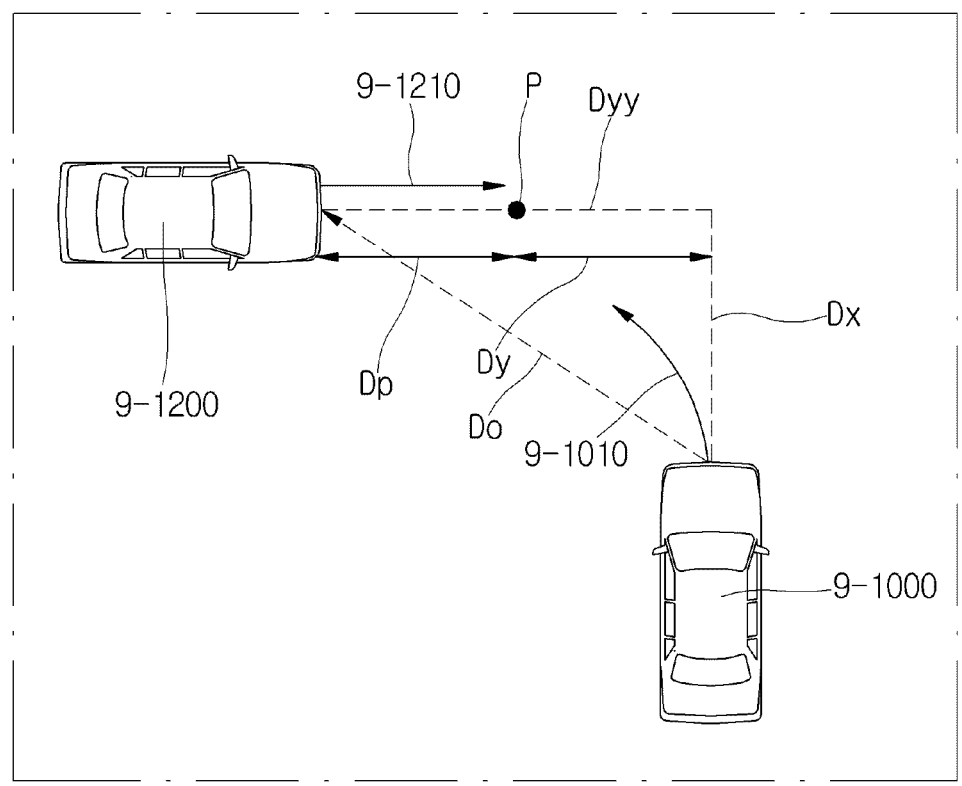
FIG. 29 is a diagram showing two-dimensional (2D) coordinates of a nearby vehicle with respect to a host vehicle according to the ninth embodiment of the present disclosure.

FIG. 29 is a diagram showing 2D coordinates of a nearby vehicle with respect to a host vehicle according to the ninth embodiment of the present disclosure.

Referring to FIGS. 3, 6, and 29, a traveling route 9-1010 of the host vehicle 9-1000 may intersect a traveling route 9-1210 of the nearby vehicle 9-120, and thus there is a collision possibility therebetween. The sensor 9-1100 may measure a straight distance DO between the host vehicle 9-1000 and the nearby vehicle 9-1200 and may measure the speed (relative speed or absolute speed) of the nearby vehicle 9-1200.

As an example, the ECU 9-320 may calculate a TTC of the host vehicle 9-1000 and the nearby vehicle 9-1200 using a relative distance between the host vehicle 9-1000 and the nearby vehicle 9-1200 and the relative speed of the nearby vehicle 9-1200. That is, the ECU 9-320 may obtain the TTC by dividing the relative distance with respect to the nearby vehicle 9-1200 by the relative speed with respect to the nearby vehicle 9-1200.

As another example, the ECU 9-320 may generate 2D coordinates of the nearby vehicle 9-1200 with respect to the host vehicle 9-1000 through the camera system 1 and the sensor 9-1100. The ECU 9-320 may calculate an expected collision point P by comparing a travelable distance Dp corresponding to the absolute speed of the nearby vehicle 9-1200 and a traveling distance Dx corresponding to the absolute speed of the host vehicle 9-1200 through the 2D coordinates and may find a TTC on the basis of the expected collision point P.

Figure 30:
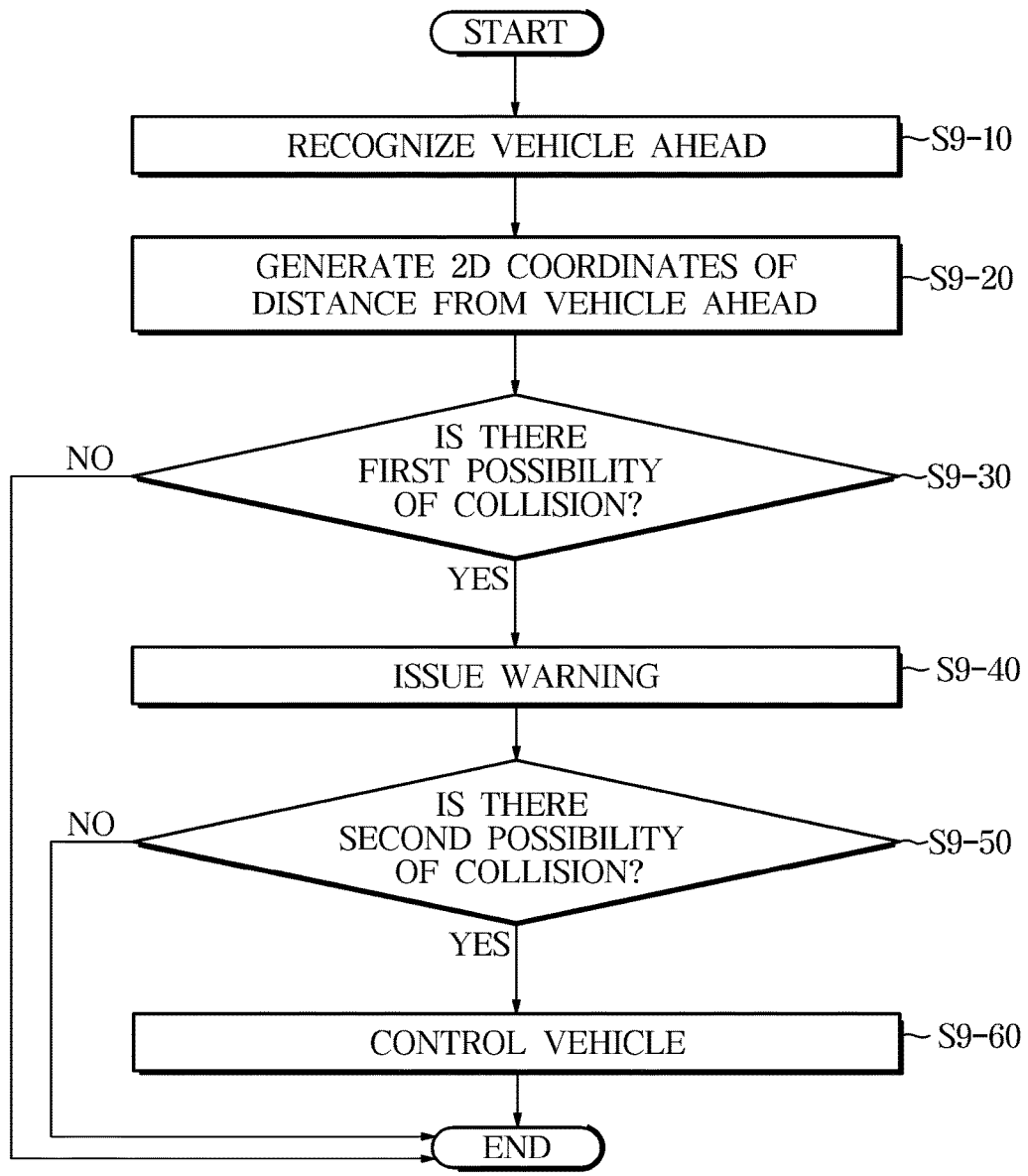
FIG. 30 is a flowchart illustrating the order of controlling a host vehicle according to the ninth embodiment of the present disclosure.

FIG. 30 is a flowchart illustrating the order of controlling a host vehicle according to the ninth embodiment of the present disclosure.

Referring to FIG. 30, a camera system installed in the host vehicle may recognize a nearby vehicle traveling ahead of the host vehicle (S9-10). When the nearby vehicle ahead of the host vehicle is recognized, the sensor may measure the speed of the vehicle ahead and a distance between the host vehicle and the nearby vehicle. The ECU may generate 2D coordinates of the nearby vehicle with respect to the host vehicle through the data measured by the camera system and the data measured by the sensor. The 2D coordinates may be generated in consideration of the locations of the host vehicle and the nearby vehicle and the traveling routes of the host vehicle and the nearby vehicle (S9-20). The ECU 9-320 may calculate a first TTC of the host vehicle and the nearby vehicle by combing information regarding the speeds of the host vehicle and the nearby vehicle with information regarding the 2D coordinates. Subsequently, the ECU 9-320 may re-determine a possibility of collision between the host vehicle and the nearby vehicle and may calculate a second TTC. In this case, when the second TTC is smaller than the first TTC, that is, when the time to collision decreases, the ECU may generate a warning and inform the driver that there is a collision possibility. When the second TTC is large than the first TTC, that is, when the time to collision increases, the ECU may determine that there is no collision possibility such that separate control may not be performed. For example, when the driver changes steering so that the traveling route is changed in the opposite direction before the second TTC is calculated, the collision possibility may decrease (S9-35, S9-40). When the driver is warned, the ECU may re-determine a possibility of collision between the host vehicle and the nearby vehicle and may calculate a third TTC. In this case, when the third TTC is smaller than the first TTC and the second TTC, that is, when the time to collision decreases, the ECU may control the steering of the host vehicle or drive the brake to avoid a collision between the host vehicle and the nearby vehicle (S9-55, S9-60).

Tenth Embodiment

At an intersection, a host vehicle may go straight, turn around, or turn left or right, and nearby vehicles (vehicles traveling laterally) other than the host vehicle may also turn around or turn left or right. Thus, a vehicle collision accident may occur frequently. In particular, a collision accident may occur due to a laterally appearing pedestrian and nearby vehicle. However, when a collision between the host vehicle and a nearby vehicle is expected, a CTA system according to the related art performs only braking control on the host vehicle. When the CTA system is applied to a plurality of vehicles entering an intersection, all of the vehicles may be braked to rather cause a bigger accident.

The tenth embodiment of the present disclosure relates to a CTA system and method capable of setting a priority for CTA control between a host vehicle and a nearby vehicle so that the host vehicle may avoid a collision with a laterally appearing pedestrian and vehicle when the host vehicle enters an intersection.

The tenth embodiment of the present disclosure will be described below with reference to FIGS. 31 to 34.

Figure 31:
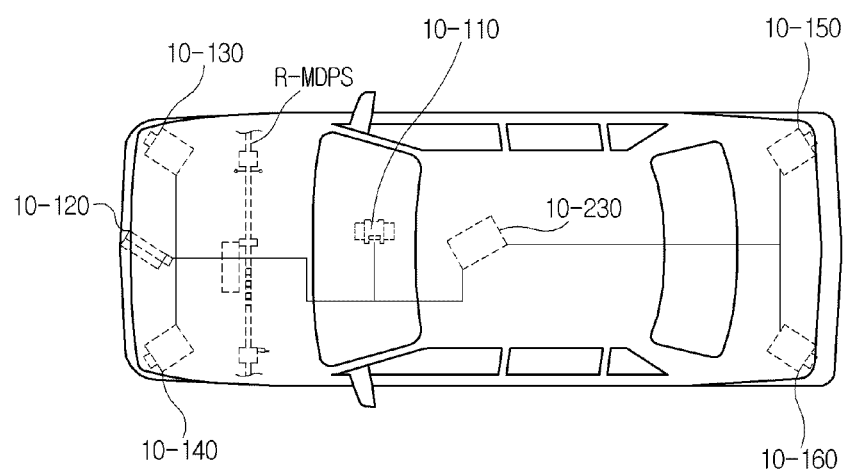
FIG. 31 is a diagram showing a cross traffic alert (CTA) system according to a tenth embodiment of the present disclosure.
Figure 32:
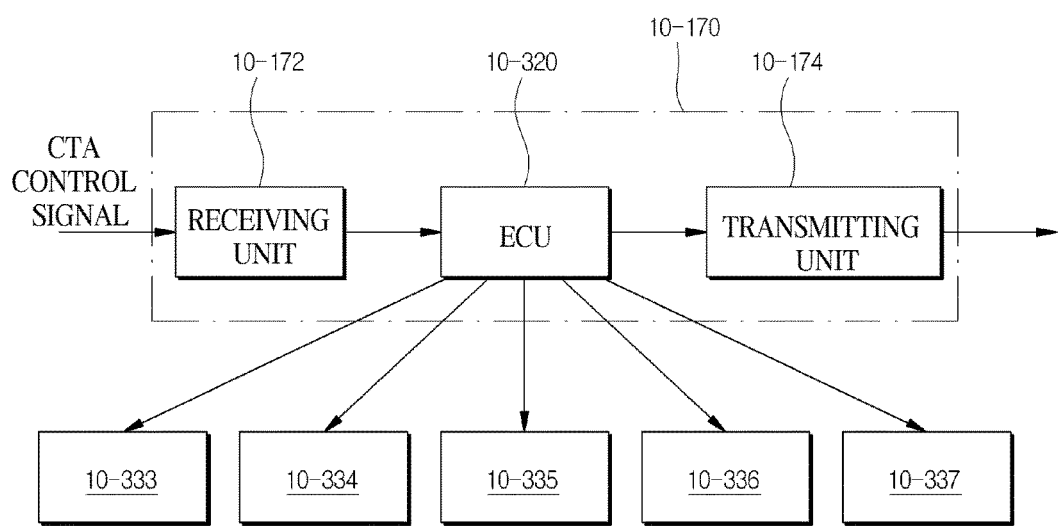
FIG. 32 is a diagram showing controllers controlled for collision avoidance and a control unit shown in FIG. 31.

FIG. 31 is a diagram showing a CTA system according to the tenth embodiment of the present disclosure, and FIG. 32 is a diagram showing controllers controlled for collision avoidance and a control unit shown in FIG. 31.

Referring to FIGS. 31 and 32, the CTA system according to the tenth embodiment of the present disclosure includes a camera system, a radar system, and a control unit 10-170.

The camera system includes at least one camera 10-110. The camera 10-110 may include a mono camera, a stereo camera, or a surround vision camera and may capture regions ahead of, behind, to the left of, and to the right of the vehicle to generate image data. The image data generated by the camera 10-110 is provided to the control unit 10-170.

The radar system includes a front radar 10-120, a front right radar 10-130, a front left radar 10-140, a rear right radar 10-150, a rear left radar 10-160, and a plurality of radar MCUs for driving the radars.

The radar system emits radio waves to the regions ahead of, behind, to the left of, and to the right of the host vehicle and then receives reflected waves to detect objects located ahead, behind, to the left, and to the right within a distance of 150 meters and a horizontal angle of 30 degrees. Here, the radar system detects the objects using FMCW and Pulse Carrier and transmits radar data including a result of detecting the objects to the control unit 10-170.

The control unit 10-170 includes a receiving unit 10-172, an ECU 10-320, and a transmitting unit 10-174.

The receiving unit 10-172, which is disposed in the host vehicle, is connected to a transmitting unit of a nearby vehicle in a wireless communication manner (e.g., 4G long term evolution (LTE)) and is configured to receive a nearby vehicle-specific CTA control signal from the nearby vehicle. The received nearby vehicle-specific CTA control signal is transmitted to the ECU 10-320.

The transmitting unit 10-174, which is disposed in the host vehicle, is connected to a receiving unit of a nearby vehicle in a wireless communication manner (e.g., 4G LTE) and is configured to transmit a host vehicle-specific CTA control signal generated by the ECU 10-320 to the nearby vehicle.

Intersection CTA Control of Host Vehicle

Figure 33:
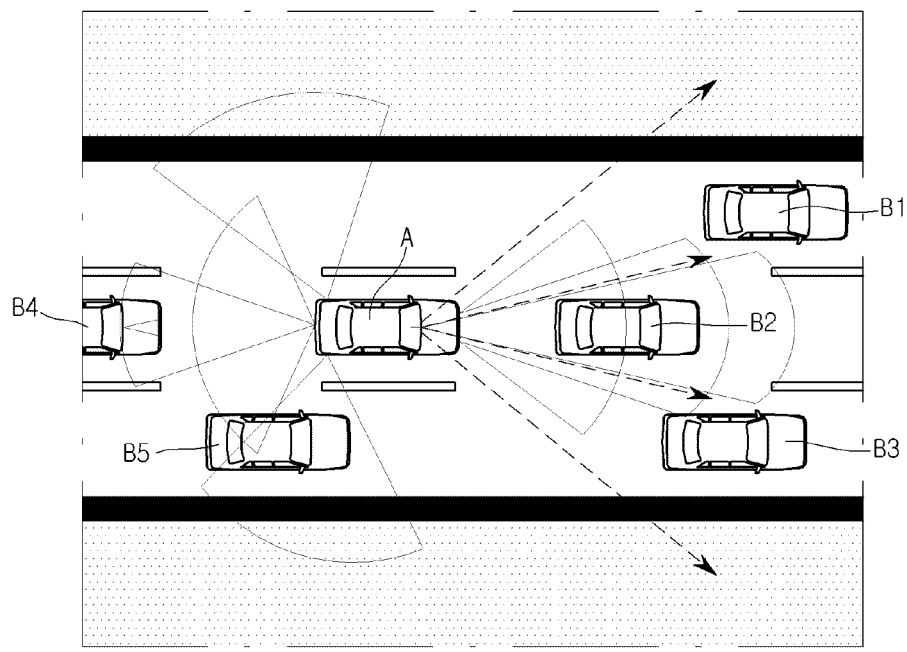
FIG. 33 is a diagram showing an example in which nearby vehicles are detected by a camera system and a radar system disposed in a host vehicle.
Figure 34:
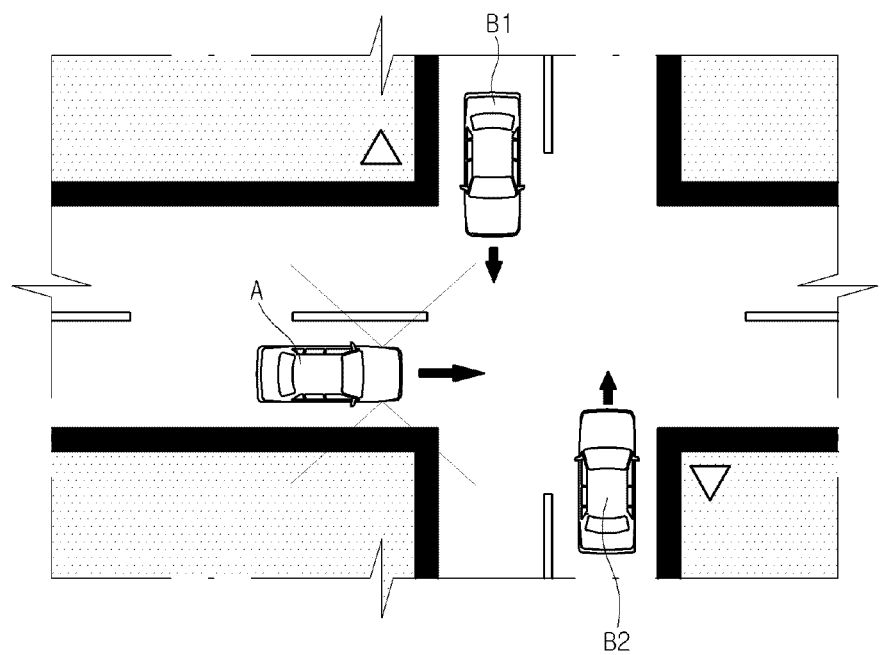
FIG. 34 is a diagram showing a method of setting control priorities of a CTA system when a plurality of vehicles enter an intersection.

FIG. 33 is a diagram showing an example in which nearby vehicles are detected by a camera system and a radar system disposed in a host vehicle, and FIG. 34 is a diagram showing a method of setting control priorities of a CTA system when a plurality of vehicles enter an intersection.

Referring to FIGS. 33 and 34, the ECU 10-320 detects nearby vehicles B1 to B5 on the basis of image data and radar data when a host vehicle A enters an intersection. Also, the ECU 10-320 determines collision possibilities between the host vehicle A and the nearby vehicles B1 to B5 and generates a host vehicle-specific CTA control signal when there is a collision possibility. The ECU 10-320 generates a vehicle control signal for controlling the host vehicle according to the CTA control signal and supplies the generated vehicle control signal to a vehicle posture controller 10-333, a steering controller 10-334, an engine controller 10-335, a suspension controller 10-336, and a brake controller 10-337. In this way, the host vehicle may be controlled to travel at an intersection without CTA emergency braking, steering avoidance, deceleration, acceleration, or CTA control.

CTA Control Priority Determination and CTA Control Between Host Vehicle and Nearby Vehicle The ECU 10-320 detects nearby vehicles B1 and B2 on the basis of image data and radar data when the host vehicle A enters an intersection. Also, the ECU 10-320 determines collision possibilities between the host vehicle A and the nearby vehicles B1 and B2 and generates a host vehicle-specific CTA control signal when there is a collision possibility. The host vehicle-specific CTA control signal generated by the ECU 10-320 is transmitted to the nearby vehicles B1 and B2 through the transmitting unit 10-174.

Here, by comparing CTA control signals transmitted and received between the host vehicle and the nearby vehicles, The ECU 10-320 determines a vehicle for performing CTA emergency braking, a vehicle for performing steering avoidance, a vehicle for performing deceleration, a vehicle for performing acceleration, and a vehicle for traveling without CTA control. That is, by determining CTA control priorities of a plurality of vehicles and sharing the determined CTA control priorities between the host vehicle and the nearby vehicles, the CTA control may be systematically performed at an intersection. In this case, by comparing a CTA control signal of any one of the nearby vehicles as well as the host vehicle and CTA control signals of other nearby vehicles, the ECU 10-320 may determine a vehicle for performing CTA emergency braking, a vehicle for performing steering avoidance, a vehicle for performing deceleration, a vehicle for performing acceleration, and a vehicle for traveling without CTA control.

The ECU 10-320 generates a vehicle control signal for controlling the host vehicle according to the CTA control priorities on the basis of the CTA control signal of the host vehicle or the CTA control signals of the nearby vehicles.

Also, the ECU 10-320 supplies the generated control signal to the vehicle posture controller 10-333, the steering controller 10-334, the engine controller 10-335, the suspension controller 10-336, and the brake controller 10-337. In this way, the host vehicle may be controlled to travel at an intersection without CTA emergency braking, steering avoidance, deceleration, acceleration, or CTA control.

The CTA system and method according to the tenth embodiment of the present disclosure may determine priorities for CTA control through communication between a host vehicle and nearby vehicles when the host vehicle enters an intersection and may enable a plurality of vehicles to systematically perform CTA control at the intersection according to the determined CTA priorities. Also, by detecting a laterally appearing vehicle or pedestrian and performing CTA control when the host vehicle enters the intersection, it is possible to prevent a collision.

Here, by controlling the steering controller 10-334, the engine controller 10-335, and the brake controller 10-337, it is possible to avoid a collision at the intersection. In order to prevent a reduction of ride quality due to a significant change in speed or steering of the host vehicle and prevent an accident due to a driver's posture instability, the vehicle posture controller 10-333 and the suspension controller 10-336 are also controlled to ensure driving stability along with collision avoidance.

Eleventh Embodiment

Recently, research has been accelerated on systems for sensing the surroundings of a vehicle for the purpose of a driver's safety and convenience. The vehicle sensing system is used variously, for example, to sense empty space to perform autonomous parking as well as to sense objects near the vehicle to prevent a collision with an object that is not recognized by the driver. Also, the vehicle detection system provides the most essential data for automatic vehicle control. Typically, such a sensing system includes a system utilizing radar signals and a system utilizing cameras. The system utilizing radar signals is an apparatus for transmitting radar signals to a pre-determined sensing region, collecting signals reflected from the sensing region, analyzing the reflected signals, and sensing the surroundings of a vehicle. Advantageously, this system is excellent in terms of detection accuracy for the location and speed of the vehicle, is less influenced by external environments, and also is excellent in terms of detection performance for an object located longitudinally. However, the system is less accurate in detecting the location and speed of an object located laterally and in classifying objects and detecting information. The system utilizing cameras is an apparatus for analyzing image information acquired through camera capture and sensing the surroundings of the vehicle. Advantageously, this system is good in terms of object classification and detection accuracy for object information. Also, this system is good in terms of speed detection for an object located laterally. However, the system configured to use cameras is easily affected by external environments and has relatively low detection accuracy for distance and speed compared to the system configured to use radar signals.

The eleventh embodiment of the present disclosure relates to a system for sensing a vehicle and pedestrian traveling laterally at an intersection through a combination of a camera and a radar.

The eleventh embodiment of the present disclosure will be described below with reference to FIGS. 35 to 39.

Figure 35:
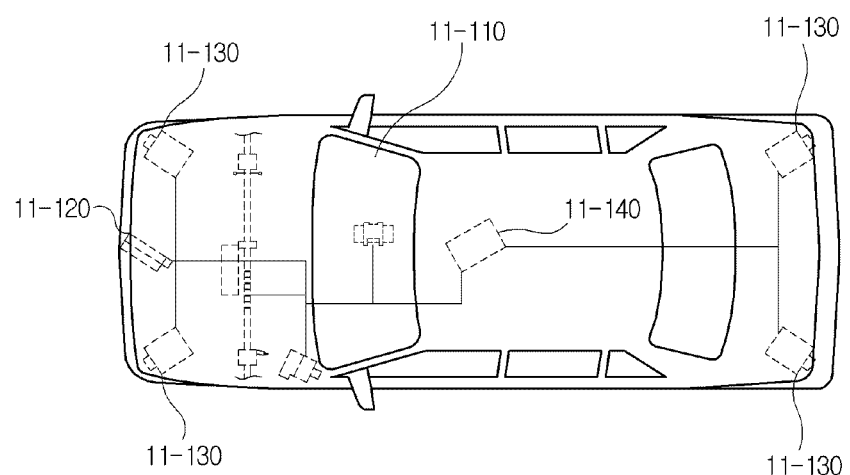
FIG. 35 is a diagram showing a configuration of a vehicular control device according to an eleventh embodiment of the present disclosure.

FIG. 35 is a diagram showing a configuration of a vehicular control device according to the eleventh embodiment of the present disclosure.

Referring to FIG. 35, a vehicular control device 11-100 according to the eleventh embodiment of the present disclosure includes an image generation unit 11-110, a first information generation unit 11-120, a second information generation unit 11-130, and a control unit 11-140.

The image generation unit 11-110 may include at least one camera disposed in a host vehicle 11-10 and may capture a region ahead of the host vehicle 11-10 to generate an image regarding the region ahead of the host vehicle 11-10. Also, the image generation unit 11-110 may capture a region surrounding the host vehicle 11-10 in one or more directions, as well as the region ahead of the host vehicle 11-10, to generate an image regarding the region surrounding the host vehicle 11-10.

Here, the image regarding the region ahead and the image regarding the surrounding region may be digital images and may include color images, monochrome images, infrared images, or the like. Also, the image regarding the region ahead and the image regarding the surrounding region may include still images and videos. The image generation unit 11-110 provides the image regarding the region ahead and the image regarding the surrounding region to the control unit 11-140.

Subsequently, the first information generation unit 11-120 may include at least one radar disposed in the host vehicle 11-10 and may sense a region ahead of the host vehicle 11-10 and generate first sensing information.

In detail, the first information generation unit 11-120 is disposed in the host vehicle 11-10 and is configured to sense the locations and speeds of vehicles located ahead of the host vehicle 11-10, the presence or location of a pedestrian, or the like and generate first sensing information.

By using the first sensing information generated by the first information generation unit 11-120, it is possible to perform control to maintain a distance between the host vehicle 11-10 and a preceding vehicle, and it is also possible to increase vehicle operating stability when a driver wants to change a traveling lane of the host vehicle 11-10 or upon a pre-determined specific case, e.g., backward parking. The first information generation unit 11-120 provides the first sensing information to the control unit 11-140.

Here, an intersection may be sensed using the image regarding the region ahead, which is generated by the image generation unit 11-110, and the first sensing information, which is generated by the first information generation unit 11-120.

Subsequently, when the intersection is sensed on the basis of the image regarding the region ahead, which is generated by the image generation unit 11-110, and the first sensing information, which is generated by the first information generation unit 11-120, the second information generation unit 11-130 senses the side of the host vehicle 11-10 and generates second sensing information.

In detail, the second information generation unit 11-130 may include at least one radar disposed in the host vehicle 11-10, and senses the locations and speeds of vehicles located to the side of the host vehicle 11-10. Here, the second information generation unit 11-130 may include second information generation units disposed at both sides of the front and the rear of the host vehicle 11-10.

In this case, when the intersection is sensed on the basis of the image regarding the region ahead, which is generated by the image generation unit 11-110, and the first sensing information, which is generated by the first information generation unit 11-120, the second information generation unit 11-130 increases the sensing of locations and speeds of vehicles located to the side of the host vehicle 11-10.

In order to intensively sense vehicles located to the side of the host vehicle 11-10, as an example, the second information generation unit 11-130 may increase the area of a sensing region to a side of the host vehicle 11-10. Also, the second information generation unit 11-130 may increase the length of the sensing region to the side of the host vehicle 11-10 and may increase the number of times a vehicle is sensed in the sensing region to the side of the host vehicle 11-10 for a certain period of time by reducing the sensing cycle. The second information generation unit 11-130 provides the second sensing information to the control unit 11-140.

Figure 36:
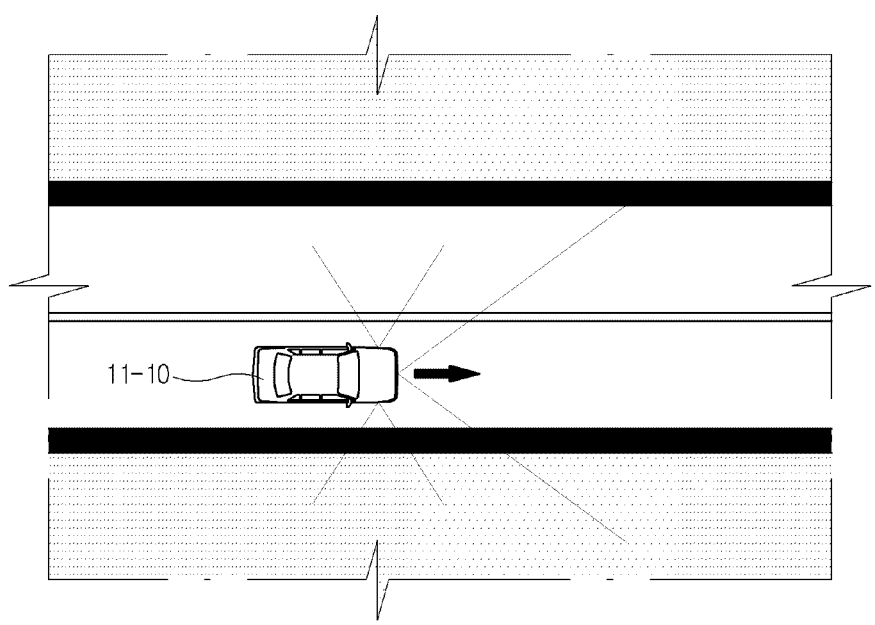
FIG. 36 is a diagram showing sensing regions of a first information generation unit and a second information generation unit before an intersection is sensed.

FIG. 36 is a diagram showing sensing regions of the first information generation unit and the second information generation unit before an intersection is sensed.

Referring to FIG. 36, the first information generation unit 11-120 may include one or more radars, and may sense the locations and speeds of vehicles located ahead of the host vehicle 11-10 and generate the first sensing information.

Before the intersection is sensed, the first information generation unit 11-120 may increase the area of a sensing region ahead of the host vehicle 11-10 in order to intensively (mainly) sense the region ahead of the host vehicle 11-10. Also, the first information generation unit 11-120 may increase the length of the sensing region ahead of the host vehicle 11-10 and may increase the number of times a vehicle is sensed in the sensing region ahead of the host vehicle 11-10 for the same period of time.

Also, the second information generation unit 11-130 may include one or more radars and may sense the locations and speeds of vehicles located to the side of the host vehicle 11-10.

Figure 37:
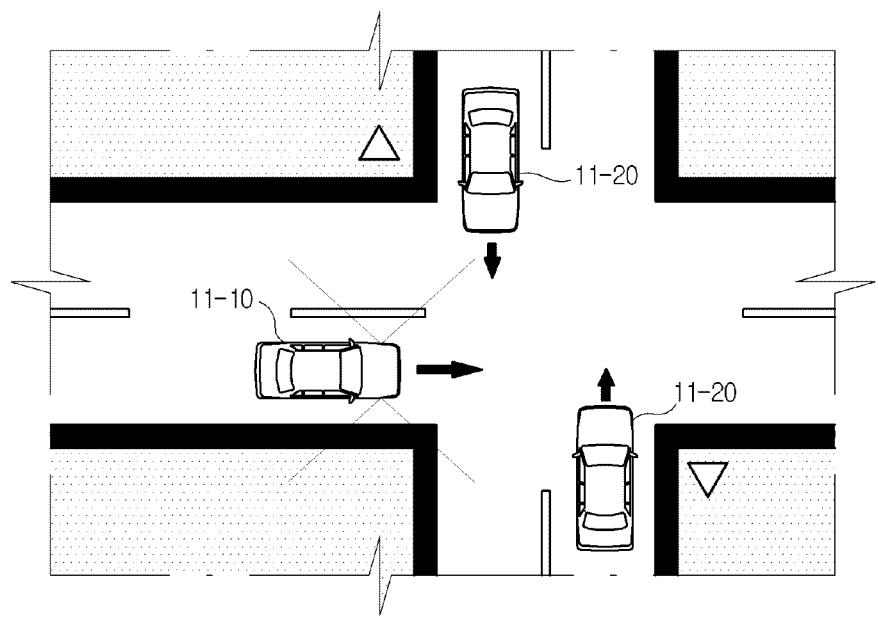
FIG. 37 is a diagram showing a change in width of the sensing region of the second information generation unit after an intersection is sensed.

FIG. 37 is a diagram showing a change in area of the sensing region of the second information generation unit after the intersection is sensed.

Referring to FIG. 37, when an intersection is sensed on the basis of the first sensing information and the image regarding the region ahead, the second information generation unit 11-130 may increase the area of the sensing region to the side of the host vehicle 11-10 to sense the locations and speeds of vehicles located to the side of the host vehicle 11-10 more intensively than the locations and speeds of vehicles located ahead of the host vehicle 11-10. That is, the locations and speeds of vehicles located to the side of the host vehicle 11-10 rather than the locations and speeds of vehicles located ahead of the host vehicle 11-10 may be selected as critical sensing targets.

Figure 38:
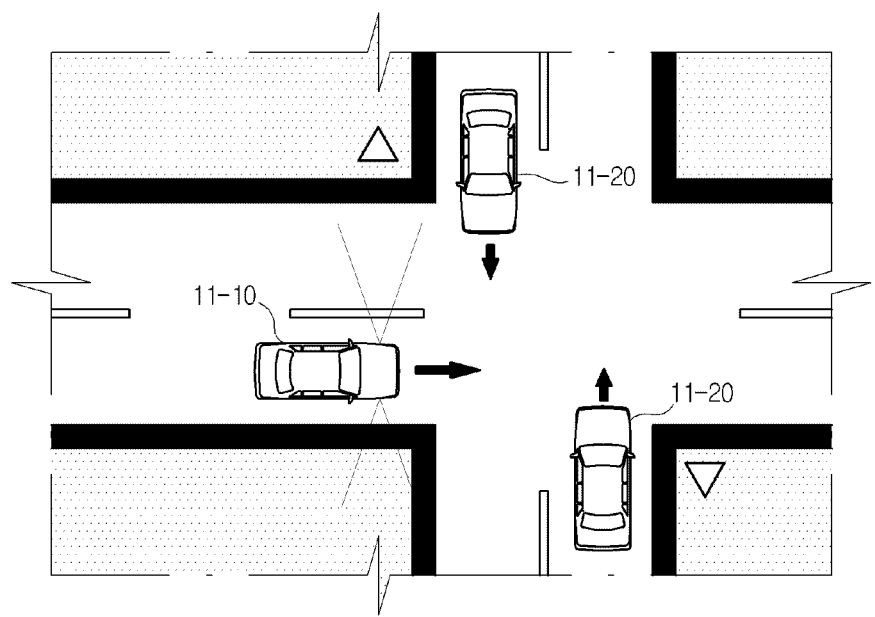
FIG. 38 is a diagram showing a change in length of the sensing region of the second information generation unit after an intersection is sensed.

FIG. 38 is a diagram showing a change in length of the sensing region of the second information generation unit after an intersection is sensed.

Referring to FIG. 38, when an intersection is monitored on the basis of the first sensing information and the image regarding the region ahead, the second information generation unit 11-130 may increase the length of the sensing region to the side of the host vehicle 11-10 to select the locations and speeds of vehicles located to the side of the host vehicle 11-10 and also the locations and speeds of vehicles located ahead of the host vehicle 11-10 as critical sensing targets.

Subsequently, the control unit 11-140 selects a target vehicle 11-20 on the basis of the second sensing information, determines whether the host vehicle 11-10 will collide with the target vehicle 11-20, and controls the host vehicle 11-10.

In detail, the control unit 11-140 selects a vehicle close to the host vehicle 11-10 as the target vehicle 11-20 on the basis of the second sensing information. Also, the control unit 11-140 selects a vehicle that is not close to the host vehicle 11-10 but approaches the host vehicle 11-10 as the target vehicle 11-20. In this case, the control unit 11-140 may determine that a stopped vehicle is a vehicle without a risk of collision and exclude the stopped vehicle from the selection of the target vehicle 11-20.

The control unit 11-140 determines whether the host vehicle 11-10 will collide with the selected target vehicle 11-20. Also, when it is determined that the host vehicle 11-10 will collide with the selected target vehicle 11-20, the control unit 11-140 may warn the driver of the collision and may control the host vehicle 11-10 to be braked.

Figure 39:
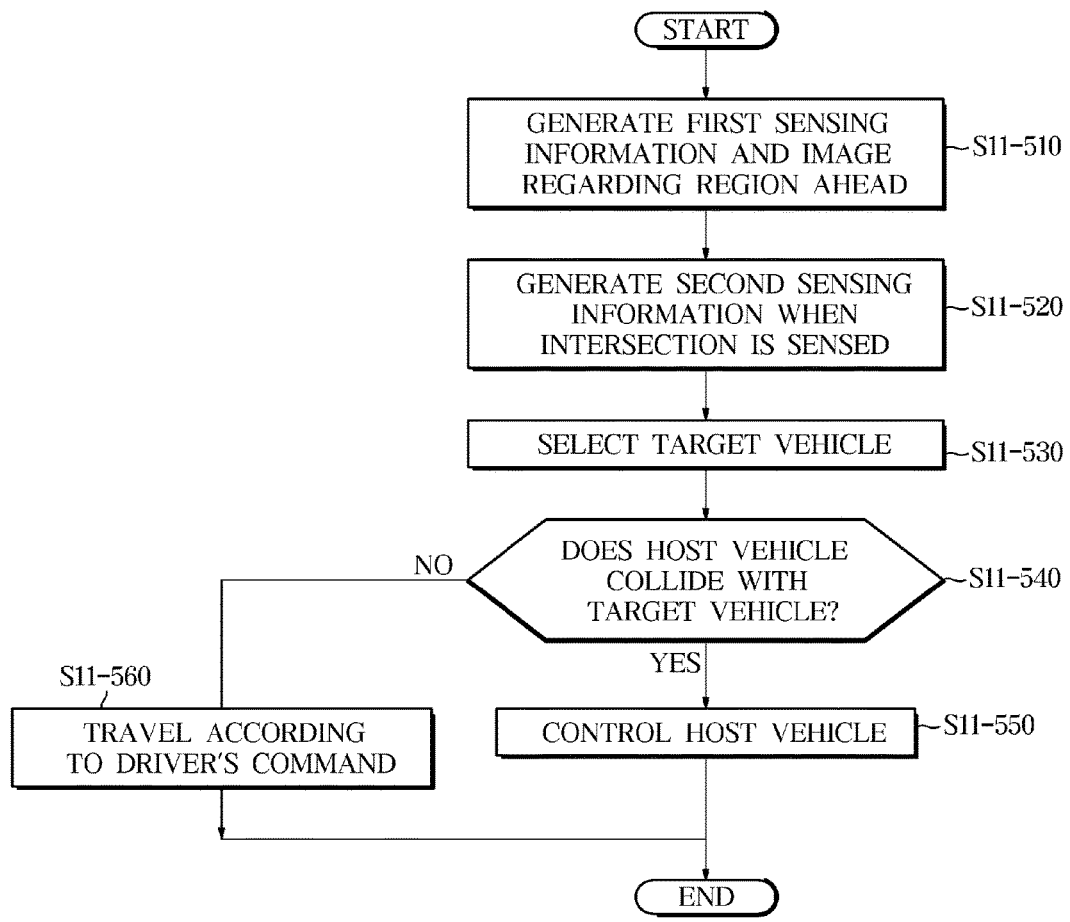
FIG. 39 is an operational flowchart illustrating a vehicle control method according to the eleventh embodiment of the present disclosure.

FIG. 39 is an operational flowchart illustrating a vehicle control method according to the eleventh embodiment of the present disclosure.

Referring to FIG. 39, the image generation unit 11-110 generates an image regarding a region ahead, and the first information generation unit 11-120 generates first sensing information (S11-510).

In detail, the image generation unit 11-110 captures a region ahead of the host vehicle 11-10 to generate an image regarding the region ahead. Here, the image generation unit 11-110 may capture a region surrounding the host vehicle 11-10 in one or more directions, as well as the region ahead of the host vehicle 11-10, to generate an image regarding the region surrounding the host vehicle 11-10.

The first information generation unit 11-120 senses the region ahead of the host vehicle 11-10 and generates first sensing information.

Subsequently, when an intersection is sensed on the basis of the image regarding the region ahead and the first sensing information, the second information generation unit 11-130 generates second sensing information (S11-520).

In detail, the second information generation unit 11-130 is disposed in the host vehicle 11-10 and is configured to sense the locations and speeds of vehicles located to the side of the host vehicle 11-10. In this case, when the intersection is sensed, the second information generation unit 11-130 increases the sensing of the side of the host vehicle 11-10 and selects the side of the host vehicle 11-10 as a critical sensing region. Also, the second information generation unit 11-130 selects the locations and speeds of vehicles located to the side of the host vehicle 11-10 as critical sensing targets, and intensively senses the locations and speeds.

As an example, the second information generation unit 11-130 may increase the area of the sensing region to the side of the host vehicle 11-10 or the length of the sensing region to the side to increase the sensing of the side of the host vehicle 11-1. Thus, the second information generation unit 11-130 may intensively sense the side of the host vehicle 11-10. Also, the second information generation unit 11-130 may increase the number of times the sensing region to the side of the host vehicle 11-10 is sensed for a certain period of time by reducing the sensing cycle and thus may intensively sense the side of the host vehicle 11-10.

Subsequently, the control unit 11-140 selects the target vehicle 11-20 on the basis of the second sensing information (S11-530).

In detail, the control unit 11-140 selects a vehicle close to the host vehicle 11-10 as the target vehicle 11-20 on the basis of the second sensing information. Also, the control unit 11-140 may select, as the target vehicle, a vehicle approaching the host vehicle 11-10 from among traveling vehicles.

The control unit 11-140 may exclude a stopped vehicle, which is a vehicle with no risk of collision with the host vehicle 11-10, from the selection of the target vehicle 11-20.

Subsequently, the control unit 11-140 determines whether the host vehicle 11-10 will collide with the target vehicle 11-20 (S11-540).

When it is determined that the host vehicle 11-10 will collide with the target vehicle 11-20, the control unit 11-140 controls the host vehicle 11-10 (S11-550).

In detail, when it is determined that the host vehicle 11-10 will collide with the target vehicle 11-20, the control unit 11-140 may warn the driver of the collision and may control the braking apparatus to brake the host vehicle 11-10. Thus, the control unit 11-140 may perform emergency braking on the host vehicle 11-10.

When it is determined that the host vehicle 11-10 will not collide with the target vehicle 11-20, the control unit 11-140 controls the host vehicle 11-10 to travel according to the driver's command (S11-560).

As described above, according to the present disclosure, it is possible to implement a vehicle control apparatus and method capable of sensing an intersection using a camera and a radar disposed in the host vehicle 11-10 and capable of performing emergency braking on the host vehicle 11-10 and also issuing a warning to the driver when a collision between the host vehicle 11-10 and the target vehicle 11-20 is expected to occur at the sensed intersection.

Twelfth Embodiment

An intersection is a point where traveling paths of vehicles intersect each other, and thus an accident may occur frequently at an intersection. In particular, when the signal of a traffic light at an intersection is changed, there is a high likelihood of a collision occurring in a direction that a driver is not watching. To this end, research is required on a technique capable of complementing a limited watching range of the driver.

The twelfth embodiment of the present disclosure relates to an ADAS, and particularly, to a driving assistance system for avoiding a collision between vehicles.

The twelfth embodiment will be described below with reference to FIGS. 40A, 40B, and 41.

Figure 40A:
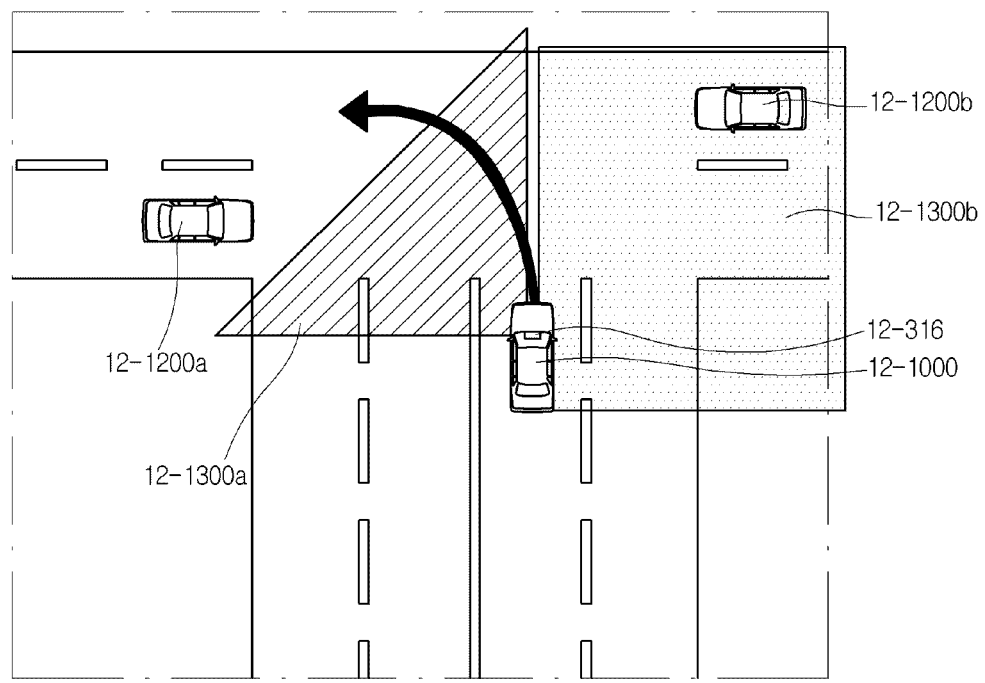
FIGS. 40A and 40B are diagrams illustrating operation of a driving assistance system during a left turn according to a twelfth embodiment of the present disclosure.
Figure 40B:
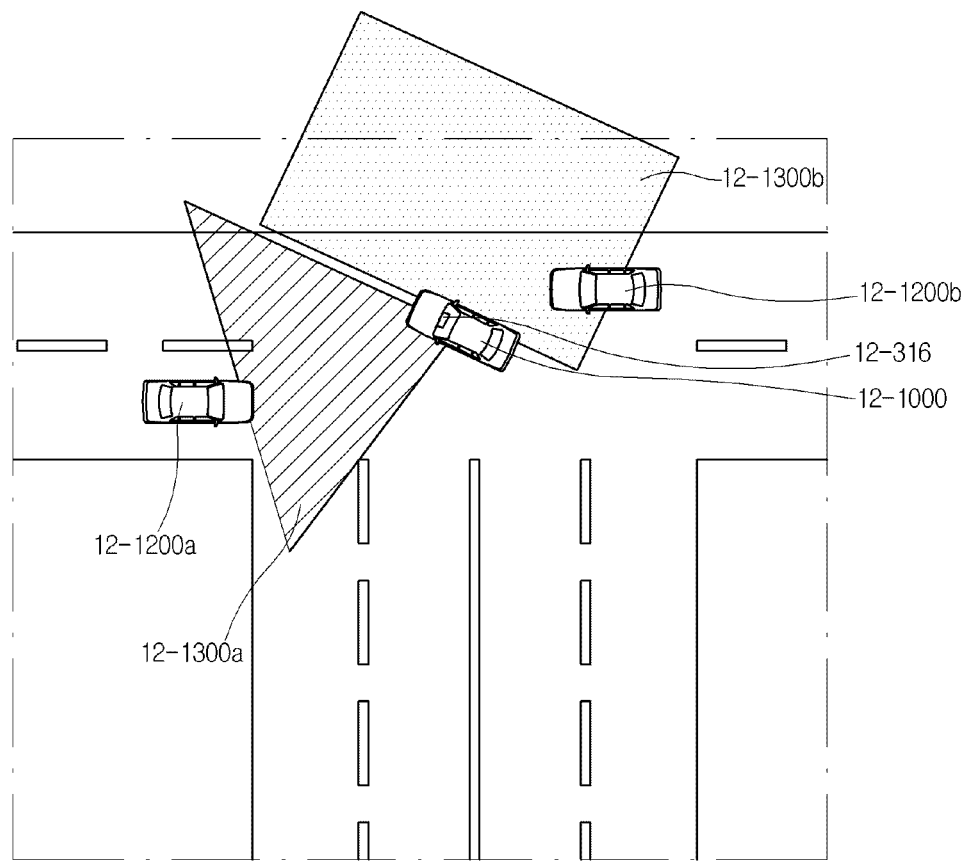

FIGS. 40A and 40B are diagrams illustrating operation of a driving assistance system during a left turn according to the twelfth embodiment of the present disclosure.

Referring to FIGS. 1, 3, and 40A, a host vehicle 12-1000 is waiting at an intersection to turn left. In this case, the driver may watch the left direction with respect to the intersection. The left direction that the driver is watching may be defined as a first direction, and the right direction, which is opposite to the first direction, may be defined as a second direction. A vehicle approaching the intersection from the first direction may be defined as a first third-party vehicle 12-1200a, and a vehicle approaching the intersection from the second direction may be defined as a second third-party vehicle 12-1200b. The direction that the driver is watching may be sensed through a driver monitoring camera 316 disposed inside the vehicle. The driver monitoring camera 316 may sense a heading direction of the driver's face or a viewing direction for the driver's eyes to sense the direction that the driver is watching. The driver monitoring camera 316 may be an element in the MCU level.

The driver may sense an object approaching from the first direction and control the host vehicle 12-1000, and a range in which the driver can directly control the host vehicle 12-1000 may be defined as a driver control range 12-1300a. When there is a possibility of collision between the host vehicle 12-1000 and a third-party vehicle in the driver control range 12-1300a, an ECU 12-320 may control a driver warning controller 12-331 to issue a warning. The vehicle camera system 1 may sense an object approaching from the second direction, which the driver is not watching, and the ECU 12-320 may control a steering controller 12-334 and a brake controller 12-337 through data acquired by the vehicle camera system 1 to control the steering and braking of the host vehicle 12-1000. In this case, a range in which the ECU 12-320 can control the host vehicle may be defined as a system control range 12-1300b. That is, the ECU 12-320 may sense the second direction, which is opposite to the first direction that the driver is watching and may control the host vehicle 12-1000 when there is a possibility of collision in the second direction.

The ECU 12-320 may determine, on a level basis, collision risk possibilities between the host vehicle and third-party vehicles 12-1200a and 12-1200b though data regarding whether the third-party vehicles 12-1200a and 12-1200b are approaching, which is acquired by the camera system 1. The camera system 1 may measure the relative speeds of the third-party vehicles 12-1200a and 12-1200b approaching the host vehicle 12-1000 and the distances between the host vehicle 12-1000 and the third-party vehicles 12-1200a and 12-1200b. The ECU 12-320 may set levels for the collision risk possibilities through the relative speeds between the host vehicle 12-1000 and the third-party vehicles 12-1200a and 12-1200b approaching the host vehicle 12-1000 and the distances between the host vehicle 12-1000 and the third-party vehicles 12-1200a and 12-1200b. For example, when the distance is smaller than a pre-determined distance and the speed is higher than a pre-determined relative speed, the ECU 12-320 may determine that this situation corresponds to a high collision risk possibility level. When the distance is larger than the pre-determined distance and the speed is lower than the pre-determined relative speed, the ECU 12-320 may determine that this situation corresponds to a low collision risk possibility level. However, the criterion is merely an example and may be variously preset. When a collision risk level in the driver control range 12-1300a is the same as a collision risk level in the system control range 12-1300b, the ECU 12-320 may determine that a collision risk is higher in the system control range 12-1300b than in the driver control range 12-1300a. That is, the ECU 12-320 may mainly control a risk of collision that may occur beyond a driver controllable range.

Unlike the above-described example, the ECU 12-320 may control the hot vehicle 12-1000 unlike the driver's control when there is high collision possibility in the driver control range 12-1300a. That is, when there is no collision possibility in the system control range 12-1300b but there is high collision possibility in the driver control range 12-1300, the ECU 12-320 may be set to issue a warning as well as to control the steering and braking of the host vehicle 12-1000.

Referring to FIG. 40B, the driver may turn left at an intersection while sensing the first third-party vehicle 12-1200a located in the first direction. In this case, the vehicle camera system 1 may sense the presence of the second third-party vehicle 12-1200b approaching the host vehicle 12-1000, and the ECU 12-320 may determine a possibility of collision between the host vehicle 12-1000 and the second third-party vehicle 12-1200b. When a collision is expected to occur within the system control range 12-1300b, the ECU 12-320 may control the steering and braking of the host vehicle 12-1000 to prevent a collision between the host vehicle 12-1000 and the second third-party vehicle 12-1200b.

Figure 41:
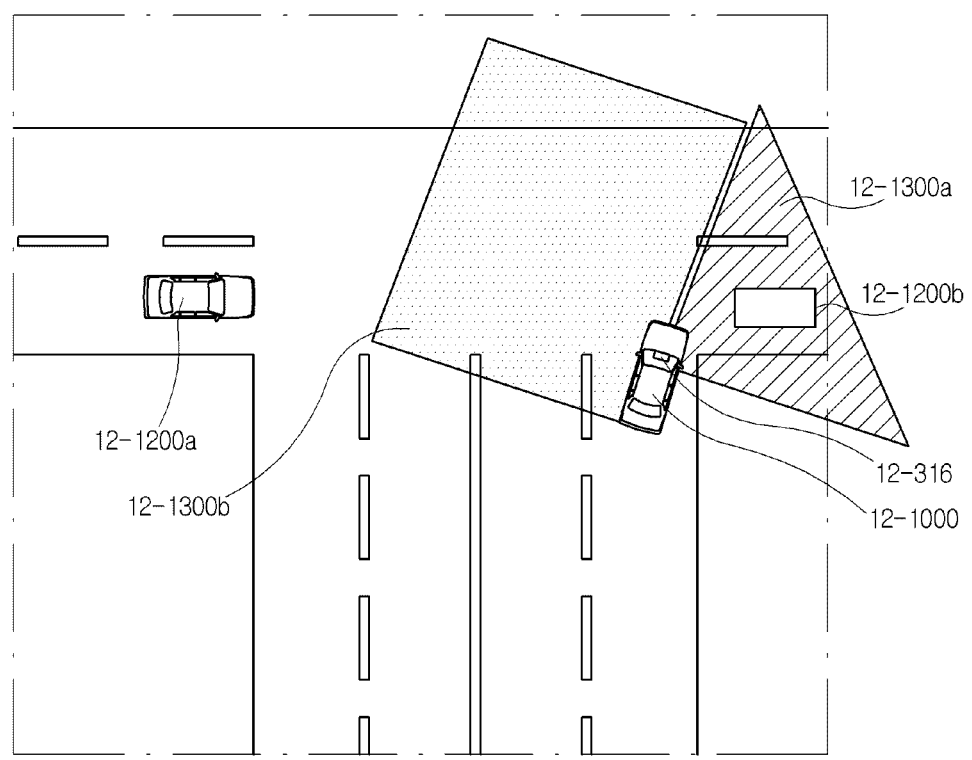
FIG. 41 is a diagram illustrating operation of the driving assistance system during a right turn according to the twelfth embodiment of the present disclosure.

FIG. 41 is a diagram illustrating operation of the driving assistance system during a right turn according to the twelfth embodiment of the present disclosure. For simplicity of description, a repetitive description of those described with reference to FIGS. 40A and 40B will be omitted.

Referring to FIGS. 1, 3, and 41, a host vehicle 12-1000 is waiting at an intersection to turn right. In this case, the driver may watch the right direction with respect to the intersection. The right direction that the driver is watching may be defined as a first direction, and the left direction, which is opposite to the first direction, may be defined as a second direction. The driver may sense an object approaching from the first direction and control the host vehicle 12-1000, and a range in which the driver can directly control the host vehicle 12-1000 may be defined as a driver control range 12-1300a. When there is a possibility of collision between the host vehicle 12-1000 and a third-party vehicle in the driver control range 12-1300a, the ECU 12-320 may control the driver warning controller 12-331 to issue a warning. The vehicle camera system 1 may sense an object approaching from the second direction, which the driver is not watching, and the ECU 12-320 may control the steering controller 12-334 and the brake controller 12-337 through data acquired by the vehicle camera system 1 to control the steering an braking of the host vehicle 12-1000. In this case, a range in which the ECU 12-320 can control the host vehicle may be defined as a system control range 12-1300b.

The driver may turn left at the intersection while sensing the object 12-1200b located in the first direction. The object 12-1200b may be a vehicle, a pedestrian, a bicyclist, or the like. In this case, the vehicle camera system 1 may sense the presence of the third-party vehicle 12-1200a approaching the host vehicle 12-1000, and the ECU 12-320 may determine a possibility of collision between the host vehicle 12-1000 and the third-party vehicle 12-1200a. When a collision is expected to occur within the system control range 12-1300b, the ECU 12-320 may control the steering and braking of the host vehicle 12-1000 to prevent a collision between the host vehicle 12-1000 and the third-party vehicle 12-1200a.

Unlike the above-described example, the driver may watch a direction opposite to a direction in which the host vehicle 12-1000 is to travel. In this case, the ECU 12-320 may control the camera system 1 to watch a vehicle traveling direction, which is opposite to a direction that the driver is watching. The ECU 12-320 may determine both of a possibility of collision that may occur in the direction in which the vehicle is traveling and a possibility of collision that may occur in the direction that the driver is watching and may control the steering and braking of the host vehicle 12-1000 when there is a collision possibility in the vehicle traveling direction. Also, the ECU 12-320 may issue a warning where there is a collision possibility in the direction that the driver is watching.

In one or more exemplary embodiments, the functions described may be implemented in hardware, software, firmware, or any combination thereof. If implemented in software, the functions can be stored on or transmitted as one or more instructions or code on a computer-readable medium. Computer-readable media include all of communication media and computer storage media including any medium for facilitating transfer of a computer program from one place to another place. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

When exemplary embodiments are implemented by program code or code segments, each code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or the like may be passed, forwarded, or transmitted via any suitable means including memory sharing, message passing, token passing, network transmission, or the like. Additionally, in some aspects, the steps and/or operations of a method or algorithm may reside as one or any combination or set of codes and/or instructions on a machine-readable medium and/or computer-readable medium, which may be incorporated into a computer program product.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means.

For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data whether or not the events are correlated in close temporal proximity, and whether the events and data come from one or several event and data sources.

As used herein, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

The invention claimed is:

1. A vehicle collision avoidance control device for a host vehicle, comprising:
   at least one sensor mounted to the host vehicle and configured to sense a driving lane in which the host vehicle is traveling and to sense an external vehicle partially engaged in the driving lane;
   a controller configured to control at least one of steering, braking, or acceleration of the host vehicle on the basis of sensing information received from the least one sensor,
   wherein the controller is configured to:
      determine the external vehicle partially engaged in the driving lane as a target vehicle having at least a part thereof overlapping with a lane mark of the driving lane;
      determine lateral and longitudinal positional relationships between the host vehicle and the target vehicle based on sensing information received from the at least one sensor; and
      perform at least one of a longitudinal braking or acceleration control on the host vehicle or a lateral steering control on the host vehicle based on the lateral and longitudinal positional relationships between the host vehicle and the target vehicle.

2. The vehicle collision avoidance control device of claim 1,
   wherein the controller is further configured to identify an adjacent lane which is directly adjacent to the driving lane and is free of any part of the target vehicle, and
   the controller is configured to perform the longitudinal braking or acceleration control on the host vehicle by decelerating or accelerating the host vehicle when the target vehicle is determined to be engaged in the driving lane and a third-party vehicle is determined to be present in the adjacent lane.

3. The vehicle collision avoidance control device of claim 2,
   wherein the controller is configured to determine whether the host vehicle is able to pass the target vehicle before the target vehicle completely enters the driving lane using the information from the at least one sensor, and
   the controller is configured to perform the longitudinal braking or acceleration control on the host vehicle by accelerating the host vehicle in response to determining that the host vehicle is able to pass the target vehicle before the target vehicle completely enters the driving lane.

4. The vehicle collision avoidance control device of claim 2,
   wherein the controller is configured to determine whether the host vehicle is able to pass the target vehicle before the target vehicle completely enters the driving lane using the information from the at least one sensor, and
   the controller is configured to perform the longitudinal braking or acceleration control on the host vehicle by decelerating the host vehicle in response to determining that the host vehicle is not able to pass the target vehicle before the target vehicle completely enters the driving lane.

5. The vehicle collision avoidance control device of claim 3,
   wherein the controller is further configured to perform the lateral steering control on the host vehicle in addition to the longitudinal braking or acceleration control by steering the host vehicle within the driving lane.

6. The vehicle collision avoidance control device of claim 1,
   wherein the controller is further configured to identify an adjacent lane which is directly adjacent to the driving lane and is free of any part of the target vehicle, and
   the controller is configured to perform the lateral steering control on the host vehicle by steering the host vehicle in a direction toward the adjacent lane when the target vehicle is determined to be engaged in the driving lane and a third-party vehicle is determined not to be present in the adjacent lane.

7. The vehicle collision avoidance control device of claim 6,
   the controller is further configured to perform the lateral steering control on the host vehicle by steering the host vehicle to enter into the adjacent lane.

8. The vehicle collision avoidance control device of claim 6,
   wherein the controller is configured to perform the lateral steering control on the host vehicle by steering the host vehicle within the driving lane.

9. The vehicle collision avoidance control device of claim 1, wherein the controller is configured to perform at least one of a longitudinal braking or acceleration control on the host vehicle or a lateral steering control on the host vehicle based on determining that the external vehicle is partially engaged in the driving lane and that an angle difference between the host vehicle and the external vehicle is equal to or less than a predetermined angle.

10. The vehicle collision avoidance control device of claim 9, wherein the predetermined angle is 0° to 30°.

11. A control method for vehicle collision avoidance, comprising:
    sensing a driving lane in which a host vehicle is traveling using at least one sensor mounted to the host vehicle, and sensing an external vehicle partially engaged in the driving lane using the at least one sensor;
    determining, using a controller communicatively connected to the at least one sensor, the external vehicle partially engaged in the driving lane as a target vehicle having at least a part thereof overlapping with a lane mark of the driving lane;
    determining lateral and longitudinal positional relationships between the host vehicle and the target vehicle based on sensing information received from the at least one sensor; and
    performing at least one of a longitudinal braking or acceleration control or a lateral steering control on the host vehicle based on the lateral and longitudinal positional relationships between the host vehicle and the target vehicle.

12. The control method of claim 11, further comprising:
    identifying an adjacent lane which is directly adjacent to the driving lane and is free of any part of the target vehicle; and
    performing the longitudinal braking or acceleration control on the host vehicle by decelerating or accelerating the host vehicle when the target vehicle is determined to be engaged in the driving lane and a third-party vehicle is determined to be present in the adjacent lane.

13. The control method of claim 12, further comprising:
determining whether the host vehicle is able to pass the target vehicle before the target vehicle completely enters the driving lane; and
performing the longitudinal braking or acceleration control on the host vehicle by accelerating the host vehicle in response to determining that the host vehicle is able to pass the target vehicle before the target vehicle completely enters the driving lane.

14. The control method of claim 13, further comprising:
performing the lateral steering control on the host vehicle in addition to the longitudinal braking or acceleration control by steering the host vehicle within the driving lane.

15. The control method of claim 12, further comprising:
determining whether the host vehicle is able to pass the target vehicle before the target vehicle completely enters the driving lane; and
performing the longitudinal braking or acceleration control on the host vehicle by decelerating the host vehicle in response to determining that the host vehicle is not able to pass the target vehicle before the target vehicle completely enters the driving lane.

16. The control method of claim 11, further comprising:
identifying an adjacent lane which is directly adjacent to the driving lane and is free of any part of the target vehicle; and
performing the lateral steering control on the host vehicle by steering the host vehicle in a direction toward the adjacent lane in response to identifying a risk of collision with the target vehicle and a third-party vehicle is determined not to be present in the adjacent lane.

17. The control method of claim 16,
wherein the performing the lateral steering control on the host vehicle includes steering the host vehicle to enter into the adjacent lane.

18. The control method of claim 16,
wherein the performing the lateral steering control on the host vehicle includes steering the host vehicle within the driving lane.

19. A vehicle collision avoidance control device for a host vehicle, comprising:
at least one sensor mounted to the host vehicle and configured to sense a driving lane in which the host vehicle is traveling and to sense an object impinging on the driving lane;
a controller configured to control at least one of steering, braking, or acceleration of the host vehicle on the basis of sensing information received from the least one sensor,
wherein the controller is configured to:
detect, based on the sensing information received from the least one sensor, an object having at least a part thereof overlapping with the lane mark of the driving lane;
in response to detecting the object having at least a part thereof overlapping with the lane mark of the driving lane, determine the detected object as a target object;
determine lateral and longitudinal positional relationships between the host vehicle and the target object based on sensing information received from the at least one sensor; and
perform at least one of a longitudinal braking or acceleration control on the host vehicle or a lateral steering control on the host vehicle based on the lateral and longitudinal positional relationships between the host vehicle and the target object.

20. The vehicle collision avoidance control device of claim 19,
wherein the controller is further configured to identify an adjacent lane which is directly adjacent to the driving lane and is free of any part of the target object, and
the controller is configured to perform the longitudinal braking or acceleration control on the host vehicle by decelerating or accelerating the, host vehicle when the target object is determined to be engaged in the driving lane and a third-party vehicle is determined to be present in the adjacent lane.

21. The vehicle collision avoidance control device of claim 20,
wherein the controller is configured to determine whether the host vehicle is able to pass the target object before the target object completely enters the driving lane using the information from the at least one sensor, and
the controller is configured to perform the longitudinal braking or acceleration control on the host vehicle by accelerating the host vehicle in response to determining that the host vehicle is able to pass the target object before the target object completely enters the driving lane.

22. The vehicle collision avoidance control device of claim 20,
wherein the controller is configured to determine whether the host vehicle is able to pass the target object before the target vehicle completely enters the driving lane using the information from the at least one sensor, and
the controller is configured to perform the longitudinal braking or acceleration control on the host vehicle by decelerating the host vehicle in response to determining that the host vehicle is not able to pass the target object before the target vehicle completely enters the driving lane.

23. The vehicle collision avoidance control device of claim 22,
wherein the controller is further configured to perform the lateral steering control on the host vehicle in addition to the longitudinal braking or acceleration control by steering the host vehicle within the driving lane.

24. The vehicle collision avoidance control device of claim 19,
wherein the controller is further configured to identify an adjacent lane which is directly adjacent to the driving lane and is free of any part of the target vehicle, and
the controller is configured to perform the lateral steering control on the host vehicle by steering the host vehicle in a direction toward the adjacent lane when the target object is determined to be engaged in the driving lane and a third-party vehicle is determined not to be present in the adjacent lane.

25. The vehicle collision avoidance control device of claim 24,
the controller is further configured to perform the lateral steering control on the host vehicle by steering the host vehicle to enter into the adjacent lane.

26. The vehicle collision avoidance control device of claim 24,
wherein the controller is configured to perform the lateral steering control on the host vehicle by steering the host vehicle within the driving lane.

* * * * *